US012591091B1

(12) United States Patent
Wang et al.

(10) Patent No.: US 12,591,091 B1
(45) Date of Patent: Mar. 31, 2026

(54) ANTI-RESONANT HOLLOW-CORE FIBER HAVING OFFSET AND FAN-SHAPED CLADDING ELEMENTS

(71) Applicant: LINFIBER TECHNOLOGY (NANTONG) CO., LTD., Nantong (CN)

(72) Inventors: Yingying Wang, Nantong (CN); Shoufei Gao, Nantong (CN); Jiayi Chen, Nantong (CN)

(73) Assignee: Linfiber Technology (Nantong) Co., Ltd., Nantong (CN)

( * ) Notice: Subject to any disclaimer, the term of this patent is extended or adjusted under 35 U.S.C. 154(b) by 0 days.

(21) Appl. No.: 19/072,376

(22) Filed: Mar. 6, 2025

(30) Foreign Application Priority Data

Dec. 31, 2024 (CN) .......................... 202411999077.4

(51) Int. Cl.
*G02B 6/02* (2006.01)
(52) U.S. Cl.
CPC ................................. *G02B 6/02328* (2013.01)
(58) Field of Classification Search
CPC .................................................. G02B 6/02328
See application file for complete search history.

(56) References Cited

U.S. PATENT DOCUMENTS

| | | | | |
|---|---|---|---|---|
| 4,233,493 A * | 11/1980 | Nath | .................... | G02B 6/4296 |
| | | | | 392/419 |
| 7,003,204 B2 * | 2/2006 | Upton | .................. | G02B 6/2861 |
| | | | | 385/125 |

| | | | | |
|---|---|---|---|---|
| 7,162,106 B2 * | 1/2007 | Upton | ................ | G02B 6/02385 |
| | | | | 385/27 |
| 9,810,837 B2 * | 11/2017 | Benabid | ............. | G02B 6/02347 |
| 10,139,560 B2 | 11/2018 | Poletti et al. | | |
| 10,393,956 B2 * | 8/2019 | Russell | ............... | C03B 37/0122 |
| 10,527,782 B2 * | 1/2020 | Lyngsøe | ............ | G02B 6/02328 |

(Continued)

FOREIGN PATENT DOCUMENTS

CN         117538981 A       2/2024

OTHER PUBLICATIONS

Y. Y. Wang, N. V. Wheeler, F. Couny, P. J. Roberts, and F. Benabid. "Low loss broadband transmission in hypocycloid-core Kagome hollow-core photonic crystal fiber". Opt. Lett. 36 669-671 (2011), 3 pages.

(Continued)

*Primary Examiner* — Andrew Jordan
(74) *Attorney, Agent, or Firm* — Crowell & Moring LLP

(57) ABSTRACT

The present disclosure relates to an anti-resonant hollow-core fiber, including: an outer jacket tube, provided with an inner surface; and cladding elements, located in the outer jacket tube, and including a plurality of first cladding elements arranged around the inner surface, where any two adjacent first cladding elements in the plurality of first cladding elements are in contact with each other and define a central air region of the anti-resonant hollow-core fiber, and a core fundamental mode field of the anti-resonant hollow-core fiber is limited in the central air region, where a contact point closest to a center point of the core fundamental mode field exists between the any two adjacent first cladding elements; and each of the first cladding elements further includes at least one first primary nested element.

17 Claims, 49 Drawing Sheets

(56) References Cited

U.S. PATENT DOCUMENTS

| | | | | |
|---|---|---|---|---|
| 10,816,721 | B1 * | 10/2020 | Chenard | G02B 6/02328 |
| 10,859,763 | B2 * | 12/2020 | Xu | G02B 6/02328 |
| 11,209,591 | B2 * | 12/2021 | Gao | G02B 6/02328 |
| 11,215,751 | B2 * | 1/2022 | Poletti | G02B 6/024 |
| 11,493,685 | B2 * | 11/2022 | Wang | G02B 6/02304 |
| 11,668,871 | B2 * | 6/2023 | Poletti | C03B 37/01493 |
| | | | | 385/125 |
| 12,117,646 | B2 * | 10/2024 | Poletti | G02B 6/02357 |
| 2005/0232560 | A1 * | 10/2005 | Knight | C03B 37/02781 |
| | | | | 385/125 |
| 2006/0140563 | A1 * | 6/2006 | Upton | G02B 6/2861 |
| | | | | 385/27 |
| 2016/0124144 | A1 * | 5/2016 | Benabid | B29D 11/00663 |
| | | | | 385/125 |
| 2017/0160467 | A1 * | 6/2017 | Poletti | H01S 3/06712 |
| 2018/0267235 | A1 * | 9/2018 | Russell | G02B 6/02357 |
| 2019/0377131 | A1 * | 12/2019 | Russell | G02B 6/02342 |
| 2020/0115270 | A1 * | 4/2020 | Yoo | G02B 6/02361 |
| 2020/0156987 | A1 * | 5/2020 | Wheeler | G02B 6/02328 |
| 2020/0241200 | A1 * | 7/2020 | Wang | G02B 6/02328 |
| 2020/0257041 | A1 * | 8/2020 | Xu | C03B 37/02781 |
| 2020/0278491 | A1 * | 9/2020 | Poletti | G02B 6/02357 |
| 2020/0319399 | A1 * | 10/2020 | Mangan | C03B 37/0279 |
| 2020/0326473 | A1 * | 10/2020 | Chenard | C03B 37/022 |
| 2021/0088717 | A1 * | 3/2021 | Jasion | G02B 6/02328 |
| 2021/0311250 | A1 * | 10/2021 | Jasion | C03B 37/02781 |
| 2021/0349256 | A1 * | 11/2021 | Gao | G02B 6/02328 |
| 2021/0382227 | A1 * | 12/2021 | Wang | G02B 6/032 |
| 2021/0396927 | A1 * | 12/2021 | Harker | H04B 10/073 |
| 2022/0011502 | A1 * | 1/2022 | Poletti | H01S 3/06729 |
| 2022/0146907 | A1 * | 5/2022 | Russell | G02B 6/02357 |
| 2022/0196907 | A1 * | 6/2022 | Poletti | G02B 6/02328 |
| 2023/0358948 | A1 * | 11/2023 | Russell | G02B 6/02371 |
| 2024/0036248 | A1 | 2/2024 | Dainese, Jr. et al. | |
| 2024/0036250 | A1 * | 2/2024 | Dainese, Jr. | C03B 37/012 |
| 2024/0036252 | A1 * | 2/2024 | Dainese, Jr. | G02B 6/032 |
| 2024/0036253 | A1 * | 2/2024 | Dainese, Jr. | G02B 6/02328 |
| 2024/0201434 | A1 * | 6/2024 | Lyngsøe | C03B 37/0122 |
| 2024/0402418 | A1 * | 12/2024 | Dainese, Jr. | G02B 6/02328 |
| 2024/0402419 | A1 * | 12/2024 | Amezcua-Correa | |
| | | | | G02B 6/02328 |
| 2025/0377496 | A1 * | 12/2025 | Dainese, Jr. | G02B 6/02328 |

OTHER PUBLICATIONS

A. N. Kolyadin et al., "Light transmission in negative curvature hollow core fiber in extremely high material loss region," Opt. Exp., vol. 21, No. 8, pp. 9514-9519, Apr. 2013, 6 pages.

W. Belardi and J. C. Knight, "Hollow antiresonant fibers with reduced attenuation," Opt. Lett., vol. 39, No. 7, pp. 1853-1856, Apr. 2014, 4 pages.

Gregory Jasion et al., "Fabrication of tubular anti-resonant hollow core fibers: modelling, draw dynamics and process optimization" Optics Express 27, 20567 (2019), 16 pages.

Nawazuddin, Mubassira Banu Syed, et al. "Lotus-shaped negative curvature hollow core fiber with 10.5 dB/km at 1550 nm wavelength." Journal of Lightwave Technology 36.5 (2017): 1213-1219, 7 pages.

Chen, Yang, et al. "Low-loss single-mode negatively curved square-core hollow fibers." Optics Letters 42.7 (2017): 1285-1288, 4 pages.

* cited by examiner

Fluid dynamics design

(a)

(b)

(c)

(a)

(b)

(c)

ANTI-RESONANT HOLLOW-CORE FIBER HAVING OFFSET AND FAN-SHAPED CLADDING ELEMENTS

RELATED APPLICATION

This application claims priority to Chinese Patent Application No. 202411999077.4, filed with the China National Intellectual Property Administration on Dec. 31, 2024, which is incorporated herein by reference in its entirety.

TECHNICAL FIELD

The present disclosure relates to the field of hollow-core fibers, and more specifically to an anti-resonant hollow-core fiber.

BACKGROUND

According to different light guide mechanisms, typically, a hollow-core fiber may include a hollow photonic bandgap optical fiber and an anti-resonant hollow-core fiber.

The anti-resonant hollow-core fiber has characteristics of a simple structure, hollow-core light guiding, and a wide transmission spectrum, and has important applications in fields such as interaction between light and a filler material, nonlinear optics, gas detection, gas laser generation, and optofluidic technology. In addition, hollow-core light guiding has ultra-low Rayleigh scattering, a low nonlinear coefficient, and dispersion tunability, and a higher laser loss threshold may be provided, so that hollow-core light guiding has potential applications in aspects such as high power laser transmission, ultraviolet/middle infrared light transmission, pulse compression, and soliton transmission.

In addition, with an ultra-low loss, low dispersion, low nonlinearity, a transmission speed close to light speed of an anti-resonant hollow-core fiber, the communication transmission on the hollow-core fiber and the development of communication devices can be implemented, which lays the foundation for the construction and development of a next-generation, ultra-high-capacity, low-latency, high-speed optical communication system.

SUMMARY

According to a first aspect of the present disclosure, an anti-resonant hollow-core fiber is provided. The anti-resonant hollow-core fiber includes: an outer jacket tube, provided with an inner surface; and cladding elements, located in the outer jacket tube, and including a plurality of first cladding elements arranged around the inner surface, where any two adjacent first cladding elements in the plurality of first cladding elements are in contact with each other and define a central air region of the anti-resonant hollow-core fiber, and a core fundamental mode field of the anti-resonant hollow-core fiber is limited in the central air region, where a contact point closest to a center point of the core fundamental mode field exists between the any two adjacent first cladding elements, and a ratio of a distance $D_1$ from the closest contact point to a closest boundary of the core fundamental mode field to a distance $D_2$ from the closest boundary to the center point of the core fundamental mode field has the following relationship: $D_1/D_2 > 0.46$; a boundary of the core fundamental mode field is defined by an intensity being $1/e^2$ of an intensity at the center point of the core fundamental mode field, and a center point of a square of the intensity of the core fundamental mode field is a peak value point of a square of an intensity of a fundamental mode electric field; and each of the first cladding elements further includes at least one first primary nested element.

It will be understood that through the anti-resonant hollow-core fiber in the present disclosure, because adjacent first cladding elements are in contact with each other, compared with an existing non-contact structure, a requirement of drawing a hollow-core fiber can be reduced. In addition, the range of $D_1/D_2$ is defined, so that it can be ensured that a confinement loss of the anti-resonant hollow-core fiber is maintained at a satisfying level.

In some embodiments, each of the first cladding elements is selected from a full tube, an arc, a straight wall, and a combination thereof.

In some embodiments, the first cladding elements are first arc-shaped elements with an opening facing the inner surface and having sizes the same as or close to each other, and a quantity of the first cladding elements is 3, 4, or 5. In some embodiments, $D_1/D_2$ is greater than 0.5, 0.6, 0.8, or 1. In these embodiments, a quantity of the first cladding elements and a value range of $D_1/D_2$ are further defined, so that the confinement loss of the anti-resonant hollow-core fiber can be further reduced.

In some embodiments, the first primary nested element is completely nested or partially nested in the first cladding element. In some embodiments, the first primary nested element is any one selected from a full tube, a second arc-shaped element with an opening facing the inner surface, and a straight wall.

In some embodiments, when the first primary nested element is a full tube or the second arc-shaped element, each first primary nested element is further provided with at least one second primary nested element completely nested or partially nested therein.

In some embodiments, when the first primary nested element is a straight wall, each first primary nested element is further provided with at least one second primary nested element nested between the first primary nested element and the inner surface.

In some embodiments, the anti-resonant hollow-core fiber further includes a third primary nested element, where the third primary nested element is nested in the second primary nested element or between the second primary nested element and the inner surface.

In some embodiments, the plurality of first cladding elements include first cladding primary elements and first cladding secondary elements, at least one corresponding first cladding secondary element is provided between any two adjacent first cladding primary elements, at least some first cladding primary elements in the first cladding primary elements are arranged to be in contact with a maximum virtual inscribed circle in the central air region, and none of the first cladding secondary elements is in contact with the maximum virtual inscribed circle.

In some embodiments, the at least one corresponding first cladding secondary element includes one corresponding first cladding secondary element, and the one corresponding first cladding secondary element is respectively in contact with two adjacent first cladding primary elements.

In some embodiments, the at least one corresponding first cladding secondary element includes two corresponding first cladding secondary elements in contact with each other, and the two corresponding first cladding secondary elements are further respectively in contact with adjacent one first cladding primary element.

In some embodiments, a spacing d exists between the any two adjacent first cladding primary elements, a radius of the maximum virtual inscribed circle is a, and the spacing d and a have the following relationship: 0.1<d/a<1.5. In these embodiments, the foregoing value range of d/a can be further used for optimizing the manufacturing of the anti-resonant hollow-core fiber.

In some embodiments, the first cladding primary elements have the same or close shapes and sizes, and are full tubes or approximately full tubes.

In some embodiments, a shape of each of the first cladding secondary elements is the same as or close to shapes of the first cladding primary elements.

In some embodiments, the shape of each of the first cladding secondary elements is different from the shapes of the first cladding primary elements, and is any one selected from an arc-shaped element and a straight wall.

In some embodiments, the first cladding primary elements include at least one primary nested element, and the at least one primary nested element is any one selected from a full tube, an arc-shaped element, and a straight wall.

In some embodiments, if the first cladding secondary element is a full tube or an arc-shaped element with an opening facing the inner surface, the first cladding secondary element includes at least one first secondary nested element.

In some embodiments, if the first cladding secondary element is a straight wall, at least one first secondary nested element located between the first cladding secondary element and the inner surface is further configured in the first cladding secondary element.

In some embodiments, a quantity of the first cladding primary elements and a quantity of the first cladding secondary elements are the same, and are 3, 4, 5, or 6.

In some embodiments, all wall thicknesses of the first cladding elements are substantially the same. In some embodiments, the first cladding elements include different first cladding elements in orthogonal directions, and wall thicknesses of the first cladding elements in the orthogonal directions are different.

In various embodiments in the present disclosure, when more than one values are "substantially the same", it may be defined as a difference between any two values of the more than one values is within 10 percent of the average value of the more than one values.

In some embodiments, the anti-resonant hollow-core fiber supports effective single-mode or multi-mode transmission.

In some embodiments, a loss ratio of a lowest-loss higher-order mode in a fiber core to a fundamental mode in the fiber core is at least one order of magnitude, at least two orders of magnitude, or at least three orders of magnitude.

In some embodiments, all wall thicknesses t of the first cladding elements and all the nested elements satisfy an anti-resonant condition:

$$\frac{\lambda_m \cdot (2m-1)}{4\sqrt{n^2-1}} < t < \frac{\lambda_m \cdot m}{2\sqrt{n^2-1}}, m = 1, 2, 3, \ldots,$$

where $\lambda_m$ is a resonance wavelength, m is an order of an anti-resonant layer, and n is a refractive index of a material of a component forming the first cladding elements.

In some embodiments, a ratio of the radius of the maximum virtual inscribed circle of a fiber core to a wavelength of light guided by the hollow-core fiber ranges from 3 to 40, or from 4.5 to 20.

According to a second aspect of the present disclosure, an anti-resonant hollow-core fiber is provided. The anti-resonant hollow-core fiber includes: an outer jacket tube, provided with an inner surface; and cladding elements, located in the outer jacket tube, and including a plurality of first cladding elements arranged around the inner surface, where any two adjacent first cladding elements in the plurality of first cladding elements are in contact with each other and define a central air region of the anti-resonant hollow-core fiber, and a core mode field of the anti-resonant hollow-core fiber is limited in the central air region, where the plurality of first cladding elements include first cladding primary elements and first cladding secondary elements, at least one corresponding first cladding secondary element is provided between any two adjacent first cladding primary elements, at least some first cladding primary elements in the first cladding primary elements are arranged to be in contact with a maximum virtual inscribed circle in the central air region, and none of the first cladding secondary elements is in contact with the maximum virtual inscribed circle; a spacing d exists between the any two adjacent first cladding primary elements, a radius of the maximum virtual inscribed circle is a, and the spacing d and a have the following relationship: 0.1<d/a<1.5; a distance $D_3$ from a contact point closest to a center point of the maximum virtual inscribed circle between each of the first cladding primary elements and each of the first cladding secondary elements to the maximum virtual inscribed circle and the radius a of the maximum virtual inscribed circle have the following relationship: $D_3/a>0.6$; and the first cladding primary elements include at least one first primary nested element.

It will be understood that through the anti-resonant hollow-core fiber in the second aspect, because adjacent first cladding elements are in contact with each other, compared with an existing non-contact structure, a requirement of drawing a hollow-core fiber can also be reduced. In addition, the parameters d/a and $D_3/a$ are defined, so that it can also be ensured that a confinement loss of the anti-resonant hollow-core fiber is controlled at a satisfying level.

In some embodiments, the first primary nested element is any one selected from a full tube, an arc-shaped element, and a straight wall, and the first primary nested element is completely nested or partially nested in the first cladding primary element.

In some embodiments, the at least one corresponding first cladding secondary element includes one corresponding first cladding secondary element, and the one corresponding first cladding secondary element is respectively in contact with two adjacent first cladding primary elements.

In some embodiments, the at least one corresponding first cladding secondary element includes two corresponding first cladding secondary elements in contact with each other, and the two corresponding first cladding secondary elements are further respectively in contact with adjacent one first cladding primary element.

In some embodiments, the first cladding primary elements have the same shapes and sizes, and are full tubes, approximately full tubes, or arc-shaped elements.

In some examples, $D_3/a>0.8$. In some embodiments, $D_3/a>1$. In some embodiments, the spacing d and a have the following relationship: 0.15<d/a<1.3. In some embodiments, the spacing d and a have the following relationship: 0.15<d/a<1. In these embodiments, value ranges of $D_3/a$ and d/a are further defined, so that a loss level of the anti-resonant hollow-core fiber can be further reduced.

In some embodiments, a shape of each of the first cladding secondary elements is the same as shapes of the first cladding primary elements.

In some embodiments, the shape of each of the first cladding secondary elements is different from the shapes of the first cladding primary elements, and is selected from a full tube, an arc-shaped element, a straight wall, and a combination thereof.

In some embodiments, a second primary nested element is further disposed in each first primary nested element, and the second primary nested element is completely or partially nested in the first primary nested element.

In some embodiments, a third primary nested element is further disposed in each second primary nested element.

In some embodiments, if the first cladding secondary element is a full tube or an arc-shaped element with an opening facing the inner surface, the first cladding secondary element includes at least one first secondary nested element.

In some embodiments, if the first cladding secondary element is a straight wall, at least one first secondary nested element located between the first cladding secondary element and the inner surface is further configured in the first cladding secondary element.

In some embodiments, each first cladding secondary element further includes a first secondary nested element, and each first secondary nested element further includes a second secondary nested element.

In some embodiments, a quantity of the first cladding primary elements and a quantity of the first cladding secondary elements are the same. In some implementations, the quantity of the first cladding primary elements (or the quantity of the first cladding secondary elements) may be larger than one, for non-limiting examples, 2, 3, 4, 5, 6, and etc.

In some embodiments, all wall thicknesses of the first cladding primary elements are approximately the same.

In some embodiments, the first cladding primary elements include different first cladding primary elements in orthogonal directions, and wall thicknesses of the different first cladding primary elements are different.

In some embodiments, the anti-resonant hollow-core fiber supports effective single-mode or multi-mode transmission.

In some embodiments, a loss ratio of a lowest-loss higher-order mode in a fiber core to a fundamental mode in the fiber core is at least one order of magnitude, at least two orders of magnitude, or at least three orders of magnitude.

In some embodiments, all wall thicknesses t of the first cladding primary elements satisfy an anti-resonant condition:

$$\frac{\lambda_m \cdot (2m-1)}{4\sqrt{n^2-1}} < t < \frac{\lambda_m \cdot m}{2\sqrt{n^2-1}}, m = 1, 2, 3, \dots ,$$

where $\lambda_m$ is a resonance wavelength, m is an order of an anti-resonant layer, and n is a refractive index of a material of a component forming the first cladding elements.

In some embodiments, a ratio of the radius of the maximum inscribed circle of a fiber core to a wavelength of light guided by the hollow-core fiber ranges from 3 to 40, or from 4.5 to 20.

It should be further appreciated that the content described in the Summary section is neither intended to identify key or essential features of the embodiments of the present disclosure, nor is it intended to limit the scope of the present disclosure. Other features of the embodiments of the present disclosure will be readily envisaged through the following description.

6

BRIEF DESCRIPTION OF THE DRAWINGS

The foregoing and other features, advantages, and aspects of embodiments of the present disclosure become clearer with reference to the accompanying drawings and with reference to the following detailed descriptions. In the accompanying drawings, same or similar reference numerals represent same or similar elements.

FIG. 6c is a simulation plot of a confinement loss of an anti-resonant hollow-core fiber changing with $D_1/D_2$ using first cladding elements with different radii of curvature as examples in a layout of a four-tube contact structure in FIG. 6a;

FIG. 6e is a simulation plot of a confinement loss changing with a ratio $D_1/D_2$ using given predetermined structural parameters as an example in a layout of a four-tube contact structure in FIG. 6a;

FIG. 6$j$ is a simulation plot of a confinement loss changing with $D_1/D_2$ in cases of different size ratios k of a first primary nested element to a core inscribed circle radius from another angle;

FIG. 6$k$ is a simulation plot of a confinement loss changing with a size ratio k of a radius of a first primary nested element to a core inscribed circle radius when $D_1/D_2$ is equal to 0.93;

FIG. 6$l$ is a simulation plot of a confinement loss changing with a size ratio k of a radius of a first primary nested element to a core inscribed circle radius when $D_1/D_2$ is equal to 0.69;

FIG. 7$b$ is a simulation plot of an impact of different filler materials (for example, air and quartz) in the gap region between the closest contact point between two adjacent first cladding elements and the inner surface of the outer jacket tube on a loss of the anti-resonant hollow-core fiber;

FIG. 9$b$ is an exemplary simulation plot of a confinement loss changing with a wavelength in a structural layout of a variant embodiment of the anti-resonant hollow-core fiber in FIG. 6$a$;

FIG. 10$b$ is an exemplary simulation plot of a confinement loss changing with a wavelength in a layout of a three-tube contact structure in FIG. 10$a$;

FIG. 10$c$ is a variant example of a three-tube contact structure in FIG. 10$a$;

FIG. 10$d$ is an exemplary simulation plot of a confinement loss of an anti-resonant hollow-core fiber changing with $D_1/D_2$ using a first nested component with a given predetermined size as an example in a layout of a three-tube contact structure in FIG. 10$a$;

FIG. 10$e$ is a simulation plot of a confinement loss of an anti-resonant hollow-core fiber changing with $D_1/D_2$ using a first nested component with another given predetermined size as an example in a layout of a three-tube contact structure in FIG. 10$a$;

FIG. 10$f$ is a simulation plot of a confinement loss of an anti-resonant hollow-core fiber changing with $D_1/D_2$ using first cladding elements with different radii of curvature as examples in a layout of a three-tube contact structure in FIG. 10$a$;

FIG. 16$b$ is a simulation plot of a confinement loss changing with $D_1/D_2$ in a layout of a five-tube contact structure in FIG. 16$a$;

FIG. 17$b$, FIG. 17$c$, FIG. 17$d$, and FIG. 17$e$ show variant embodiments of FIG. 17$a$;

FIG. 17$f$ is a schematic structural diagram of two corresponding first cladding secondary elements being provided between any two adjacent first cladding primary elements;

FIG. 17$g$ is a simulation plot of a confinement loss changing with a ratio $D_1/D_2$ in a layout of a contact structure in FIG. 17$a$;

FIG. 17$h$ is a simulation plot of a confinement loss changing with a wavelength in a layout of a contact structure in FIG. 17$a$;

FIG. 17$i$ is a simulation plot of a confinement loss changing with a wavelength in a layout of a contact structure in FIG. 17$g$;

FIG. 18$b$ is a simulation plot of a confinement loss changing with a ratio $D_1/D_2$ in a layout of the structure in FIG. 18$a$;

FIG. 19$b$ is a simulation plot of a confinement loss of the anti-resonant hollow-core fiber in FIG. 19$a$ changing with a wavelength;

FIG. 20$b$ is a simulation plot of a confinement loss of the anti-resonant hollow-core fiber in FIG. 20$a$ changing with d/a;

FIG. 20$c$ is a simulation plot of a confinement loss of the anti-resonant hollow-core fiber in FIG. 20$a$ changing with $D_3/a$;

FIG. 20$d$ is a schematic diagram of a confinement loss of the anti-resonant hollow-core fiber in FIG. 20$a$ changing with a wavelength;

FIG. 22*a* is a comparison simulation plot of confinement losses of the structure (the first cladding primary elements have a same size that is different from sizes of the first cladding secondary elements) in FIG. 20*a* of the anti-resonant hollow-core fiber according to the fifth exemplary embodiment of the present disclosure, the structure (the first cladding primary elements and the first cladding secondary elements have the same size) in FIG. 21*a,* and a four-tube non-contact structure without the first cladding secondary elements in FIG. 22*b* changing with d/a;

FIG. 22*c* is a comparison simulation plot of confinement losses of the structure (the first cladding primary elements have a same size that is different from sizes of the first cladding secondary elements) in FIG. 20*a* of the anti-resonant hollow-core fiber according to the fifth exemplary embodiment of the present disclosure, the structure (the first cladding primary elements and the first cladding secondary elements have the same size) in FIG. 21*a,* and a four-tube non-contact structure without the first cladding secondary elements in FIG. 22*b* changing with $D_3$/a;

FIG. 23*c* is a comparison simulation plot of confinement losses of the anti-resonant hollow-core fiber according to the fifth exemplary embodiment of the present disclosure in cases of a strong contact and a weak contact changing with d/a;

FIG. 23*d* is a comparison simulation plot of confinement losses of the anti-resonant hollow-core fiber according to the fifth exemplary embodiment of the present disclosure in cases of a strong contact and a weak contact changing with $D_3$/a;

FIG. 23*e* is a comparison simulation plot of confinement losses of the anti-resonant hollow-core fiber according to the fifth exemplary embodiment of the present disclosure in different core radii changing with d/a;

FIG. 23*f* is a comparison simulation plot of confinement losses of the anti-resonant hollow-core fiber according to the fifth exemplary embodiment of the present disclosure in different core radii changing with $D_3$/a;

FIG. 26*e* is a comparison simulation plot of confinement losses of the anti-resonant hollow-core fibers according to FIG. 26*a* to FIG. 26*d* changing with d/a;

FIG. 26*f* is a comparison simulation plot of confinement losses of the anti-resonant hollow-core fibers according to FIG. 26*a* to FIG. 26*c* changing with $D_3$/a;

FIG. 27*f* is a simulation plot of an impact of changing a size ratio m of a first primary nested element to a first cladding primary element on effective refractive indexes of a core fundamental mode and a higher-order mode in a case of the anti-resonant hollow-core fiber in FIG. 27a;

FIG. 28a is a simulation plot of an impact of changing a size ratio $n_1$ of a first secondary nested element to a first cladding secondary element on a core fundamental mode and a higher-order mode in a case of the anti-resonant hollow-core fiber in FIG. 27a;

FIG. 28c is a simulation plot of an impact of changing a size ratio $n_1$ of a first secondary nested element to a first cladding secondary element on effective refractive indexes of a core fundamental mode, a higher-order mode, and an inter-tube cavity region mode in a case of the anti-resonant hollow-core fiber in FIG. 27a;

DETAILED DESCRIPTION

Figure 1:
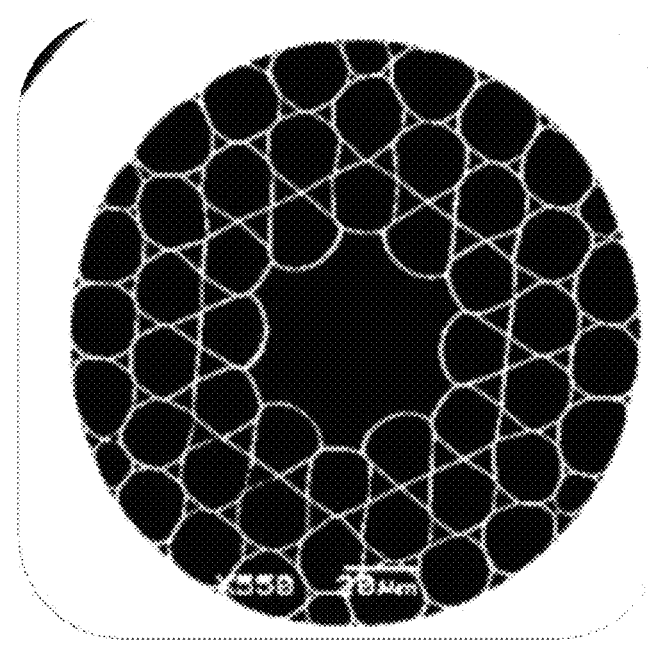
FIG. 1 shows a conventional Kagome configuration of an anti-resonant hollow-core fiber.

The present disclosure will now be described in detail hereinafter with reference to the accompanied drawings, which form a part of the present disclosure, and which show, by way of illustration, specific examples of embodiments. Please note that the present disclosure may, however, be embodied in a variety of different forms and, therefore, the covered or claimed subject matter is intended to be construed as not being limited to any of the embodiments to be set forth below.

Throughout the specification and claims, terms may have nuanced meanings suggested or implied in context beyond an explicitly stated meaning. Likewise, the phrase "in one embodiment" or "in some embodiments" as used herein does not necessarily refer to the same embodiment and the phrase "in another embodiment" or "in other embodiments" as used herein does not necessarily refer to a different embodiment. The phrase "in one implementation" or "in some implementations" as used herein does not necessarily refer to the same implementation and the phrase "in another implementation" or "in other implementations" as used herein does not necessarily refer to a different implementation. It is intended, for example, that claimed subject matter includes combinations of exemplary embodiments or implementations in whole or in part.

In general, terminology may be understood at least in part from usage in context. For example, terms, such as "and", "or", or "and/or," as used herein may include a variety of meanings that may depend at least in part upon the context in which such terms are used. Typically, "or" if used to associate a list, such as A, B or C, is intended to mean A, B, and C, here used in the inclusive sense, as well as A, B or C, here used in the exclusive sense. In addition, the term "one or more" or "at least one" as used herein, depending at least in part upon context, may be used to describe any feature, structure, or characteristic in a singular sense or may be used to describe combinations of features, structures or characteristics in a plural sense. Similarly, terms, such as "a", "an", or "the", again, may be understood to convey a singular usage or to convey a plural usage, depending at least in part upon context. In addition, the term "based on" or "determined by" may be understood as not necessarily intended to convey an exclusive set of factors and may, instead, allow for existence of additional factors not necessarily expressly described, again, depending at least in part on context.

The following describes embodiments of the present disclosure in detail with reference to the accompanying drawings. Although some embodiments of the present disclosure are shown in the accompanying drawings, it should be understood that the present disclosure may be implemented in various forms, and should not be construed as being limited to the embodiments described herein. On the contrary, these embodiments are provided so that the present disclosure will be thoroughly and completely understood. It should be understood that the accompanying drawings and embodiments of the present disclosure are merely used as examples, but are not intended to limit the scope of protection of the present disclosure.

As described above, anti-resonant hollow-core fibers have important application prospect in many fields, especially in the field of optical fiber communication. In retrospect of the development history of anti-resonant hollow-core fibers, it is found that anti-resonant hollow-core fibers have been through a development process from a Kagome configuration in FIG. 1 to a single-circle non-contact configuration in FIG. 2, then to a contact nested configuration in FIG. 3, and next to a non-contact nested configuration in FIG. 4.

In the foregoing existing configurations, when a contact point exists between tubes in an optical fiber, Fano oscillation occurs at a position of the contact point. The Fano oscillation is coupled to a core fundamental mode field to generate an oscillation peak in a loss spectrum. The foregoing Kagome configuration is a contact structure, in which a contact point is at a distance away from a fiber core for the purpose of reducing a loss. However, the loss is still 40 db/km, and it is impossible to implement a loss below 1 db/km. A quantity of anti-resonant layers in the foregoing single-circle non-contact configuration is excessively small, and a loss is approximately 10 db/km. A contact point is excessively close to a fiber core in the foregoing contact nested configuration, a number of oscillation peaks are generated, and a loss is also greater than 1 db/km. Only in the foregoing non-contact nested configuration, when a ratio of a spacing between tube units to a core radius is less than 0.4, a loss can be reduced below 0.1 db/km.

Figure 5:
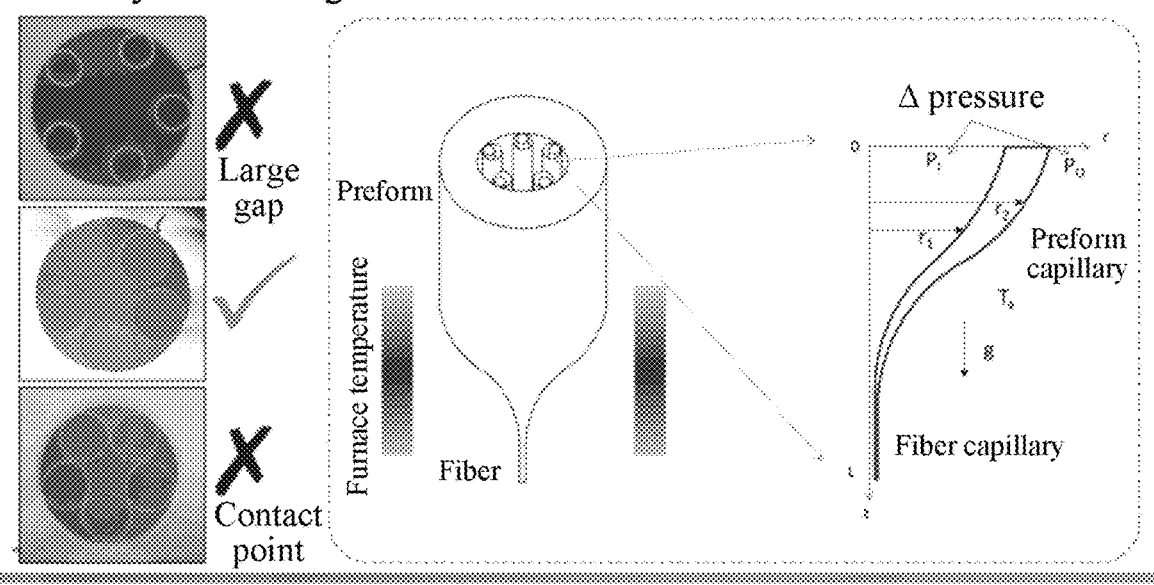
FIG. 5 is a schematic diagram of drawing a preform into a non-contact nested configuration.

However, in the research of fluid dynamics of actual drawing, the inventor finds that mass production of a non-contact structure with a small inter-tube gap is difficult. The reason is a mid draw contact problem in a furnace. To be specific, capillaries are small and thick during entry into a high-temperature furnace, and need to be expanded by increasing a gas pressure to form a non-contact structure with a small gap, Specifically, in an initial stage of a drawing process, the gas pressure dominates, and a capillary structure expands. However, in a later half part of drawing, surface tension starts to dominate, and the capillaries contract. If the capillaries are already in contact in a central part of the high-temperature furnace, and cannot be separated when the capillaries are moved to a lower part. If the capillaries are kept from being in contact, when the capillaries are moved to the lower part, due to a temperature drop, the capillaries contract, and the gaps expand. Therefore, very high tension is required to draw a non-contact structure, and fiber breakage often occurs. In addition, when a size ratio of a preform to an optical fiber, i.e., a draw down ratio, is larger, a gap between capillaries is larger, and the draw down ratio directly determines the yield. Due to the impacts of fiber breakage, a preform size, and a requirement of a small gap, at present, the actual maximum yield is 15 kilometers, and some articles predict that the maximum yield is 100 kilometers, which, however, is far away from the yield of 1,000 kilometers to 10,000 kilometers of conventional optical fibers. FIG. 5 is a schematic diagram of drawing a preform into a non-contact nested configuration.

To resolve the foregoing difficult problem of drawing and ensure that an anti-resonant hollow-core fiber has a sufficiently low loss, the present disclosure provides a novel anti-resonant hollow-core fiber, including: an outer jacket tube, provided with an inner surface; and cladding elements, located in the outer jacket tube, and including a plurality of first cladding elements arranged around the inner surface, where any two adjacent first cladding elements in the plurality of first cladding elements are in contact with each other and define a central air region of the anti-resonant hollow-core fiber, and a core fundamental mode field of the anti-resonant hollow-core fiber is limited in the central air region, where one of the following is applicable: a contact point closest to a center point of the core fundamental mode field exists between the any two adjacent first cladding elements, and a ratio of a distance $D_1$ from the closest contact point to a closest boundary of the core fundamental mode field to a distance $D_2$ from the closest boundary to the center point of the core fundamental mode field has the following relationship: $D_1/D_2>0.46$; a boundary of the core fundamental mode field is defined by an intensity being $1/e^2$ of an intensity at the center point of the core fundamental mode field, and a center point of a square of the intensity of the core fundamental mode field is a peak value point of a square of an intensity of a fundamental mode electric field; or the plurality of first cladding elements include first cladding primary elements and first cladding secondary elements, at least one corresponding first cladding secondary element is provided between any two adjacent first cladding primary elements, first cladding primary elements are arranged to be in simultaneous contact with a maximum virtual inscribed circle in the central air region, and none of the first cladding secondary elements is in contact with the maximum virtual inscribed circle; a spacing d exists between the any two adjacent first cladding primary elements, a radius of the maximum virtual inscribed circle is a, and the spacing d and a have the following relationship: $0.1<d/a<1.5$, and a distance $D_3$ from a contact point closest to a center point of the core mode field between each of the first cladding primary elements and each of the first cladding secondary elements to the maximum virtual inscribed circle and the radius a of the maximum virtual inscribed circle have the following relationship: $D_3/a>0.6$; and the first cladding elements or the first cladding primary elements include at least one nested element.

It will be understood that the drawing difficulty is significantly reduced by defining that any two adjacent first cladding elements in cladding elements of a fiber core are in contact with each other. In addition, the anti-resonant hollow-core fiber can have a sufficiently low loss by defining the ratio of $D_1$ to $D_2$, the ratio of the spacing d to the radius a of the maximum virtual inscribed circle, and/or the ratio relationship of $D_3$ to the radius a of the maximum virtual inscribed circle above.

Exemplary embodiments of an anti-resonant hollow-core fiber according to the concept of the present disclosure are described below with reference to the accompanying drawings.

First Exemplary Embodiment

Figure 6A:
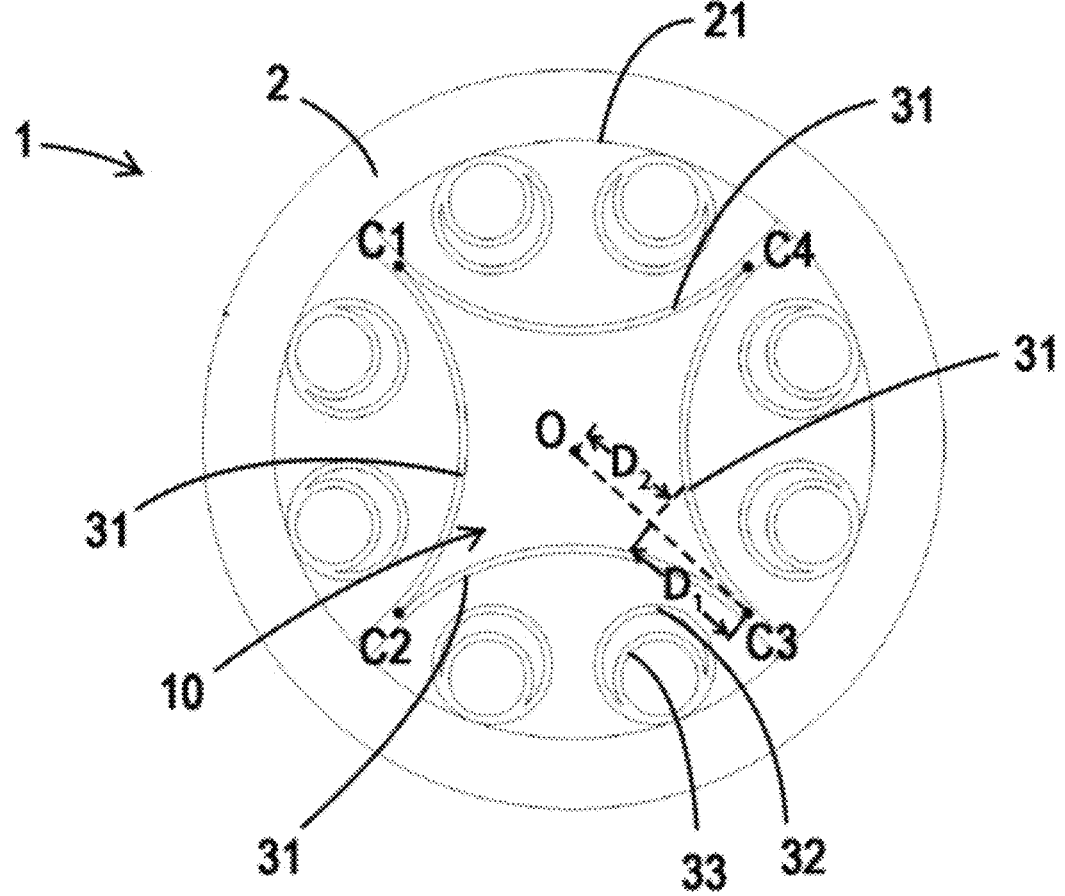
FIG. 6a is a schematic diagram of a typical structure of an anti-resonant hollow-core fiber according to a first exemplary embodiment of the present disclosure.

FIG. 6*a* is a schematic diagram of a typical structure of an anti-resonant hollow-core fiber according to a first exemplary embodiment of the present disclosure.

As shown in FIG. 6*a*, the anti-resonant hollow-core fiber 1 may include an outer jacket tube 2 and cladding elements located inside the outer jacket tube 2.

The outer jacket tube 2 is provided with an inner surface 21, and the cladding elements may include a plurality of first cladding elements 31 arranged around the inner surface 21.

According to the design of the present disclosure, any two adjacent first cladding elements in the plurality of first cladding elements 31 are in contact with each other and define a central air region 10 of the anti-resonant hollow-core fiber 1, and a core fundamental mode field (for example, including a core fundamental mode and a core higher-order mode) of the anti-resonant hollow-core fiber is limited in the central air region 10. Each of the first cladding elements 31 may be further provided with at least one first primary nested element 32. According to some embodiments of the present disclosure, the first cladding elements 31 are all first arc-shaped elements with an opening facing the inner surface and having sizes the same as or close to each other. Particularly, a quantity of the first cladding elements 31 may be 3, 4, or 5.

As an example only, FIG. 6*a* shows four first cladding elements 31. The four first cladding elements 31 are all first arc-shaped elements with an opening facing the inner surface and having sizes same as each other. Therefore, the first exemplary embodiment in FIG. 6*a* may also be referred to as a four-tube contact structure. In further embodiments of the present disclosure, as an example, the first primary nested element may be a full tube, a second arc-shaped element with an opening facing the inner surface, or a straight wall. In the example in FIG. 6*a*, the first primary nested element 32 is a full tube, and each of the first cladding elements 31 is provided with two first primary nested elements 32.

Furthermore, when the first primary nested element 32 is a full tube (for example, referring to FIG. 6*a*) or a second arc-shaped element, the first primary nested element 32 may further be provided with at least one second primary nested element 33 nested therein. When the first primary nested element 32 is a straight wall (for example, referring to FIG. 9*a* below), the first primary nested element 32 may further be provided with at least one second primary nested element 33 nested between the first primary nested element 32 and the inner surface 21. The second primary nested element 33 may still be selected from a full tube, an arc-shaped element, and a straight wall. For example, in the example in FIG. 6*a*, the second primary nested element 33 is still a full tube, and in the example in FIG. 9*a* to be described below, the second primary nested element 33 may be a straight wall.

In various embodiments in the present disclosure, a "full tube" may refer to a "closed full tube". The full tube's cross-section which is perpendicular to its longitudinal axis may be a "closed" shape whose side(s) include curved or straight wall(s), for example but not limited to, a circular shape, an ellipical shape, an oval shape, a "D" shape, a "O" shape, a rectangular shape, a square shape, a triangle shape, a hexagon shape, etc.

It should be understood that a nested arrangement (including a quantity of layers, and shapes of nested elements) in the first cladding element 31 are selected according to a requirement of an anti-resonant design. Therefore, a person skilled in the art may select an appropriate nested arrangement (including the quantity of layers, and the shapes and sizes of the nested elements) according to an actual requirement. For example, in some embodiments, a quantity of nested layers in the first cladding element 31 may be greater than or less than 2.

Further, because any two adjacent first cladding elements in the plurality of first cladding elements 31 are in contact with each other, a contact point closest to a center point O of the core fundamental mode field may exist between the any two adjacent first cladding elements 31. For example, in the example in FIG. 6a, any two adjacent first cladding elements 31 in the four first cladding elements 31 are in contact with each other, and four contact points closest to the center point O of the core fundamental mode field exist, and are, for example, C1, C2, C3, and C4.

According to the design of the present disclosure, a ratio of a distance $D_1$ from the closest contact point (for example, C1, C2, C3, or C4) to a closest boundary of the core fundamental mode field to a distance $D_2$ from the closest boundary to the center point of the core fundamental mode field may have the following relationship: $D_1/D_2 > 0.46$. The boundary of the core fundamental mode field is defined by an intensity being $1/e^2$ of an intensity at the center point of the core fundamental mode field, and a center point of a square of an intensity of the core fundamental mode field is a peak value point of a square of an intensity of a fundamental mode electric field. Note: The closest boundary of the core fundamental mode field may be, for example, seen more clearly from a common end point of $D_1$ and $D_2$ in (a) to (c) of FIG. 6b below.

It is found through simulation that the ratio relationship $D_1/D_2 > 0.46$ can effectively restrict Fano oscillation caused by contact between two adjacent first cladding elements at a sufficiently low level, thereby ensuring that the anti-resonant hollow-core fiber has a sufficiently low loss (for example, a confinement loss down to 1 db/km), and can effectively use contact between any two adjacent first cladding elements to reduce the difficulty of drawing.

In some embodiments, specific structural parameters (including, but not limited to, a distance from the closest contact point to the inner surface of the outer jacket tube, a diameter of a maximum virtual inscribed circle in the central air region, wall thicknesses of components in the cladding elements, a curvature of the first arc-shaped element, and a size of the first primary nested element with respect to the first cladding element) and a specific structural layout (including, but not limited to, the nested arrangement, and an arrangement of a quantity of anti-resonant layers) of the anti-resonant hollow-core fiber may be adjusted to adjust the ratio $D_1/D_2$ and/or reduce the confinement loss.

Figure 6B:
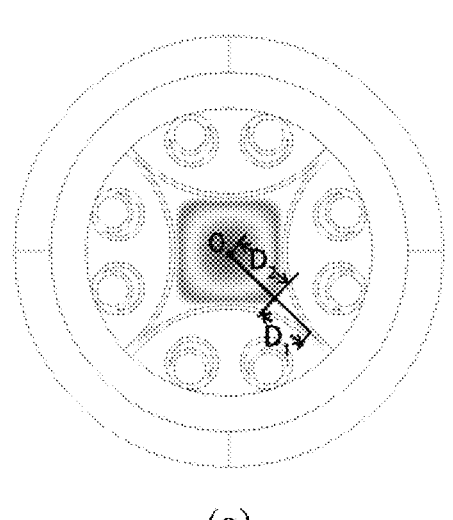
FIG. 6b shows an example of changing a structure of an anti-resonant hollow-core fiber by adjusting a distance of a closest contact point with respect to an inner surface of an outer jacket tube, where in (a) to (c) in FIG. 6b, a size of a core mode field remains unchanged, a distance $D_1$ from the closest contact point to a closest boundary of the core fundamental mode field and a distance $D_2$ from the closest boundary to a center point of the core fundamental mode field both remain unchanged, a curvature of a first arc-shaped element is also kept unchanged, the distance of the closest contact point with respect to the inner surface of the outer jacket tube gradually increases, and sizes of both a nested tube and the outer jacket tube correspondingly increase.
Figure 6B:
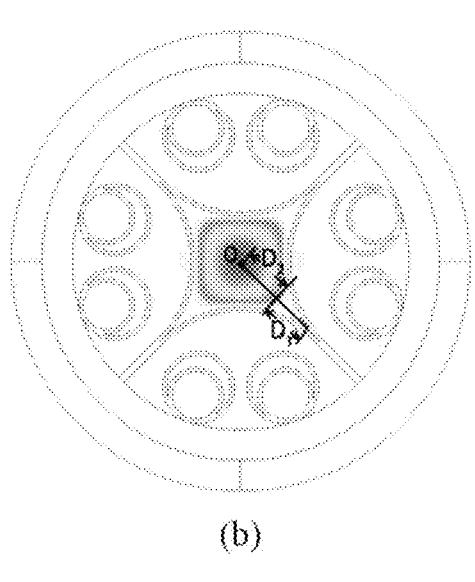
Figure 6B:
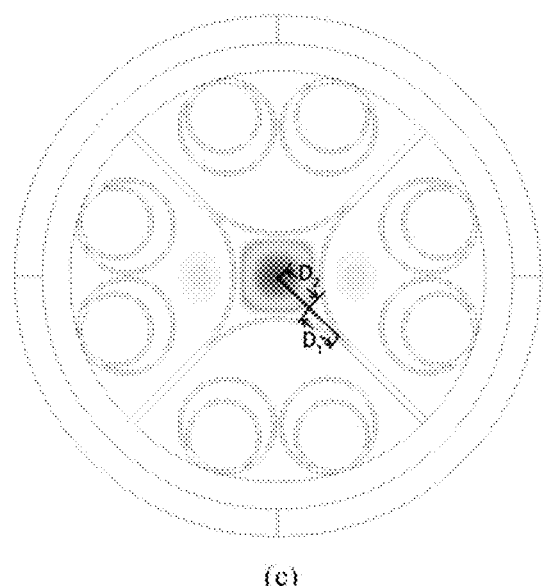

FIG. 6b shows an example of changing a structure of the anti-resonant hollow-core fiber by adjusting the distance of the closest contact point with respect to the inner surface of the outer jacket tube, where in (a) to (c) in FIG. 6b, a size of a core mode field remains unchanged, the distance $D_1$ from the closest contact point to the closest boundary of the core fundamental mode field and the distance $D_2$ from the closest boundary to the center point of the core fundamental mode field both remain unchanged, the curvature of the first arc-shaped element is also kept unchanged, the distance of the closest contact point with respect to the inner surface of the outer jacket tube gradually increases, and sizes of both a nested tube and the outer jacket tube correspondingly increase.

In some embodiments, the ratio $D_1/D_2$ may be adjusted by simply changing only a distance from the closest contact point to the inner surface of the outer jacket tube while keeping other structural parameters unchanged.

Figure 3:
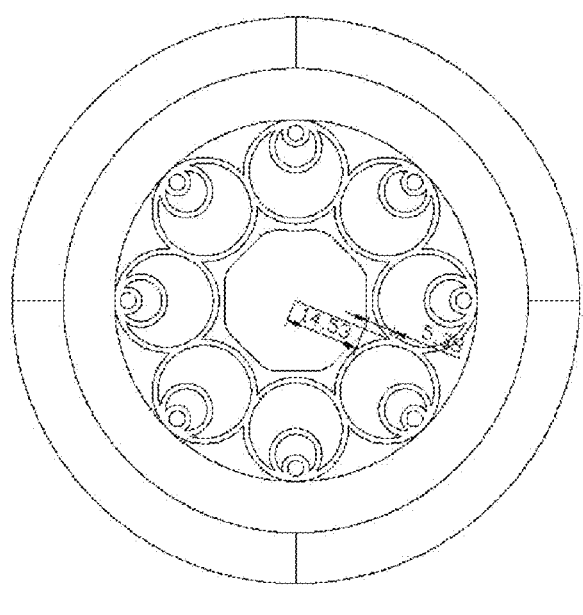
FIG. 3 shows a conventional contact nested configuration of an anti-resonant hollow-core fiber.
Figure 4:
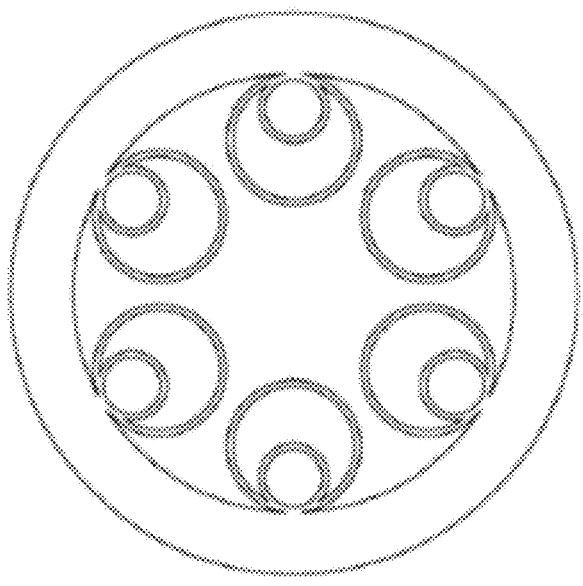
FIG. 4 shows a conventional non-contact nested configuration of an anti-resonant hollow-core fiber.
Figure 6C:
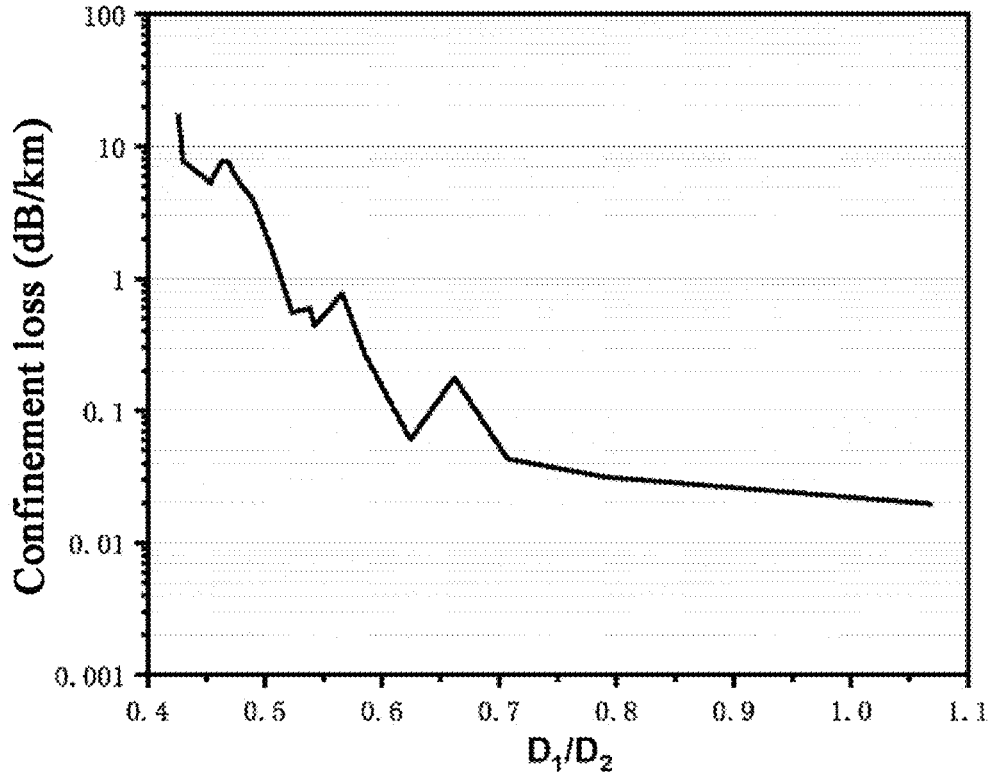
Figure 6D:
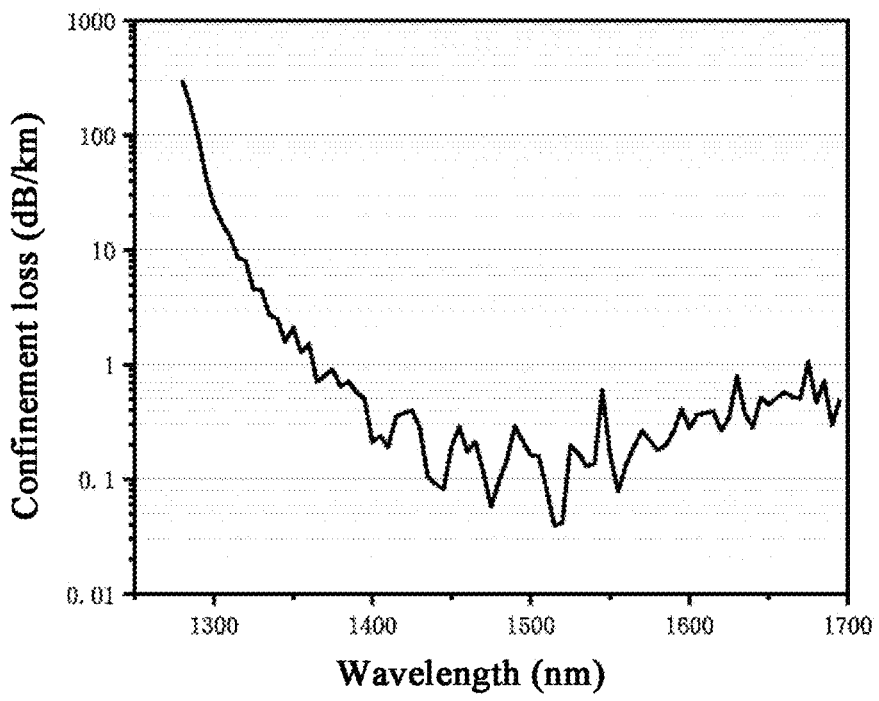
FIG. 6d is a simulation plot of a confinement loss changing with a wavelength when $D_1/D_2$ is given.

FIG. 6c is a simulation plot of a confinement loss changing with the ratio $D_1/D_2$ in a layout of the four-tube contact structure in FIG. 6a. The distance from the closest contact point to the inner surface of the outer jacket tube is adjusted by changing the curvature of the first arc-shaped element, to change the ratio $D_1/D_2$. When $D_1/D_2$ is equal to 0.5, the confinement loss is less than 1 db/km. Correspondingly, FIG. 6d is a simulation plot of a confinement loss changing with a wavelength when $D_1/D_2$ is equal to 0.63. As can be seen from FIG. 6d, within an expected wavelength range (for example, from 1350 nm to 1700 nm), the anti-resonant hollow-core fiber in the present disclosure can be kept at a low confinement loss level, for example, lower than 1 db/km. Although Fano resonance is formed in the anti-resonant hollow-core fiber in the present disclosure to cause oscillation, the extent is at an order of magnitude less than 0.1 db/km. As a comparison, return to refer to the Kagome configuration in FIG. 1 and the contact nested configuration in FIG. 3. Through measurement, the ratio $D_1/D_2$ in FIG. 1 is approximately 0.32, and the ratio $D_1/D_2$ in FIG. 3 is approximately 0.37, both of which cannot effectively reduce a loss caused by Fano oscillation.

Although the impact of the ratio $D_1/D_2$ on the confinement loss of the anti-resonant hollow-core fiber is described above, it should be understood that in addition to the ratio $D_1/D_2$, the individual adjustment of other structural parameters (including, but not limited to, the distance from the closest contact point to the inner surface of the outer jacket tube, the diameter of the maximum virtual inscribed circle in the central air region, the wall thicknesses of the components in the cladding elements, and a size of the first primary nested element with respect to the first cladding element) and the specific structural layout (including, but not limited to, the nested arrangement, and an arrangement of a quantity of anti-resonant layers) of the anti-resonant hollow-core fiber also generates an impact on a loss of the core fundamental mode field (for example, the core fundamental mode) in the anti-resonant hollow-core fiber.

Figure 6E:
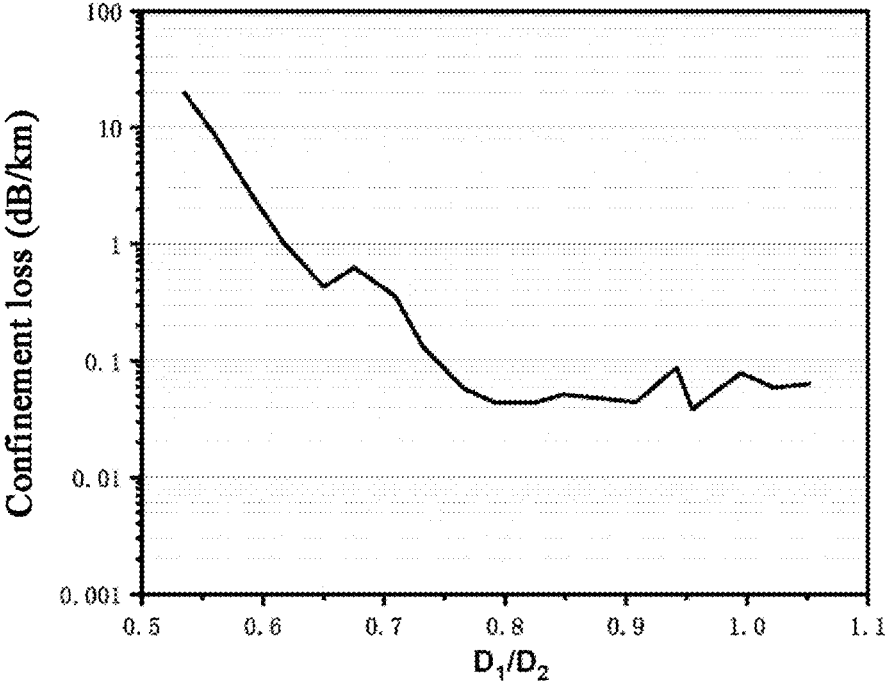

FIG. 6e is a simulation plot of a confinement loss changing with a ratio $D_1/D_2$ using given predetermined structural parameters as an example in the layout of the four-tube contact structure in FIG. 6a. The diameter of the maximum virtual inscribed circle in the central air region of the anti-resonant hollow-core fiber is 30 μm, and wall thicknesses of tube components in the cladding elements are 1.1 μm. $D_1/D_2$ is changed by making a contact point move toward a fiber core. In FIG. 6e, when $D_1/D_2$ is equal to 0.62, the loss may be reduced to 1 db/km, and as $D_1/D_2$ increases, the loss may gradually decrease.

Figure 6F:
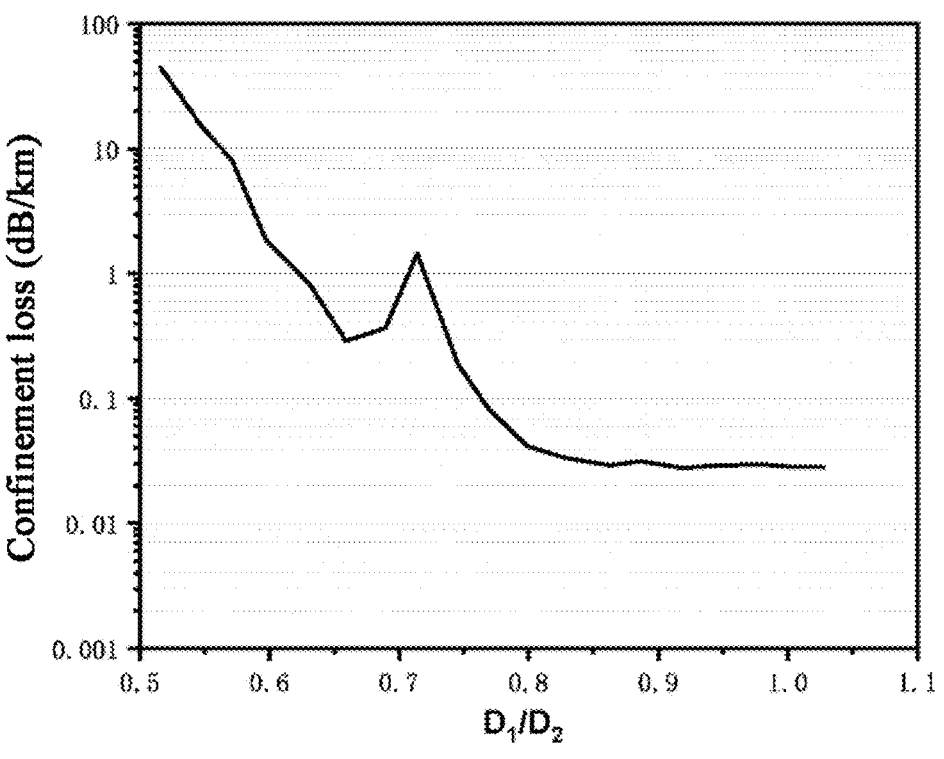
FIG. 6f is a simulation plot of a confinement loss changing with a ratio $D_1/D_2$ using other given predetermined structural parameters as an example in a layout of a four-tube contact structure in FIG. 6.

FIG. 6f is a simulation plot of a confinement loss changing with a ratio $D_1/D_2$ using other given predetermined structural parameters as an example in the layout of the four-tube contact structure in FIG. 6a. The diameter of the maximum virtual inscribed circle in the central air region of the anti-resonant hollow-core fiber is 30 μm, and the wall thicknesses of the components in the cladding elements are 1.2 μm. $D_1/D_2$ is changed by making a contact point move toward a fiber core. In FIG. 6f, when $D_1/D_2$ is equal to 0.62, the loss may be reduced to 1 db/km, and as $D_1/D_2$ increases, the loss may gradually decrease. When $D_1/D_2$ is equal to 0.73, the loss slightly rebounds to exceed 1 db/km.

Figure 6G:
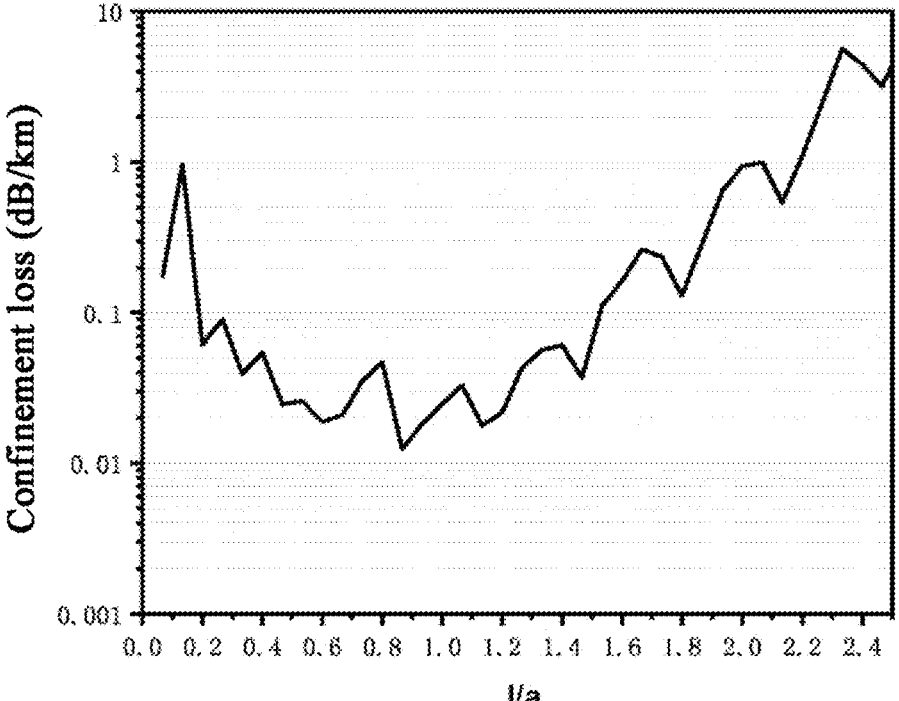
FIG. 6g is a simulation plot of an impact on a confinement loss by changing a ratio of a distance 1 from the closest contact point to the outer jacket tube to a radius a of a maximum virtual inscribed circle while $D_1/D_2$ is kept unchanged in a layout of a four-tube contact structure in FIG. 6a; (a) to (e) in FIG. 6h show variant examples of a structure of a ratio k of a radius of a first primary nested element in a first cladding element in the anti-resonant hollow-core fiber in FIG. 6a to a core inscribed circle radius gradually increasing.

FIG. 6g is a simulation plot of an impact on a confinement loss by changing a ratio of a distance 1 from the closest contact point to the outer jacket tube to a radius a of the maximum virtual inscribed circle while $D_1/D_2$ is kept unchanged in the layout of the four-tube contact structure in FIG. 6a. When 1/a is equal to 0, it indicates that the distance 1 from the closest contact point to the outer jacket tube is equal to 0, which is usually a case that the closest contact point between two adjacent first cladding elements is in contact with the inner surface of the outer jacket tube. When the value of 1/a is larger, it indicates that the distance 1 from the closest contact point to the outer jacket tube is larger with respect to the radius a of the maximum virtual inscribed circle. As shown in FIG. 6g, as the ratio 1/a increases, the confinement loss first starts to gradually decrease, and then gradually increases. Particularly, while $D_1/D_2$ is kept constant, when 1/a is within a range from 0.2 to 1.6, the confinement loss of the anti-resonant hollow-core fiber is within a minimum level range.

Figure 6H:
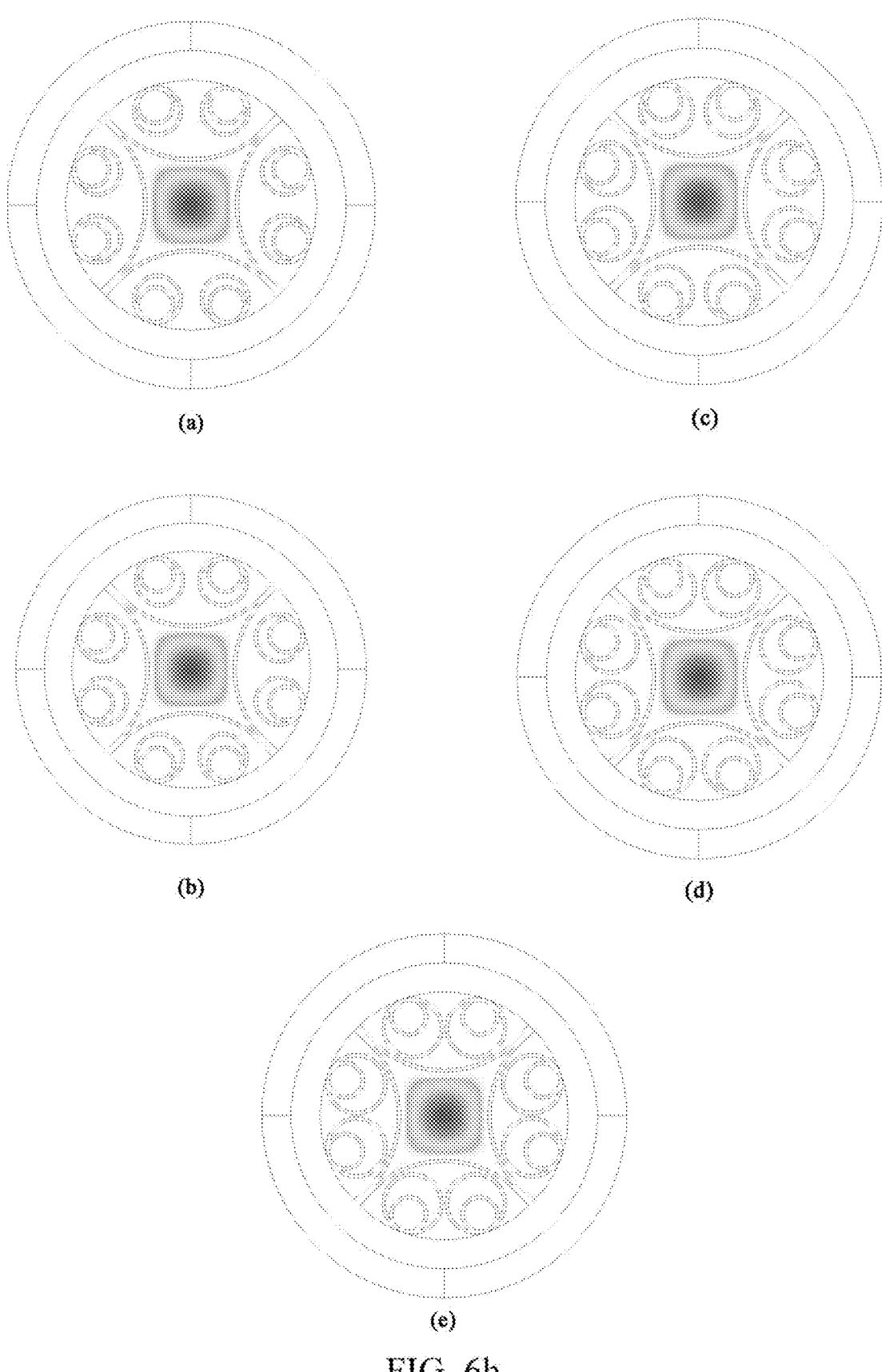

(a) to (e) in FIG. 6h show variant examples of a structure of a size ratio k of the first primary nested element in the first cladding element in the anti-resonant hollow-core fiber in FIG. 6a to the first cladding element gradually increasing.

Figure 6I:
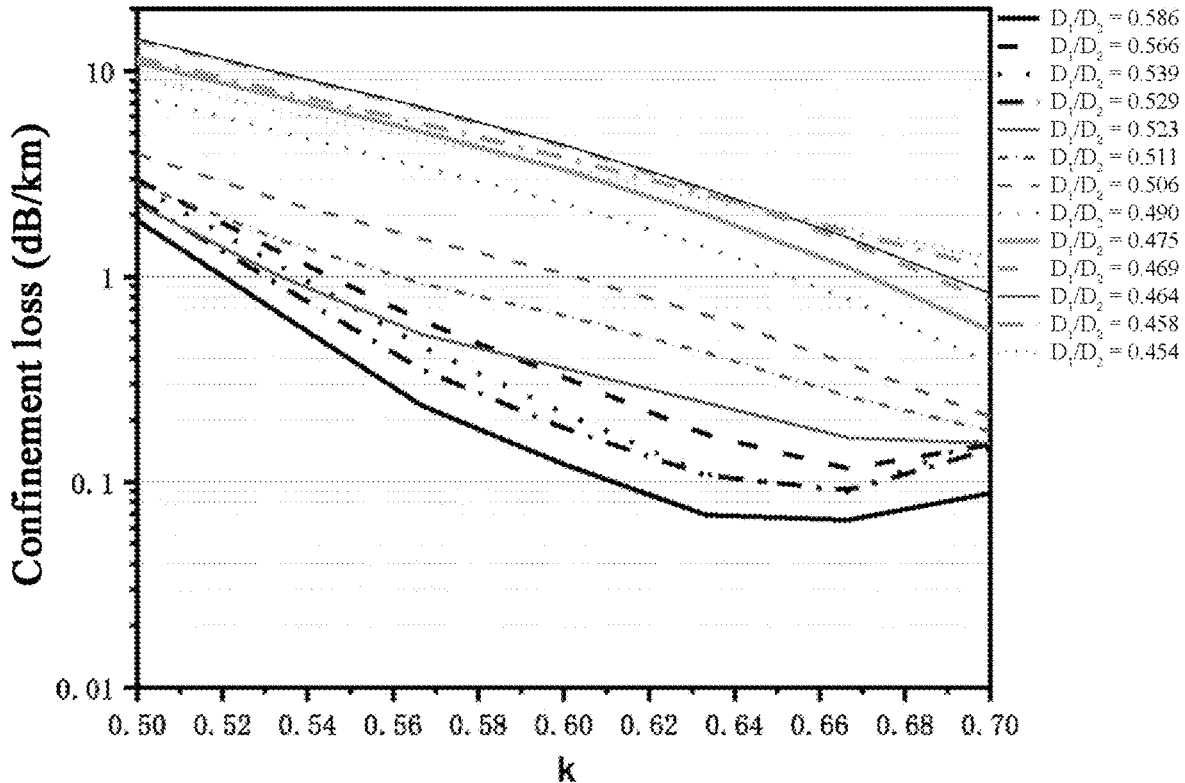
FIG. 6i is a simulation plot of a confinement loss changing with a size ratio k of a radius of a first primary nested element to a core inscribed circle radius in cases of different $D_1/D_2$.
Figure 6J:
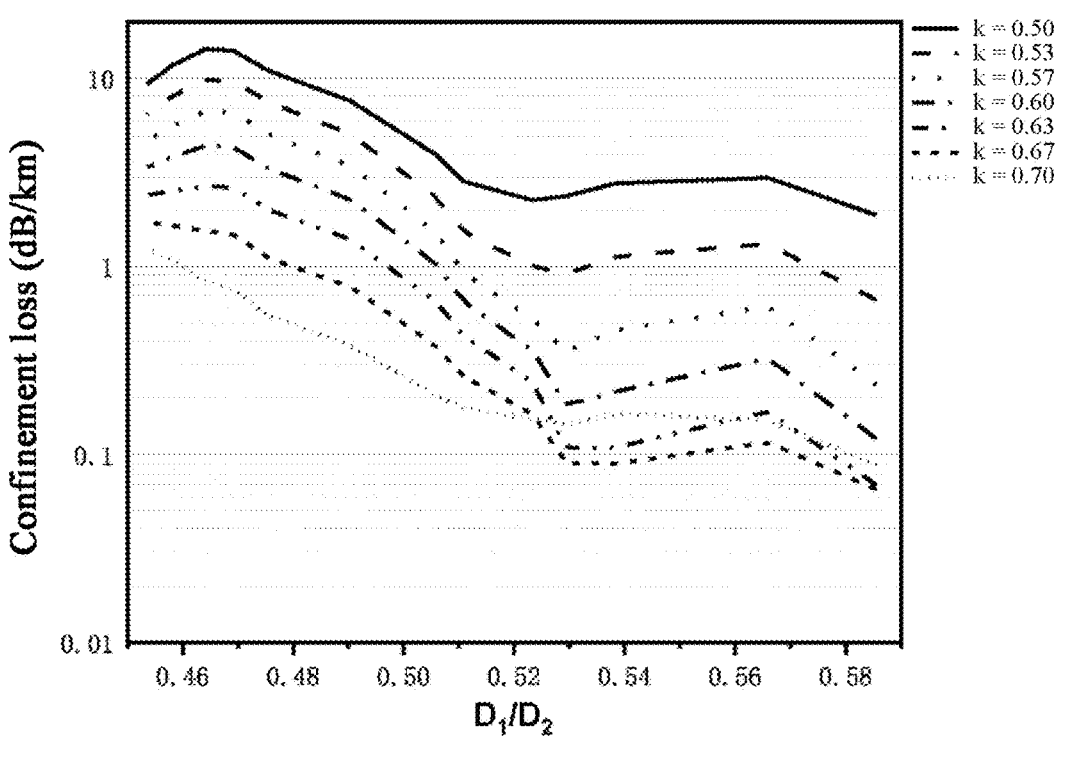

FIG. 6i is a simulation plot of a confinement loss changing with the size ratio k of the first primary nested element to the first cladding element in cases of different $D_1/D_2$. FIG. 6j is a simulation plot of a confinement loss changing with $D_1/D_2$ in cases of different size ratios k of the first primary nested element to the first cladding element from another angle.

As can be seen from FIG. 6i and FIG. 6j, in an embodiment in which the ratio $D_1/D_2$ (for example, $0.46<D_1/D_2<0.59$) is small, as the size ratio k of the first primary nested element to the first cladding element increases, the confinement loss gradually decreases, and typically the confinement loss may be controlled to be approximately 1 db/km or lower. That is, when $D_1/D_2$ is small, the first primary nested element is preferably larger with respect to the first cladding element. In addition, as can be seen from FIG. 6j, an appropriate size ratio k of the first primary nested element to the first cladding element is selected, for example, it is selected that k is greater than 0.7, it can be implemented that even if the ratio $D_1/D_2$ is down to 0.46, it can still be ensured that the confinement loss is approximately 1 db/km or lower.

Figure 6K:
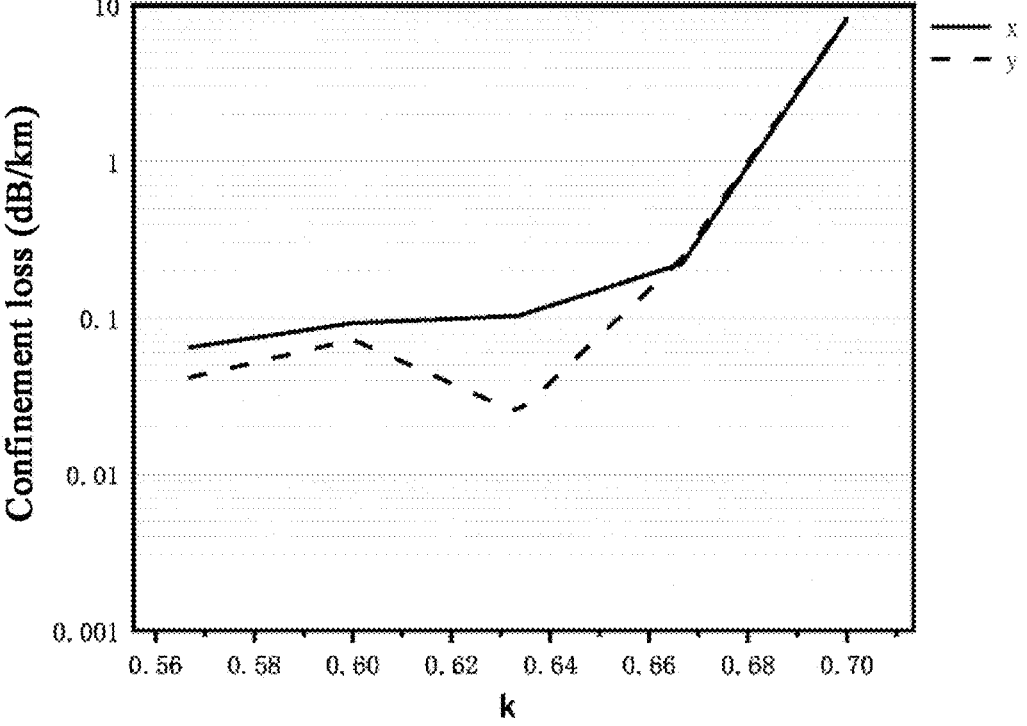
Figure 6L:
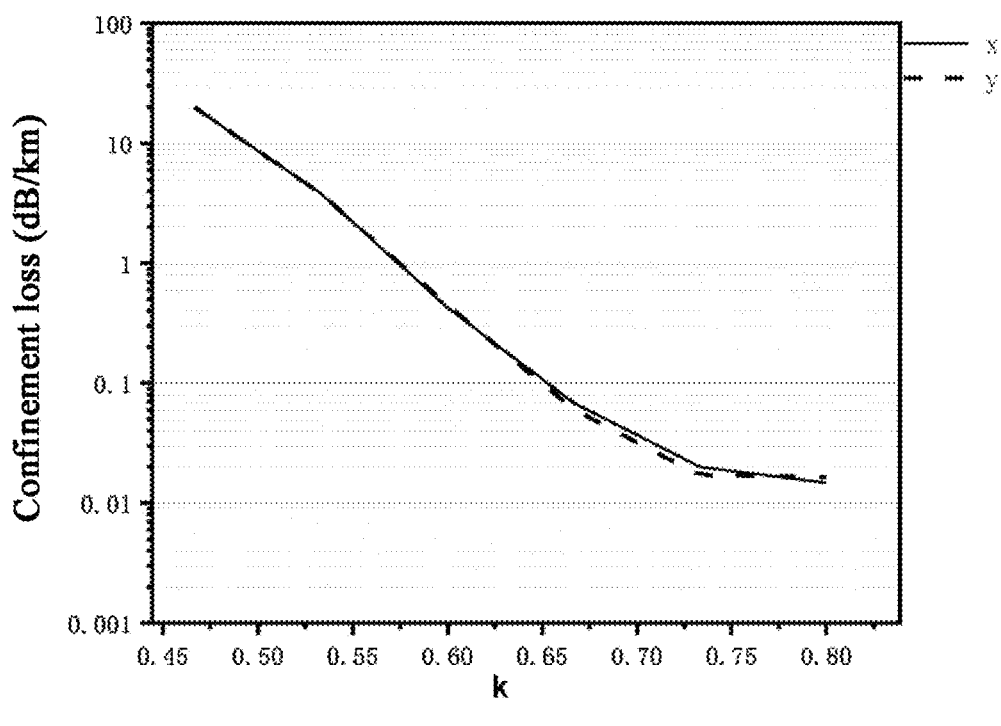

In addition, in an embodiment in which the ratio $D_1/D_2$ is large (for example, $D_1/D_2>0.6$), it may be preferable to select that the size ratio k of the first primary nested element to the first cladding element is an intermediate ratio (for example, $0.55<k<0.68$). FIG. 6k is a simulation plot of a confinement loss changing with a size ratio of the first primary nested element to the first cladding element when $D_1/D_2$ is equal to 0.93. As shown in FIG. 6k, as the size ratio k is greater than 0.68, the confinement loss rapidly increases. FIG. 6l is a simulation plot of a confinement loss changing with the size ratio k of the first primary nested element to the first cladding element when $D_1/D_2$ is equal to 0.69. As shown in FIG. 6l, as the size ratio k is less than 0.55, the confinement loss rapidly increases.

Figure 7A:
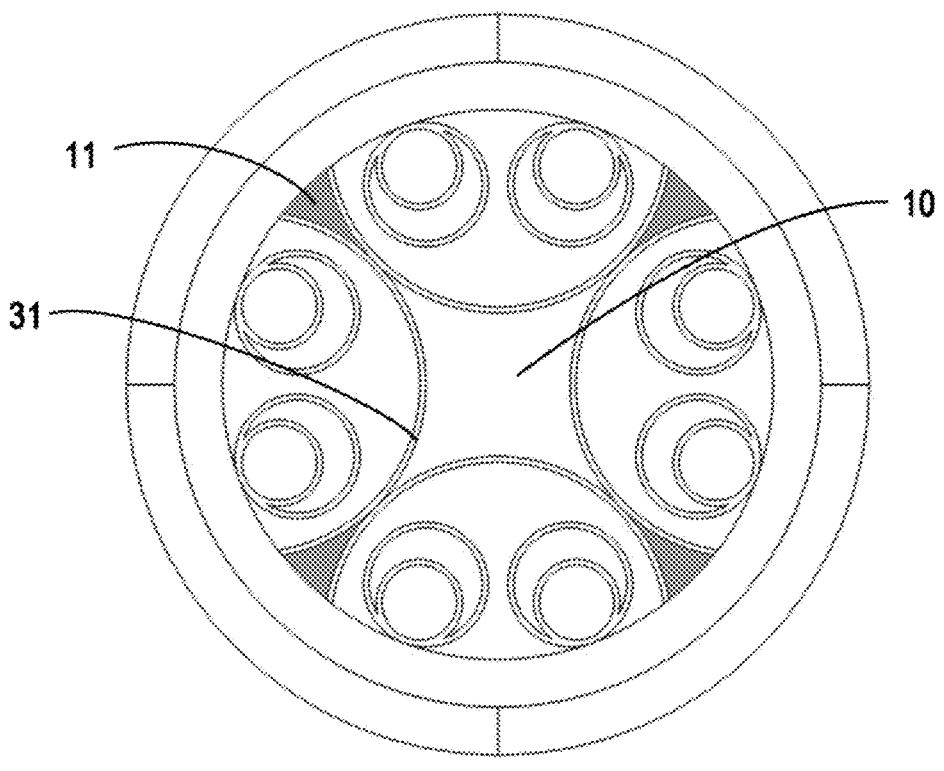
FIG. 7$a$ shows an example of a structure in which a gap region exists between a closest contact point between two adjacent first cladding elements of an anti-resonant hollow-core fiber and an inner surface of an outer jacket tube in the present disclosure.

In an optimal state, the closest contact point between two adjacent first cladding elements and the inner surface of the outer jacket tube are in tight contact, i.e., no air gap exists. However, in an actual drawing process, as shown in FIG. 7a, a gap region 11 between the closest contact point between two adjacent first cladding elements and the inner surface of the outer jacket tube may be filled by air or a tube wall material, for example, quartz. The simulation shows that a filler material in the gap region 11 also has an impact on the loss of the anti-resonant hollow-core fiber.

Figure 7B:
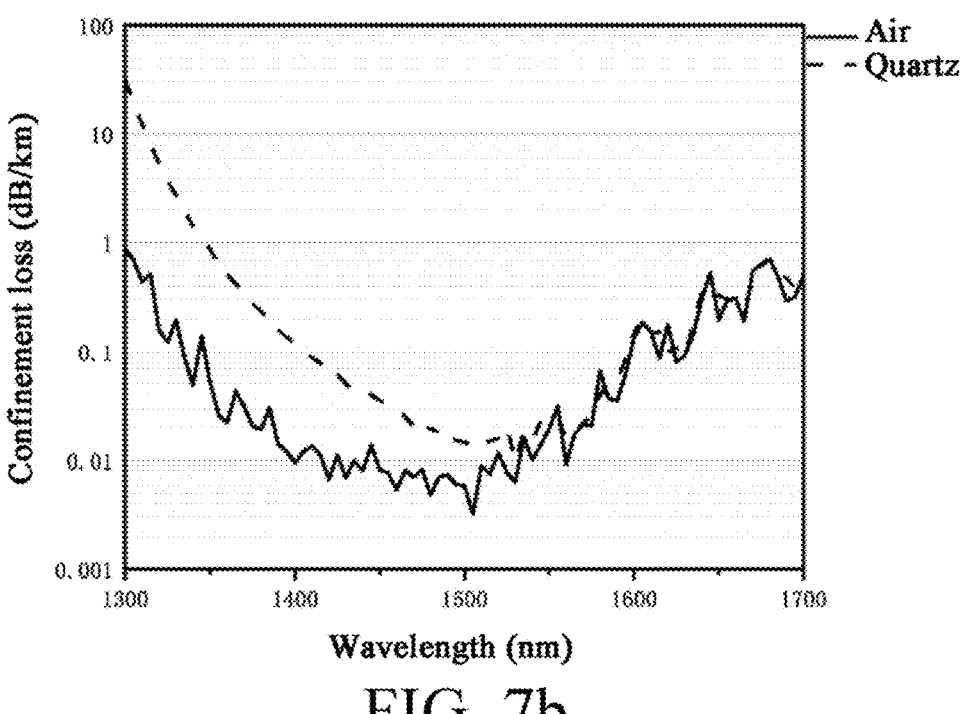

FIG. 7b is a simulation plot of an impact of different filler materials (for example, air and quartz) in the gap region between the closest contact point between two adjacent first cladding elements and the inner surface of the outer jacket tube on a loss of the anti-resonant hollow-core fiber. As shown in FIG. 7b, within a wavelength range of 1300 nm to 1500 nm, the gap region filled with air may have a lower loss than the gap region filled with, for example, quartz.

Figure 8:
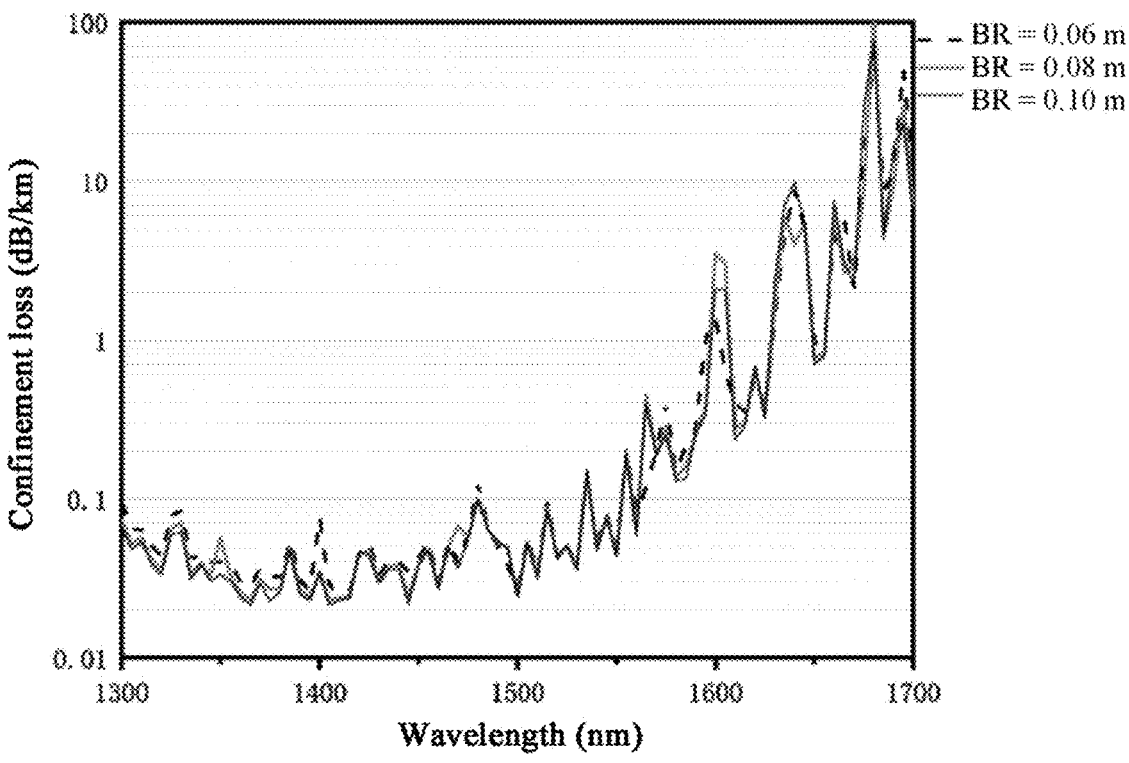
FIG. 8 is a simulation plot of a confinement loss changing with a wavelength in different bending radii BR of curvature of a four-tube contact structure.

In addition, through the research of a bending loss of the structure in FIG. 6a, it may be further found that losses of the structure in cases of different bending radii (for example, 6 cm, 8 cm, and 10 cm) of curvature of the anti-resonant hollow-core fiber are not clearly different, which shows an excellent bending loss stability of the exemplary structure in FIG. 6a. FIG. 8 is a simulation plot of a confinement loss changing with a wavelength in different bending radii BR of curvature.

Figure 9A:
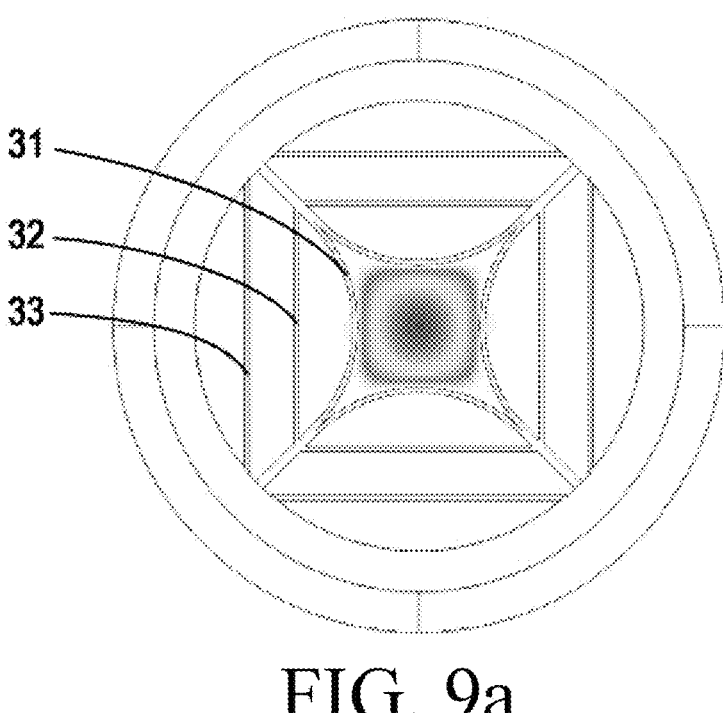
FIG. 9$a$ is a schematic structural diagram of a variant embodiment of the anti-resonant hollow-core fiber in FIG. 6$a$.
Figure 9B:
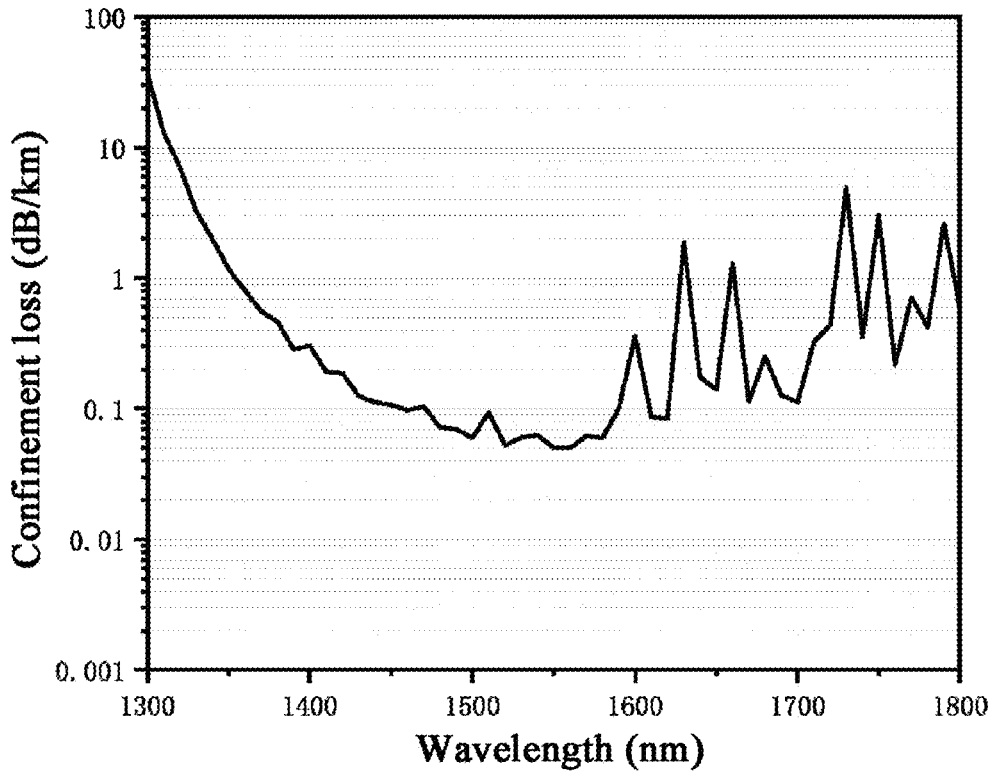

FIG. 9a is a schematic structural diagram of a variant embodiment of the anti-resonant hollow-core fiber in FIG. 6a. A difference from FIG. 6a lies in that the first primary nested element 32 is a straight wall. In addition, the second primary nested element 33 between the first primary nested element 32 and the inner surface 21 of the outer jacket tube 2 is also a straight wall. FIG. 9b is a schematic diagram of a confinement loss of the exemplary structure according to FIG. 9a changing with a wavelength. As shown in FIG. 9b, the structure may also maintain the confinement loss at a level of approximately 1 db/km or lower within an expected wavelength range (for example, 1350 nm to 1700 nm).

Second Exemplary Embodiment

Figure 10A:
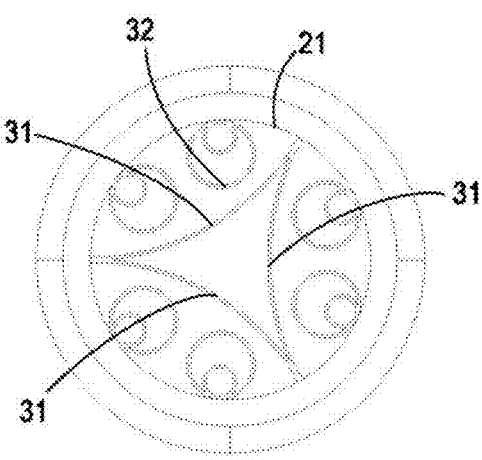
FIG. 10$a$ is a schematic structural diagram of an anti-resonant hollow-core fiber according to a second exemplary embodiment of the present disclosure.

FIG. 10a is a schematic structural diagram of an anti-resonant hollow-core fiber according to a second exemplary embodiment of the present disclosure.

The second exemplary embodiment in FIG. 10a is similar to the first exemplary embodiment in FIG. 6a, and a difference lies in that the cladding elements in FIG. 10a only include three first cladding elements 31 arranged around the inner surface 21 of the outer jacket tube 2 (therefore, the second exemplary embodiment in FIG. 10a may also be referred to as a three-tube contact structure). It should be noted herein that unless a clear contradiction occurs in the context, the foregoing descriptions and effects of the first exemplary embodiment in FIG. 6a may also apply to the second exemplary embodiment in FIG. 10a of the present disclosure.

It will be further understood that compared with the four-tube contact structure in FIG. 6a, for the three-tube contact structure in FIG. 10a, the core fundamental mode field and the closest contact point may be designed to be relatively farther, which is very conducive to restricting Fano oscillation of the contact point in FIG. 10a. In some embodiments, a confinement loss of the three-tube contact structure in FIG. 10a may even be adjusted to be lower than 0.1 db/km. In addition, the curvature, the radian, and the angle of the first cladding element in the three-tube contact structure in FIG. 10a do not have a great impact on the loss. Therefore, compared with the four-tube contact structure in FIG. 6a, the design and drawing of the three-tube contact structure in FIG. 10a have larger redundancy.

Figure 10B:
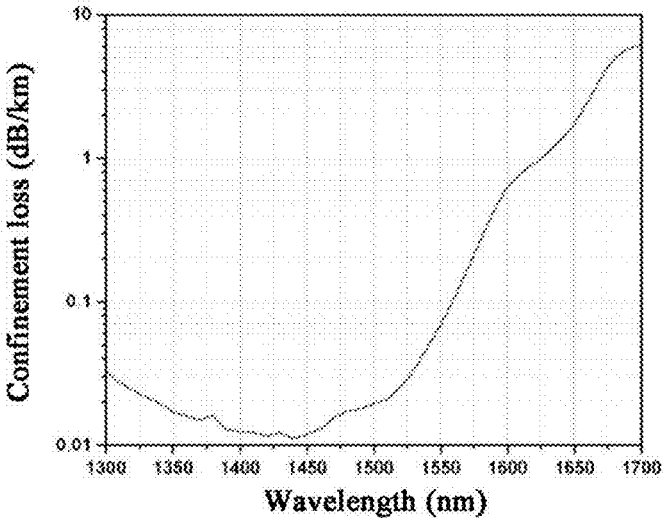

As an example, FIG. 10b is an exemplary simulation plot of a confinement loss changing with a wavelength in a layout of the three-tube contact structure in FIG. 10a. As can be seen from FIG. 10b, it can be implemented that the confinement loss is at a level of being less than 0.1 db/km within a range of 1300 nm to 1550 nm.

Figure 10C:
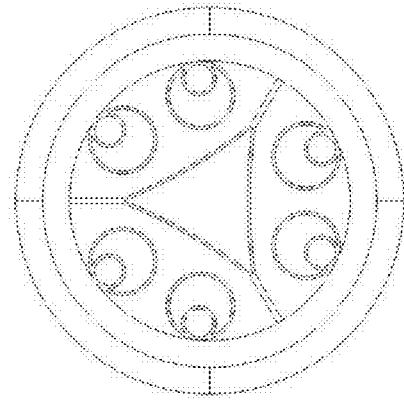

FIG. 10c shows a variant example of the three-tube contact structure in FIG. 10a. The curvature of the tube wall of the first cladding element defining the central air region or the fiber core is slightly reduced compared with that in FIG. 10a. In addition, the closest contact point between two adjacent first cladding elements 31 is designed to be closer to the center point O of the core fundamental mode field. Assuming that other conditions are kept unchanged, this means that the ratio $D_1/D_2$ is reduced. As an example, the ratio $D_1/D_2$ in FIG. 10c may be, for example, 0.7.

It should be understood that similar to the foregoing four-tube contact structure, in addition to the ratio $D_1/D_2$, the confinement loss of the three-tube contact structure may further be related to other structural parameters (including, but not limited to, the distance from the closest contact point to the inner surface of the outer jacket tube, the diameter of the maximum virtual inscribed circle in the central air region, the wall thicknesses of the components in the cladding elements, the curvature of the first arc-shaped element, and the size and shape of the first primary nested element with respect to the first cladding element) and the specific structural layout (including, but not limited to, the nested arrangement, and an arrangement of a quantity of anti-resonant layers) of the anti-resonant hollow-core fiber. Therefore, the confinement loss of the three-tube contact structure can be reduced by adjusting, for example, the specific structural parameters and/or the specific structural layout of the anti-resonant hollow-core fiber.

Figure 10D:
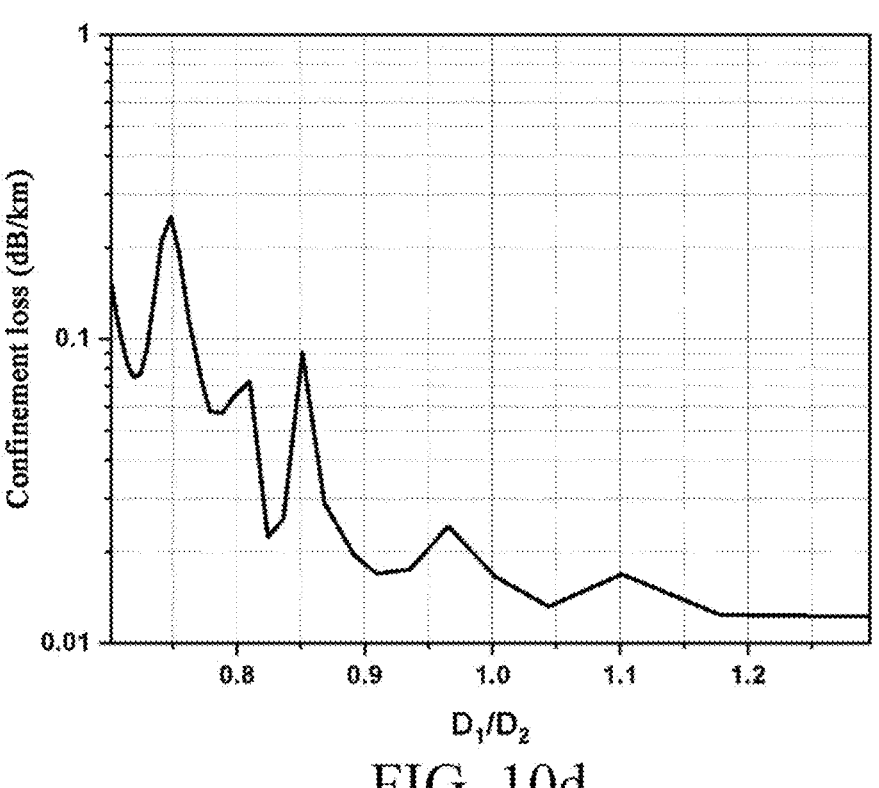
Figure 10E:
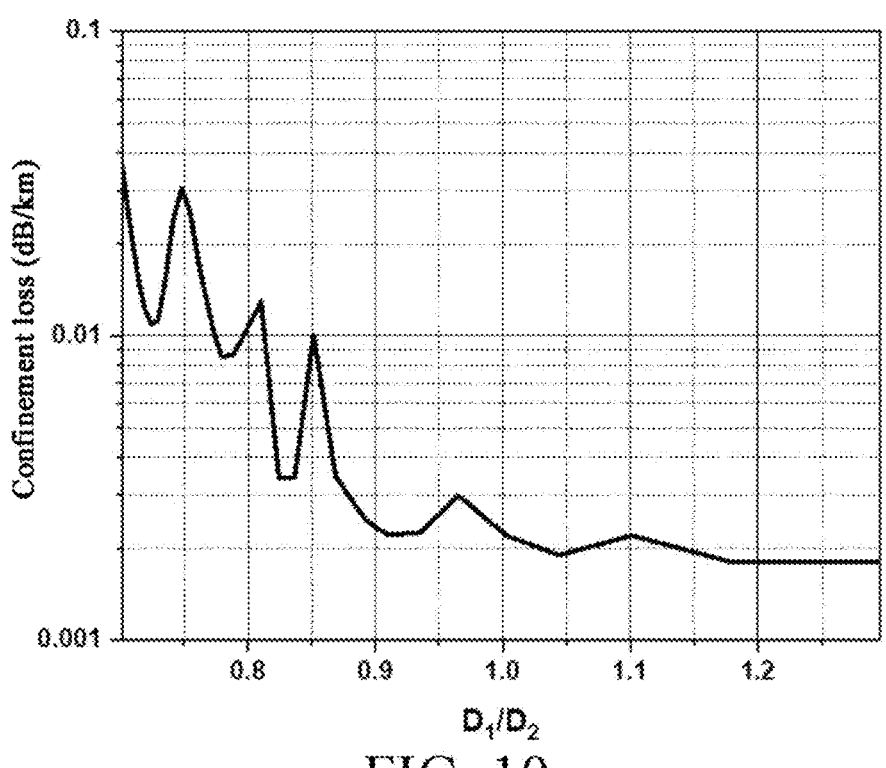

FIG. 10d is an exemplary simulation plot of a confinement loss of an anti-resonant hollow-core fiber changing with $D_1/D_2$ using a first nested component with a given predetermined size as an example in a layout of the three-tube contact structure in FIG. 10a. The size of the first primary nested element 32 with respect to the first cladding elements 31 is relatively small, and a change in $D_1/D_2$ is caused by changing the radius of curvature of the first cladding element. As can be seen from FIG. 10d, the confinement loss may be maintained below 1 db/km. FIG. 10e is a simulation plot of a confinement loss of an anti-resonant hollow-core fiber changing with $D_1/D_2$ using a first nested component with another given predetermined size as an example in a layout of the three-tube contact structure in FIG. 10a. The size of the first primary nested element 32 with respect to the first cladding elements 31 is designed to be relatively large, and a structural intersection between the first cladding elements is caused by changing the radii of curvature of the first cladding elements, and as a result the contact points are changed, causing a change in $D_1/D_2$. Through data analysis of FIG. 10e, it will be understood that when the radii of curvature of the first cladding elements are smaller, a distance between the contact points is larger, and the loss is smaller.

As can be seen from comparison between FIG. 10d and FIG. 10e, the confinement loss of the anti-resonant hollow-core fiber can be significantly reduced by increasing the size of the first primary nested element 32 with respect to the first cladding elements 31. For example, the confinement loss may be reduced to the level of 0.1 db/km.

Figure 10F:
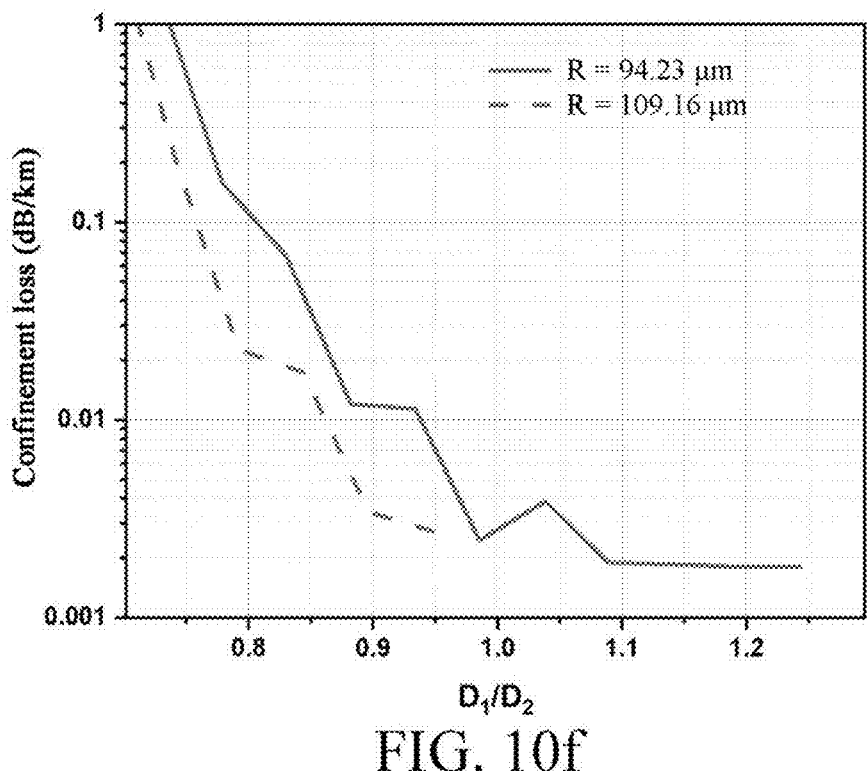

FIG. 10f is a simulation plot of a confinement loss of an anti-resonant hollow-core fiber changing with $D_1/D_2$ using first cladding elements with different radii of curvature as examples in a layout of the three-tube contact structure in FIG. 10a. As can be seen from FIG. 10f, with different radii R of curvature, the anti-resonant hollow-core fiber may manifest different confinement losses. As the radius of curvature of the first cladding element increases (i.e., the first cladding element used as the first arc-shaped element looks flatter), the confinement loss can be relatively reduced. In addition, in consideration of the thickness of an actually manufactured contact point, even if the curvature is kept unchanged, provided that the position of the contact point is within a specified range, a low-loss standard can still be reached, and for a structure with a larger radius of curvature, a lower limit of a specified range can be lower.

Figure 11:
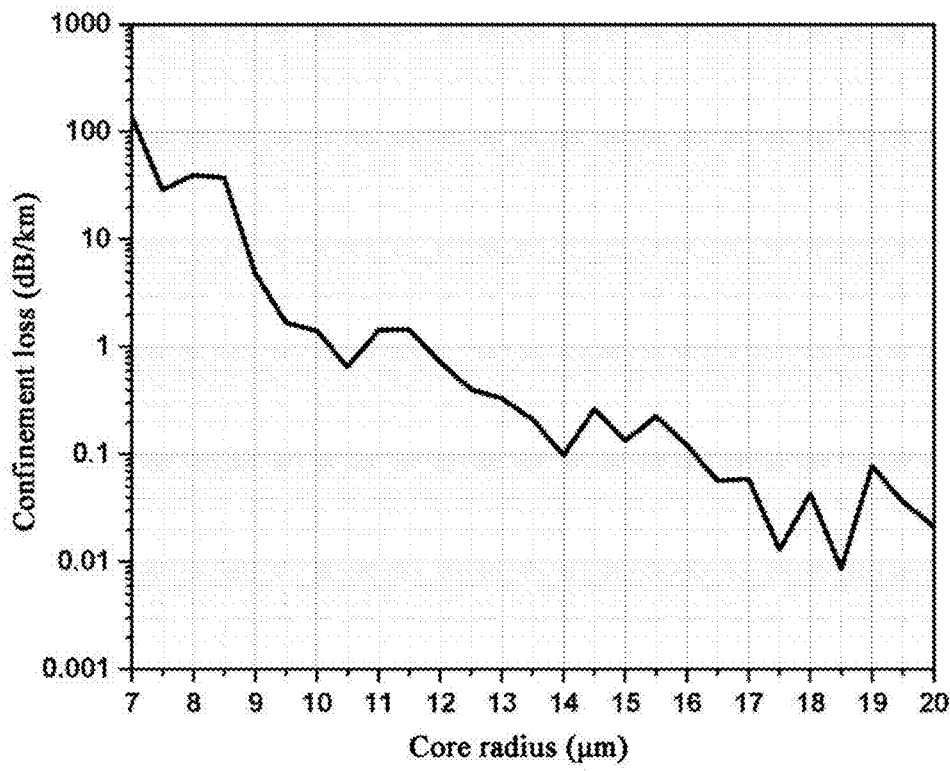
FIG. 11 is a simulation plot of a confinement loss of an anti-resonant hollow-core fiber changing with a core inscribed circle radius in a layout of a three-tube contact structure in FIG. 10$a$.

FIG. 11 is a simulation plot of a confinement loss of an anti-resonant hollow-core fiber changing with a core inscribed circle radius in a layout of the three-tube contact structure in FIG. 10a. As can be seen from FIG. 11, while other given conditions are kept unchanged, as the virtual inscribed circle radius of the fiber core gradually increases, the confinement loss can be effectively reduced. Therefore, in practice, the confinement loss can be effectively reduced by selecting the size of the inscribed circle radius of the fiber core.

Figure 12:
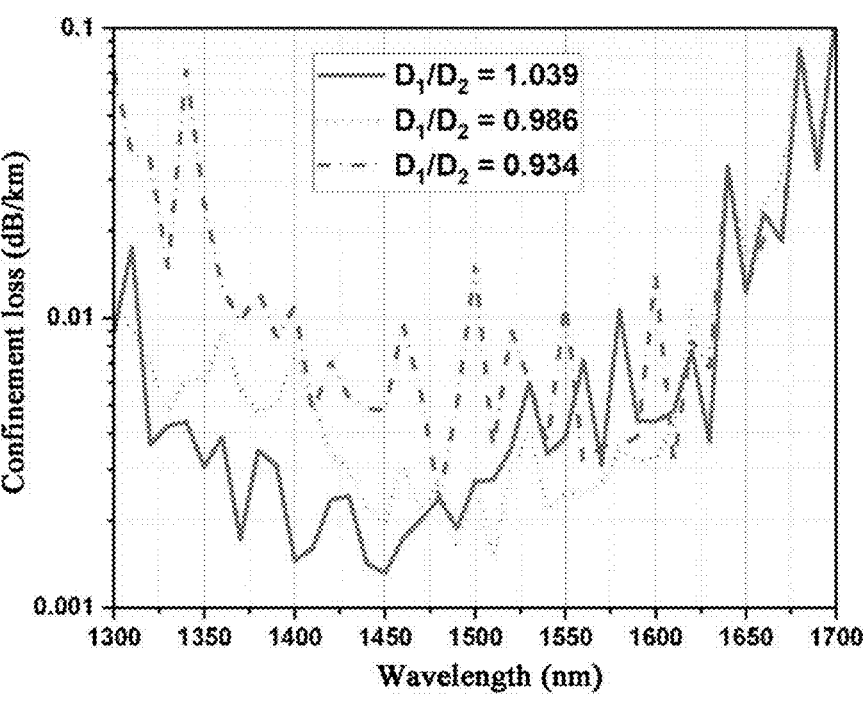
FIG. 12 is a simulation plot of a confinement loss of anti-resonant hollow-core fibers with different ratios $D_1/D_2$ changing with a wavelength in a layout of a three-tube contact structure in FIG. 10$a$.

FIG. 12 is a simulation plot of a confinement loss of anti-resonant hollow-core fibers with different ratios $D_1/D_2$ changing with a wavelength in a layout of the three-tube contact structure in FIG. 10a. As can be seen from FIG. 12, with different ratios $D_1/D_2$, the anti-resonant hollow-core fiber has a low confinement loss in a full wave band of 1300 nm to 1700 nm.

Figure 13:
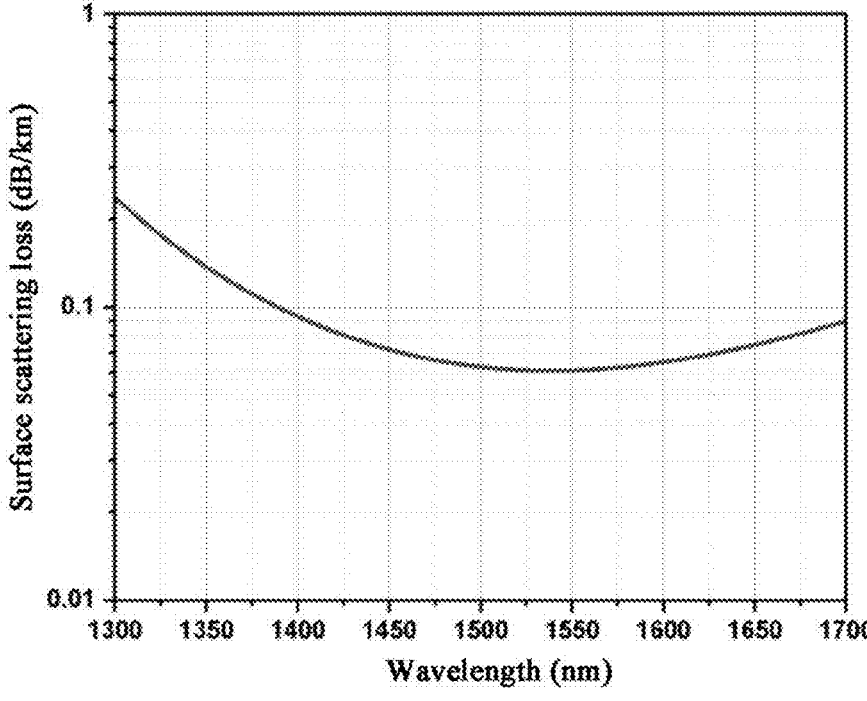
FIG. 13 is a simulation plot of a surface scattering loss of an anti-resonant hollow-core fiber changing with a wavelength in a layout of a three-tube contact structure in FIG. 10$a$.

FIG. 13 is a simulation plot of a surface scattering loss of an anti-resonant hollow-core fiber changing with a wavelength in a layout of the three-tube contact structure in FIG. 10a. Simulation results in FIG. 13 show that Fano oscillation caused by a contact point has no impact on the surface scattering loss of the anti-resonant hollow-core fiber.

Figure 14:
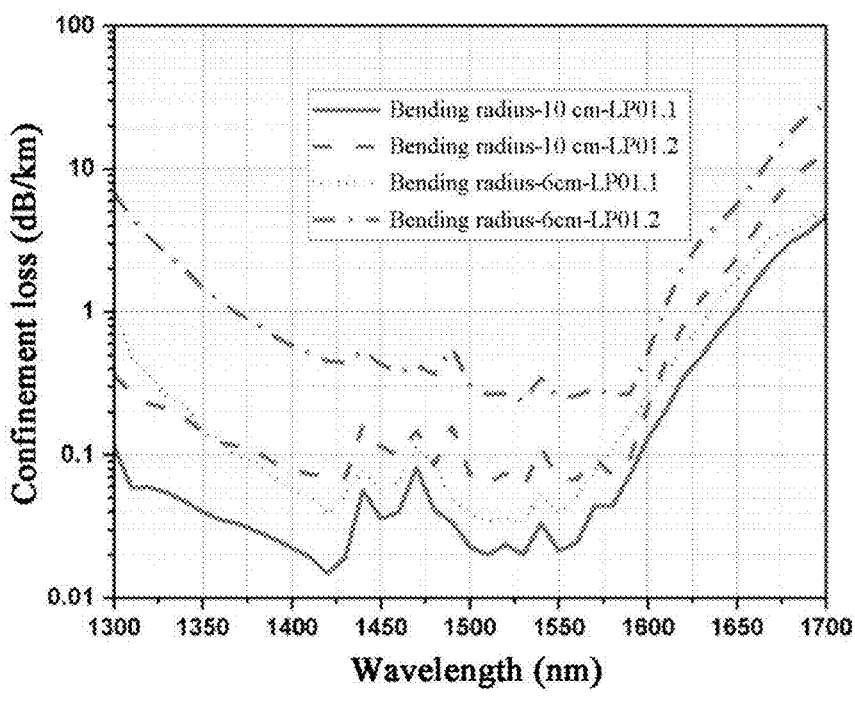
FIG. 14 is a simulation plot of a bending loss of an anti-resonant hollow-core fiber in different bending radii of curvature changing with a wavelength in a layout of a three-tube contact structure in FIG. 10$a$.

FIG. 14 is a simulation plot of a bending loss of an anti-resonant hollow-core fiber in different bending radii of curvature changing with a wavelength in a layout of the three-tube contact structure in FIG. 10a. Simulation results in FIG. 14 show that with the same bending radius of curvature, the bending loss of the three-tube contact structure is larger than the bending loss of the four-tube contact structure in FIG. 6a, but is still within a relatively low loss level range.

Figure 15:
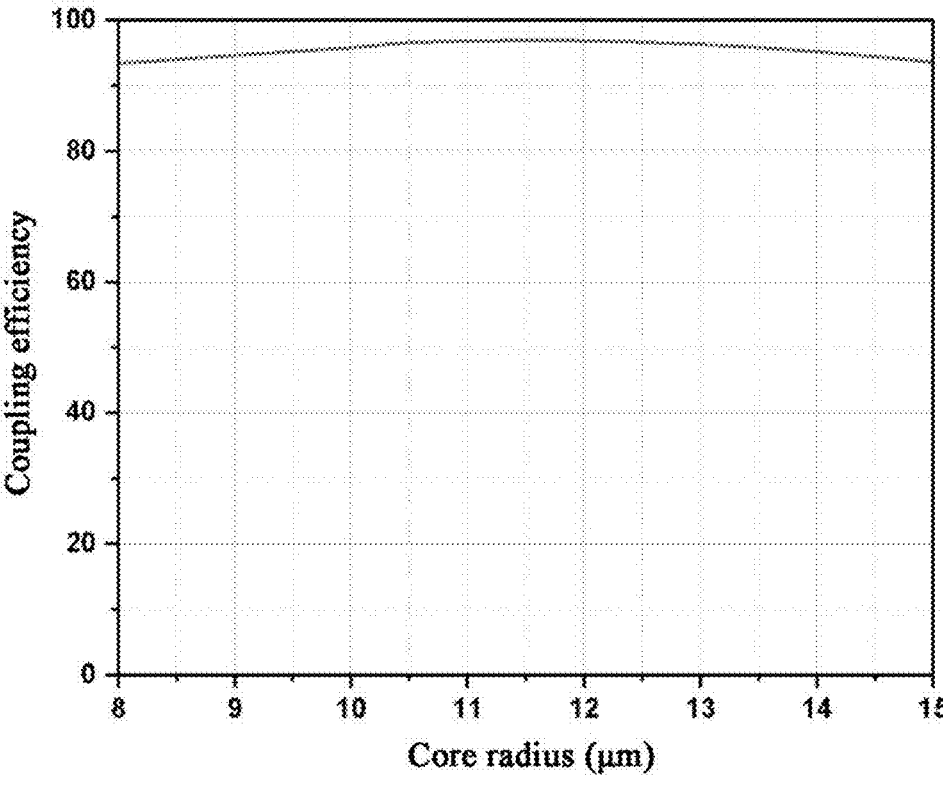
FIG. 15 is a simulation plot of coupling efficiency of an anti-resonant hollow-core fiber with a Gaussian beam in different core inscribed circle radii in a layout of a three-tube contact structure in FIG. 10$a$.

FIG. 15 is a simulation plot of coupling efficiency of an anti-resonant hollow-core fiber with a Gaussian beam in different core inscribed circle radii in a layout of a three-tube contact structure in FIG. 10a. Simulation results in FIG. 15 show that the anti-resonant hollow-core fiber in the layout of the three-tube contact structure in FIG. 10a may have optical coupling efficiency exceeding 90% with a Gaussian beam.

Third Exemplary Embodiment

Figure 16A:
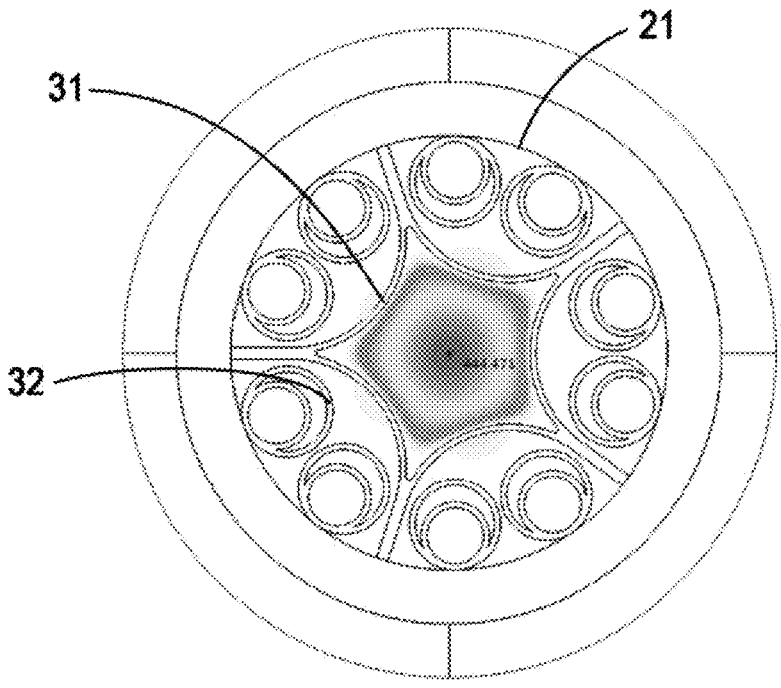
FIG. 16$a$ is a schematic structural diagram of an anti-resonant hollow-core fiber according to a third exemplary embodiment of the present disclosure.

FIG. 16a is a schematic structural diagram of an anti-resonant hollow-core fiber according to a third exemplary embodiment of the present disclosure.

The third exemplary embodiment in FIG. 16a is similar to the first exemplary embodiment in FIG. 6a, and a difference lies in that the cladding elements in FIG. 16a include five first cladding elements 31 arranged around the inner surface 21 of the outer jacket tube 2 (therefore, the third exemplary embodiment in FIG. 16a may also be referred to as a five-tube contact structure). It should be noted herein that unless a clear contradiction occurs in the context, the foregoing descriptions and effects of the first exemplary embodiment in FIG. 6a may also apply to the third exemplary embodiment in FIG. 16 of the present disclosure.

Similar to the foregoing four-tube contact structure, in addition to the ratio $D_1/D_2$, the confinement loss of the five-tube contact structure is further related to specific structural parameters (including, but not limited to, the distance from the closest contact point to the inner surface of the outer jacket tube, the diameter of the maximum virtual inscribed circle in the central air region, the wall thicknesses of the components in the cladding elements, the curvature of the first arc-shaped element, and the size and shape of the first primary nested element with respect to the first cladding element) and the specific structural layout (including, but not limited to, the nested arrangement, and an arrangement of a quantity of anti-resonant layers) of the anti-resonant hollow-core fiber. Therefore, the confinement loss of the five-tube contact structure can be reduced by adjusting, for example, the specific structural parameters and/or the specific structural layout of the anti-resonant hollow-core fiber.

Figure 16B:
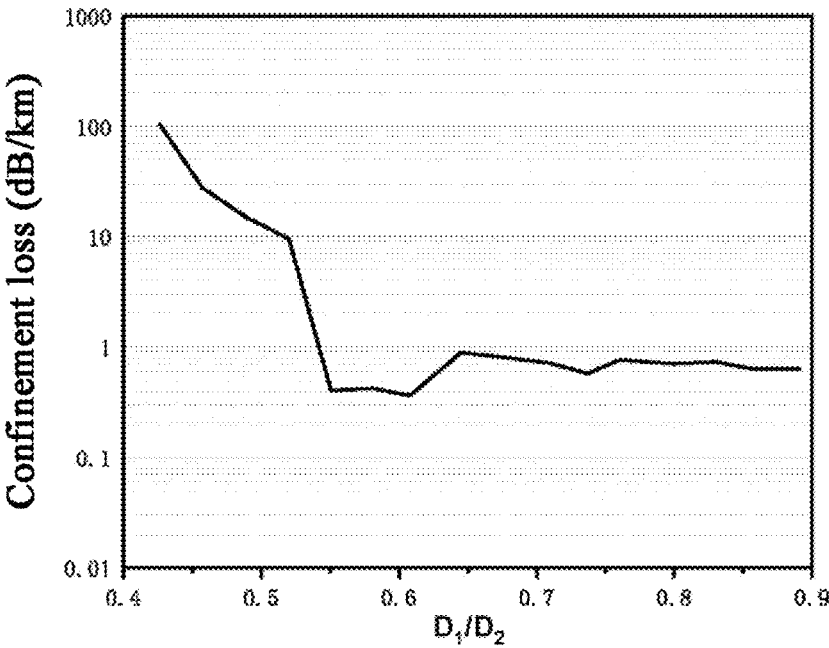

As an example, FIG. 16b is a simulation plot of a confinement loss changing with $D_1/D_2$ in a layout of a five-tube contact structure in FIG. 16a. The change in $D_1/D_2$ is caused by filling quartz at a contact point to make the closest contact point to move toward a fiber core. As can be seen from FIG. 16b, in the example, when $D_1/D_2 > 0.54$, the confinement loss may be kept below 1 db/km.

Fourth Exemplary Embodiment

Figure 17A:
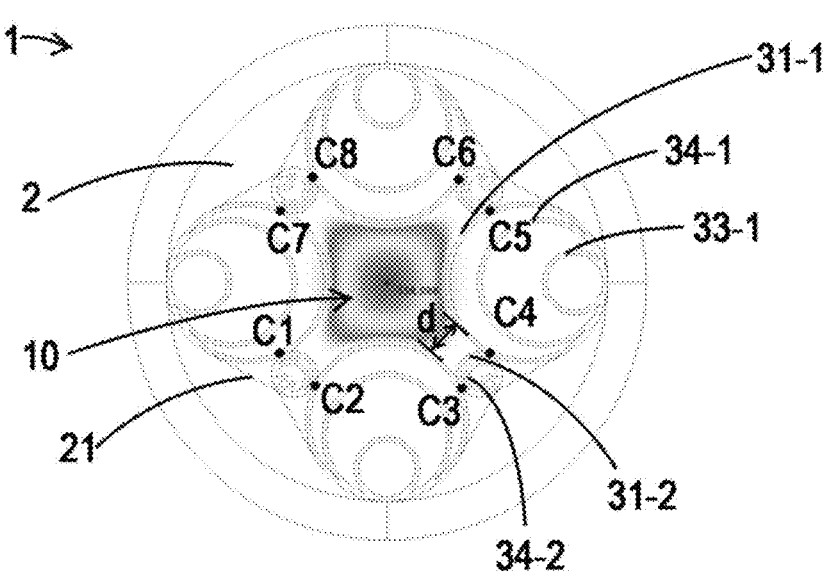
FIG. 17$a$ is a schematic diagram of a typical structure of an anti-resonant hollow-core fiber according to a fourth exemplary embodiment of the present disclosure.
Figure 17B:
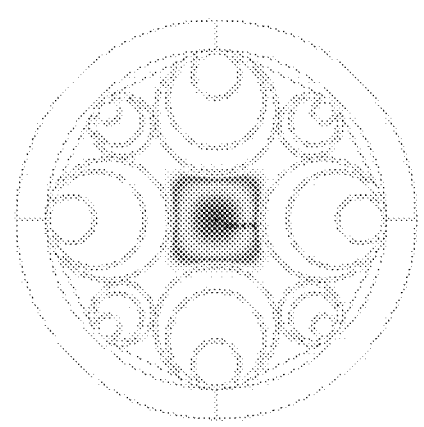
Figure 17C:
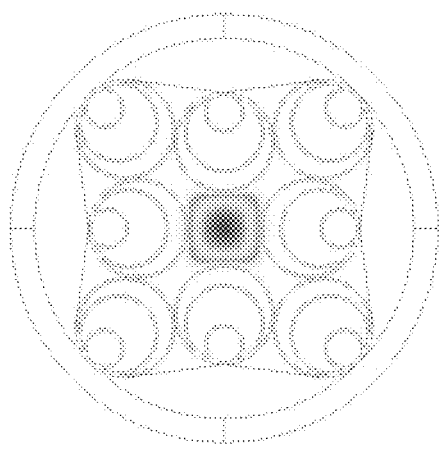
Figure 17D:
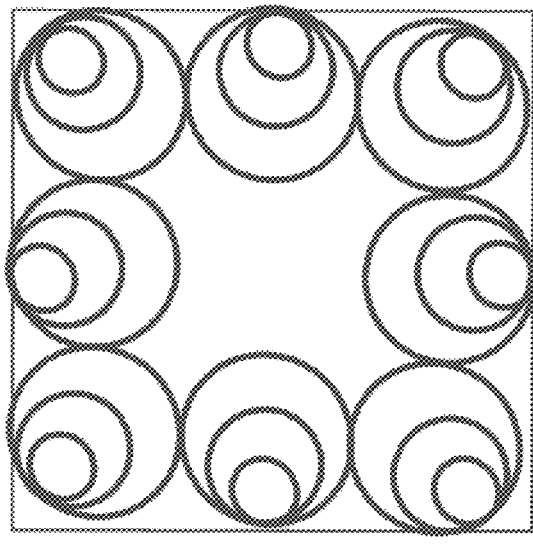
Figure 17E:
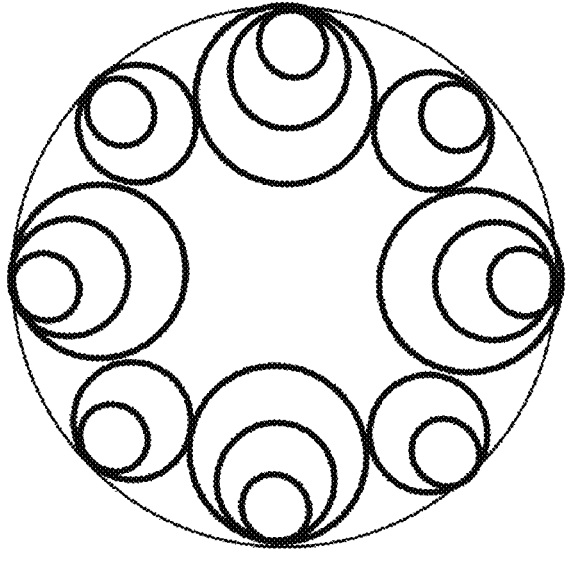

FIG. 17a is a schematic diagram of a typical structure of an anti-resonant hollow-core fiber according to a fourth exemplary embodiment of the present disclosure.

Compared with the concept in the foregoing first, second, and third exemplary embodiments, the fourth exemplary embodiment in the present disclosure has some slight changes. Similar to the foregoing first, second, and third exemplary embodiments, as shown in FIG. 17a, the anti-resonant hollow-core fiber 1 also includes an outer jacket tube 2 and cladding elements located inside the outer jacket tube 2. The outer jacket tube 2 is provided with an inner surface 21, and the cladding elements may include a plurality of first cladding elements 31 arranged around the inner surface 21.

However, a difference from the concept in the foregoing first, second, and third exemplary embodiments lies in that the plurality of first cladding elements 31 in the fourth exemplary embodiment may include first cladding primary elements 31-1 and first cladding secondary elements 31-2. According to the design of the present disclosure, at least one corresponding first cladding secondary element 31-2 is provided between any two adjacent first cladding primary elements 31-1, at least some first cladding primary elements 31-1 in the first cladding primary elements 31-1 are in contact with a maximum virtual inscribed circle in the central air region 10, and none of the first cladding secondary elements is in contact with the maximum virtual inscribed circle.

For example, when the fiber core is approximately circular, all the first cladding primary elements 31-1 are in simultaneous contact with the maximum virtual inscribed circle in the central air region 10. When the fiber core is rather elliptical, only some first cladding primary elements 31-1 may be in contact with the maximum virtual inscribed circle in the central air region 10.

In the case of the foregoing arrangement, a spacing d exists between any two adjacent first cladding primary elements. The spacing d is defined by the shortest distance between the two adjacent first cladding primary elements. Typically, the first cladding secondary element 31-2 between two adjacent first cladding primary elements 31-1 are farther away from the center point of the core fundamental mode field than the first cladding primary elements 31-1.

In some embodiments, the first cladding primary elements 31-1 have the same or close shapes and sizes, and are full tubes or approximately full tubes. Furthermore, each first cladding primary element 31-1 may further include at least one primary nested element 34-1, each primary nested element 34-1 may be any one selected from a full tube, an arc-shaped element, and a straight wall. A shape of each first cladding secondary element 31-2 may also be a full tube or an approximately full tube. Further, each first cladding secondary element 31-2 may include at least one first secondary nested element 34-2. Each first secondary nested element 34-2 may be any one selected from a full tube, an arc-shaped element, and a straight wall.

In some embodiments, the shape of each of the first cladding secondary elements may be different from the shapes of the first cladding primary elements, and is any one selected from an arc-shaped element and a straight wall. Particularly, if the first cladding secondary element is an arc-shaped element with an opening facing the inner surface or a straight wall, the first cladding secondary element may include at least one secondary nested element 34-2. The at least one first secondary nested element 34-2 is located between the first cladding secondary element 31-2 and the inner surface 21. In some embodiments, each first secondary nested element may further include at least one second secondary nested element.

In some embodiments, only one corresponding first cladding secondary element 31-2 may be provided between any two adjacent first cladding primary elements 31-1. In this case, the first cladding primary elements 31-1 and the first cladding secondary elements 31-2 are alternate with each other and have a same quantity. Typically, both the quantity of the first cladding primary elements 31-1 and the quantity of the first cladding secondary elements 31-2 may be 3, 4, 5, or 6.

As an example, FIG. 17a shows four first cladding primary elements 31-1 and four first cladding secondary elements 31-2, and the first cladding primary elements 31-1 and the four first cladding secondary elements 31-2 are all full tubes. In addition, a size of each first cladding secondary element 31-2 is much smaller than that of the first cladding primary element 31-1. FIG. 17b, FIG. 17c, FIG. 17d, and FIG. 17e show variant embodiments of FIG. 17a. Compared with FIG. 17a, sizes of the four first cladding secondary elements 31-2 in FIG. 17b, FIG. 17c, FIG. 17d, and FIG. 17e are slightly increased. In addition, outer contours of the cladding elements in FIG. 17d form a square arrangement in the outer jacket tube, and outer contours of the cladding elements in FIG. 17e form a circular arrangement.

Figure 17F:
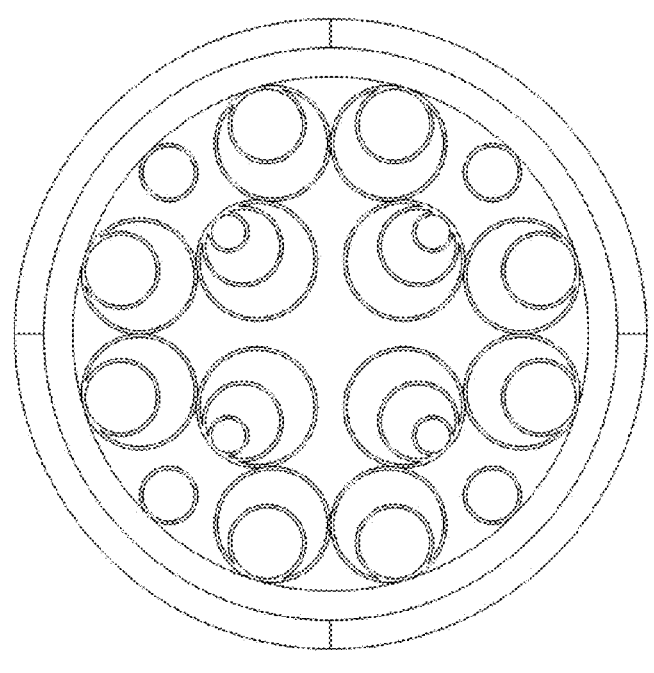

In some embodiments, a plurality of corresponding first cladding secondary elements 31-2 may be provided between any two adjacent first cladding primary elements 31-1. The plurality of first cladding secondary elements 31-2 corresponding to each other may be in contact with each other. As an example, FIG. 17f is a schematic structural diagram of two corresponding first cladding secondary elements 31-2 being provided between any two adjacent first cladding primary elements 31-1. The two corresponding first cladding secondary elements 31-2 are in contact with each other, and are further respectively in contact with one adjacent first cladding primary element.

In addition, according to the design of the present disclosure, the first cladding primary elements 31-1 and/or the first cladding secondary elements 31-2 may be arranged in contact with or not in contact with the inner surface of the outer jacket tube. The inner surface may have a regular shape (for example, a circular shape or a square shape) or an irregular shape. For example, the inner surfaces of the outer jacket tubes in FIG. 17a, FIG. 17b, and FIG. 17c have irregular shapes, the inner surface of the outer jacket tube in FIG. 17d has a square shape, and the inner surfaces of the outer jacket tubes in FIG. 17*e* and FIG. 17*f* have circular shapes. In addition, the first cladding primary elements in FIG. 17*f* are arranged not in contact with the inner surface of the outer jacket tube.

In some embodiments, when being arranged not in contact with the inner surface of the outer jacket tube, the first cladding primary elements 31-1 and/or the first cladding secondary elements 31-2 may be supported on or attached to the inner surface of the outer jacket tube through, for example, a support member 35 (for example, a straight wall, an arc-shaped element, or a cylindrical element).

Similar to the foregoing first, second, and third exemplary embodiments, in the fourth exemplary embodiment, the closest contact points, for example, C1, C2, C3, C4, C5, C6, C7, and C8 in FIG. 17*a*, are also provided between adjacent first cladding elements 31 (between the first cladding primary element 31-1 and the first cladding secondary element 31-2 that are adjacent to each other). Similarly, the confinement loss of the anti-resonant hollow-core fiber changes as $D_1/D_2$ changes.

Figure 17G:
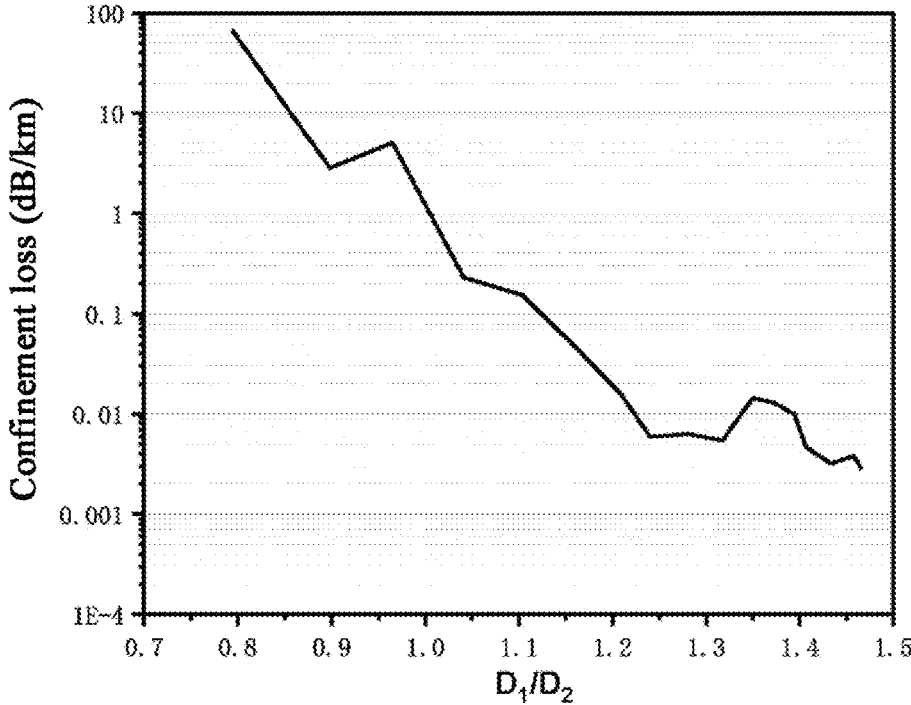
Figure 17H:
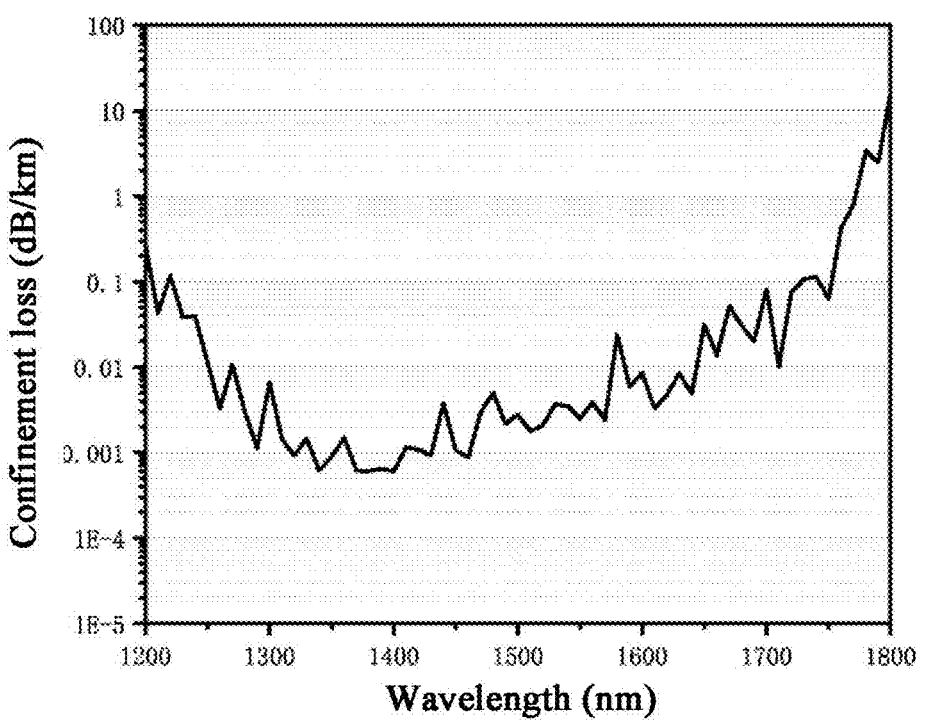
Figure 17I:
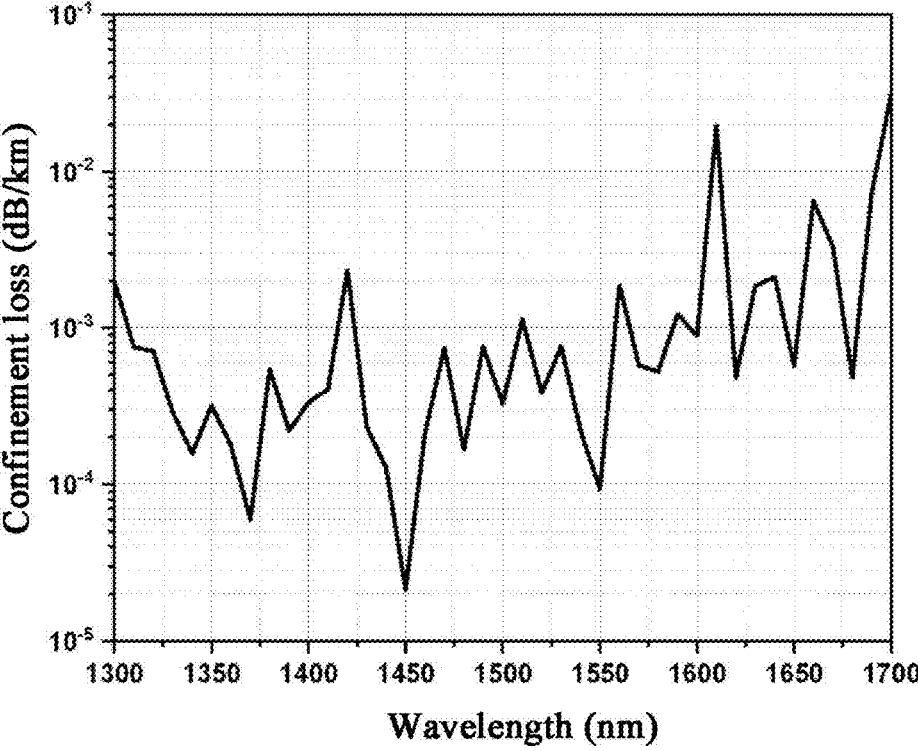

FIG. 17*g* is a simulation plot of a confinement loss changing with a ratio $D_1/D_2$ in a layout of a contact structure in FIG. 17*a*. As shown in FIG. 17*g*, as the value of $D_1/D_2$ increases, the loss may decrease accordingly. FIG. 17*h* is a simulation plot of a confinement loss changing with a wavelength in a layout of a contact structure in FIG. 17*a*, showing that within a range of 1200 nm to 1750 nm, the confinement loss may be restricted below 1 db/km, or even below 0.1 db/km. FIG. 17*i* is a simulation plot of a confinement loss changing with a wavelength in a layout of a contact structure in FIG. 17*g*. As can be seen from FIG. 17*i*, the contact structure in FIG. 17*g* may also keep the confinement loss below 0.1 db/km.

Similar to the foregoing first, second, and third exemplary embodiments, in addition to the ratio $D_1/D_2$, the confinement loss of the anti-resonant hollow-core fiber is further related to other structural parameters (including, but not limited to, the distance from the closest contact point to the inner surface of the outer jacket tube, the diameter of the maximum virtual inscribed circle in the central air region, the wall thicknesses of the components in the cladding elements, the size of the first cladding secondary element with respect to the first cladding primary element, the size and shape of the first primary nested element with respect to the first cladding primary element, and the size and shape of the first secondary nested element with respect to the first cladding secondary element) and the specific structural layout (including, but not limited to, the nested arrangement, and an arrangement of a quantity of anti-resonant layers) of the anti-resonant hollow-core fiber. Therefore, the confinement loss of the anti-resonant hollow-core fiber can be reduced by adjusting the foregoing specific structural parameters and/or specific structural layout of the anti-resonant hollow-core fiber.

Figure 18A:
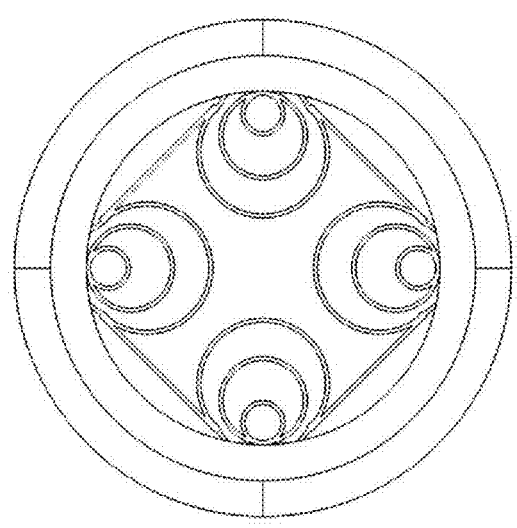
FIG. 18$a$ is a schematic diagram of a variant structure of the typical structure in the fourth exemplary embodiment in FIG. 17$a$.
Figure 18B:
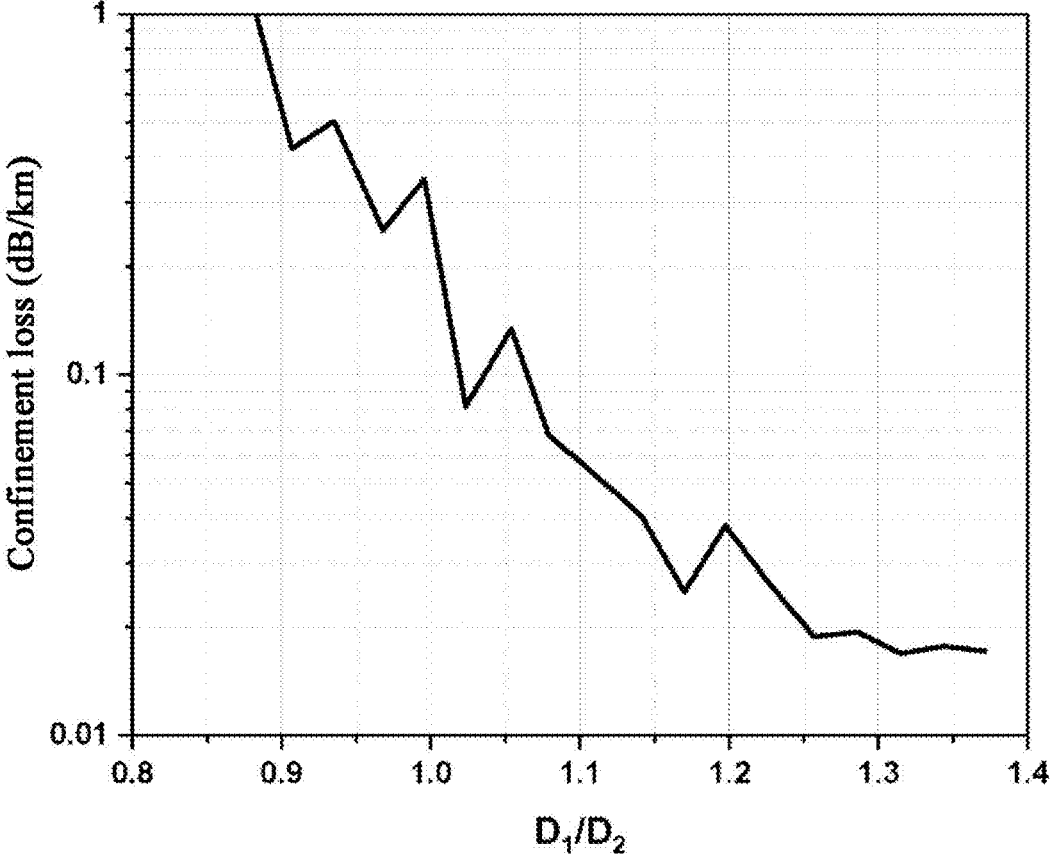

FIG. 18*a* is a schematic diagram of a variant structure of the typical structure in the fourth exemplary embodiment in FIG. 17*a*. A difference between the variant structure in FIG. 18*a* and the structure in FIG. 17*a* lies in that the first cladding secondary element 31-2 is formed into a straight wall, the shape of which is completely different from that of the first cladding primary element 31-1. FIG. 18*b* is a simulation plot of a confinement loss changing with a ratio $D_1/D_2$ in a layout of a contact structure in FIG. 18*a*. As shown in FIG. 18*b*, in the example, as the ratio $D_1/D_2$ increases, the loss decreases accordingly, presenting features similar to those in FIG. 17*g*.

Fifth Exemplary Embodiment

The confinement loss of the anti-resonant hollow-core fiber is researched above mainly with reference to $D_1/D_2$. However, for the foregoing fourth exemplary embodiment, it is further found out that the confinement loss of the anti-resonant hollow-core fiber may be further represented by the ratio d/a of the spacing d between any two adjacent first cladding primary elements to the radius a of the maximum virtual inscribed circle of the fiber core, and/or the ratio $D_3/a$ of the distance $D_3$ from the contact point closest to the center point of the core fundamental mode field between the first cladding primary element and the first cladding secondary element that are adjacent to the maximum virtual inscribed circle and the radius a of the maximum virtual inscribed circle. Particularly, the following relationships between the spacing d and a and between the distance $D_3$ and a are particularly favorable: $0.15<d/a<1$ and/or $D_3/a>0.6$.

Figure 19A:
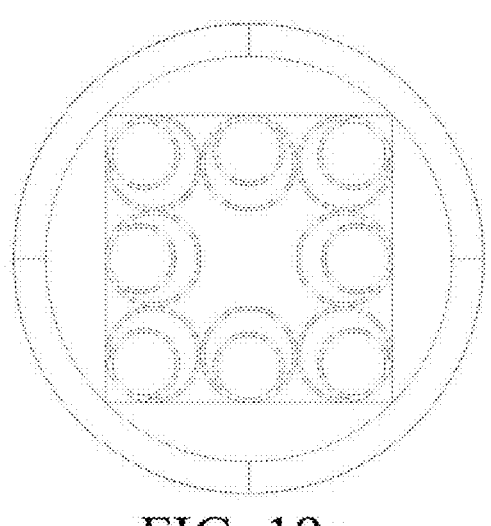
FIG. 19$a$ is a schematic structural diagram of only one layer of nested element (i.e., a single-layer nested structure) being provided in each of first cladding primary elements and first cladding secondary elements of an anti-resonant hollow-core fiber according to a fifth exemplary embodiment of the present disclosure.
Figure 19B:
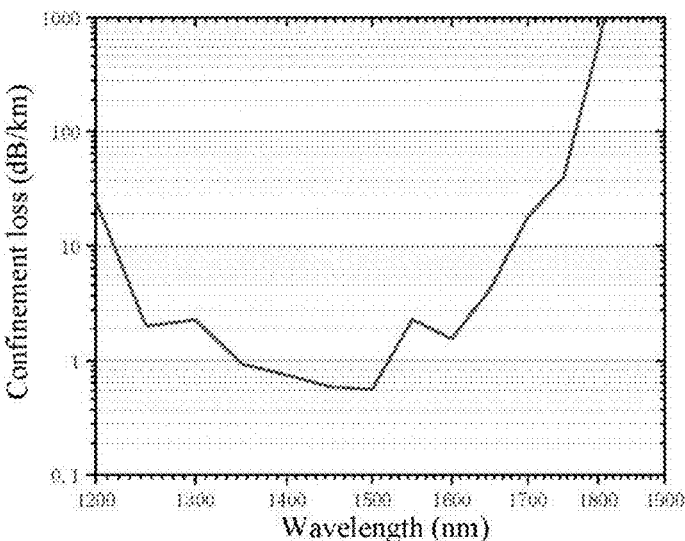

FIG. 19*a* is a schematic structural diagram of only one layer of nested element (i.e., a single-layer nested structure) being provided in each of first cladding primary elements and first cladding secondary elements of an anti-resonant hollow-core fiber according to a fifth exemplary embodiment of the present disclosure. In the structure shown in FIG. 19*a*, the structure of the cladding element is approximately square, and the first cladding primary element and the first cladding secondary element have a same size. FIG. 19*b* is a simulation plot of a confinement loss of the anti-resonant hollow-core fiber in FIG. 19*a* changing with a wavelength. As can be seen from FIG. 19*b*, an overall loss of a single-layer nested structure is relatively high.

Figure 20A:
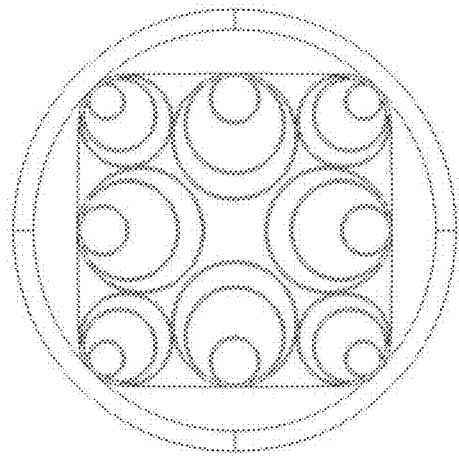
FIG. 20$a$ is a schematic structural diagram of double layers of nested elements (i.e., a double-layer nested structure) being provided in each of the first cladding primary elements and the first cladding secondary elements of the anti-resonant hollow-core fiber and the first cladding primary elements and the first cladding secondary elements being different from each other in size according to the fifth exemplary embodiment of the present disclosure.

FIG. 20*a* is a schematic structural diagram of double layers of nested elements (i.e., a double-layer nested structure) being provided in each of the first cladding primary elements and the first cladding secondary elements of the anti-resonant hollow-core fiber according to the fifth exemplary embodiment of the present disclosure. Similar to the structure shown in FIG. 19*a*, the structure of the cladding element is approximately square. The size of the first cladding primary element may change according to the spacing d between the first cladding primary elements. In addition, the size of the first cladding secondary element may be smaller than, equal to, or larger than that of the first cladding primary element.

Figure 20B:
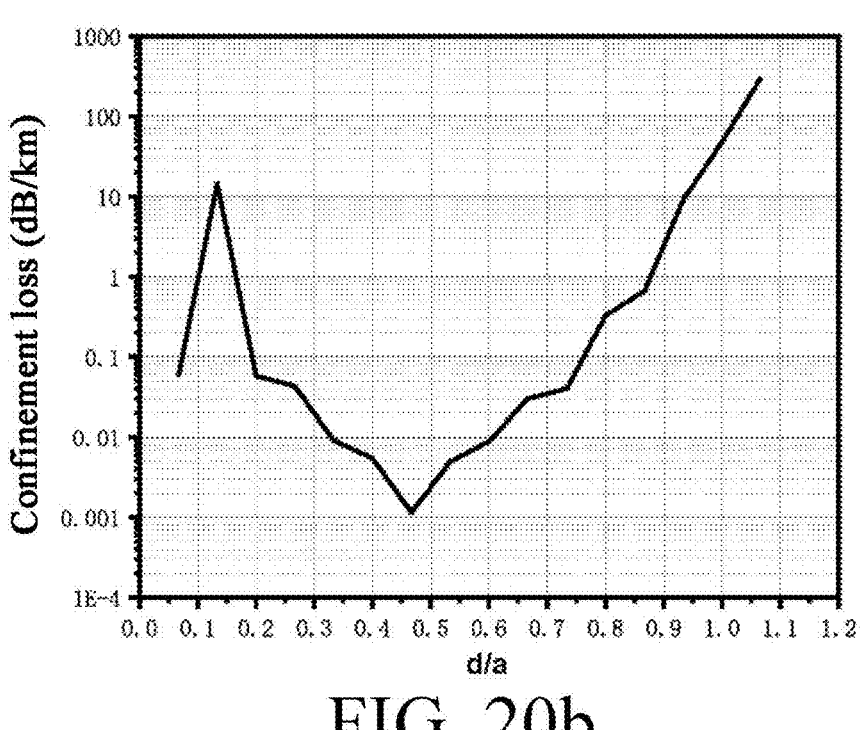
Figure 20C:
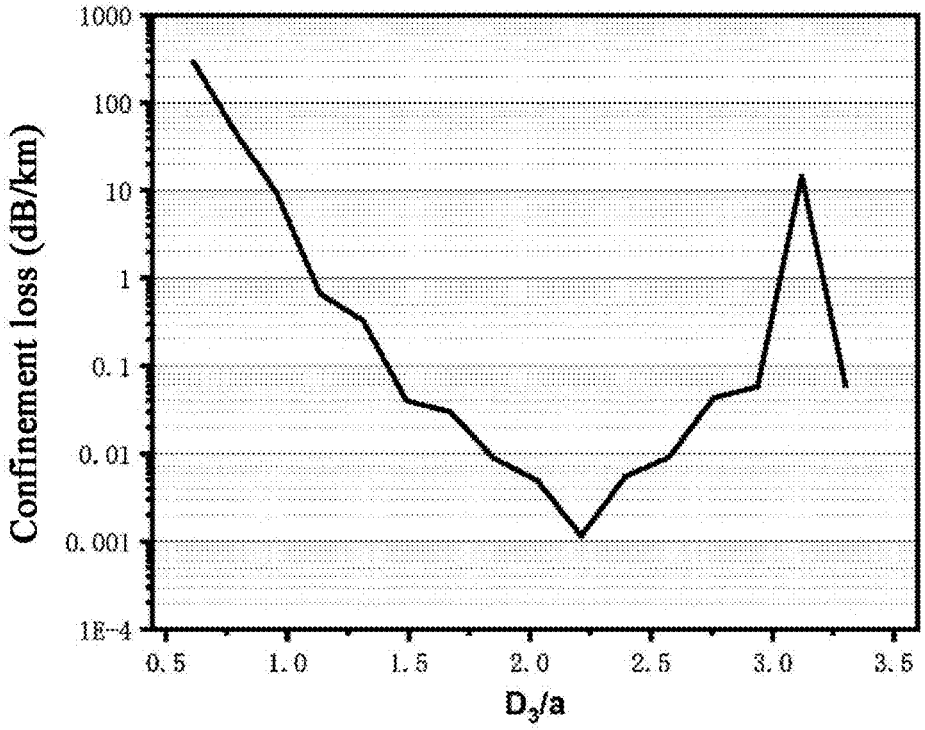
Figure 20D:
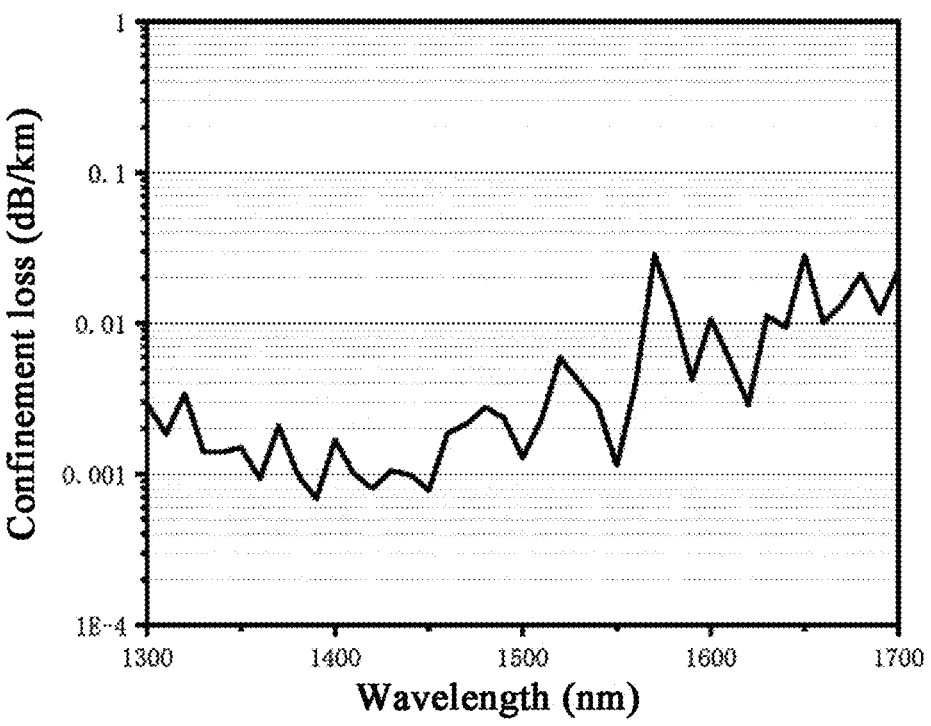

FIG. 20*b* is a simulation plot of a confinement loss of the anti-resonant hollow-core fiber in FIG. 20*a* changing with d/a. Simulation results show that when the ratio of the spacing d to a is within a range of 0.15 to 0.87, the confinement loss thereof may be restricted within a range below 1 db/km, or even within a range below 0.1 db/km. FIG. 20*c* is a simulation plot of a confinement loss of the anti-resonant hollow-core fiber in FIG. 20*a* changing with $D_3/a$. Simulation results show that when the ratio of $D_3$ to a is greater than 1.2 and less than 3.5, the confinement loss may be basically controlled at a low level, or even within a range below 0.1 db/km or 0.01 db/km. In addition, FIG. 20*d* is a schematic diagram of a confinement loss of the anti-resonant hollow-core fiber in FIG. 20*a* changing with a wavelength when $D_3/a=2.21227$. As can be seen from FIG. 20*d*, within a wave band range of 1300 nm to 1700 nm, the confinement loss may be controlled within a range below 0.1 db/km.

Figure 21A:
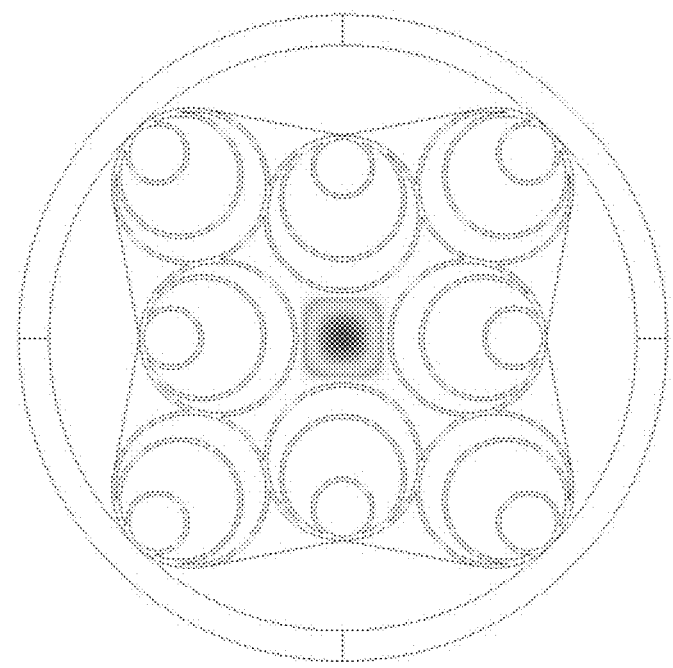
FIG. 21$a$ is a schematic structural diagram of double layers of nested elements (i.e., a double-layer nested structure) being provided in each of the first cladding primary elements and the first cladding secondary elements of the anti-resonant hollow-core fiber and the first cladding primary elements and the first cladding secondary elements being same as each other in size according to the fifth exemplary embodiment of the present disclosure.
FIG. 21*b* is a simulation plot of a confinement loss changing with d/a in the anti-resonant hollow-core fiber in FIG. 21*a;*
FIG. 21*c* is a simulation plot of a confinement loss changing with $D_3$/a in the anti-resonant hollow-core fiber in FIG. 21*a;*
FIG. 21*d* is a schematic diagram of a confinement loss of the anti-resonant hollow-core fiber in FIG. 21*a* changing with a wavelength in cases of different spacings d.

FIG. 21*a* is a schematic diagram of a variant structure with double layers of nested elements (i.e., a double-layer nested structure) being provided in each of the first cladding primary elements and the first cladding secondary elements of the anti-resonant hollow-core fiber according to the fifth exemplary embodiment of the present disclosure. Different from the exemplary structure in FIG. 20a, the inner surface of the outer jacket tube of the anti-resonant hollow-core fiber in FIG. 21a is irregular. The size of the first cladding primary element may change according to the spacing d between the first cladding primary elements. In addition, the size of the first cladding secondary element is the same as that of the first cladding primary element.

Figure 21B:
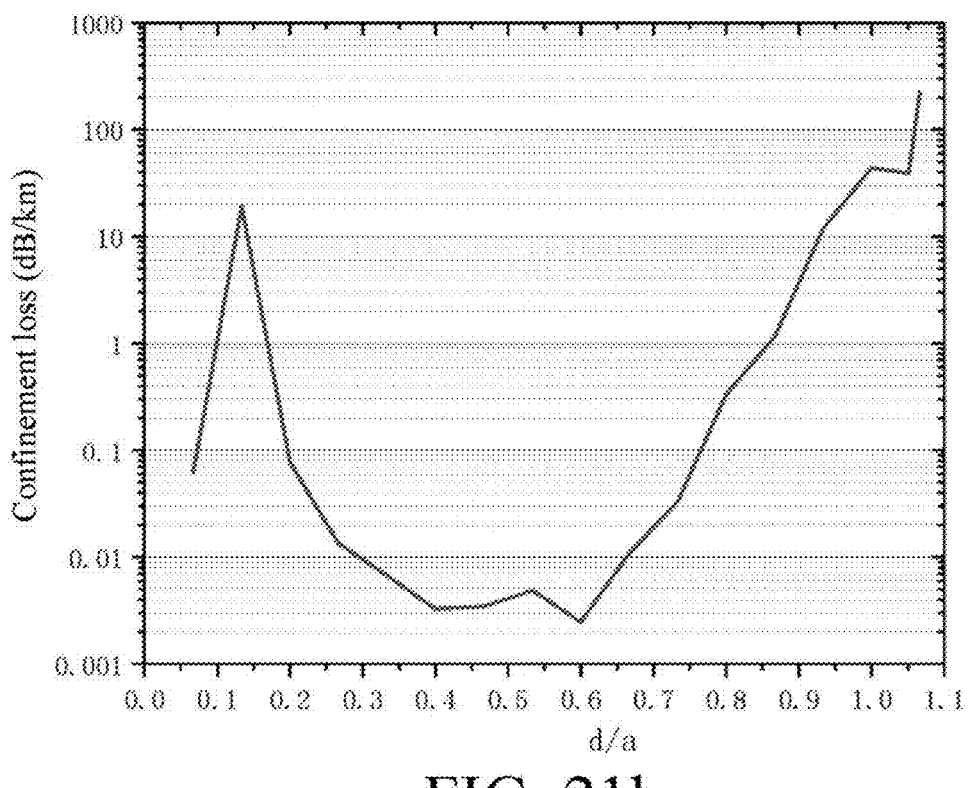
Figure 21C:
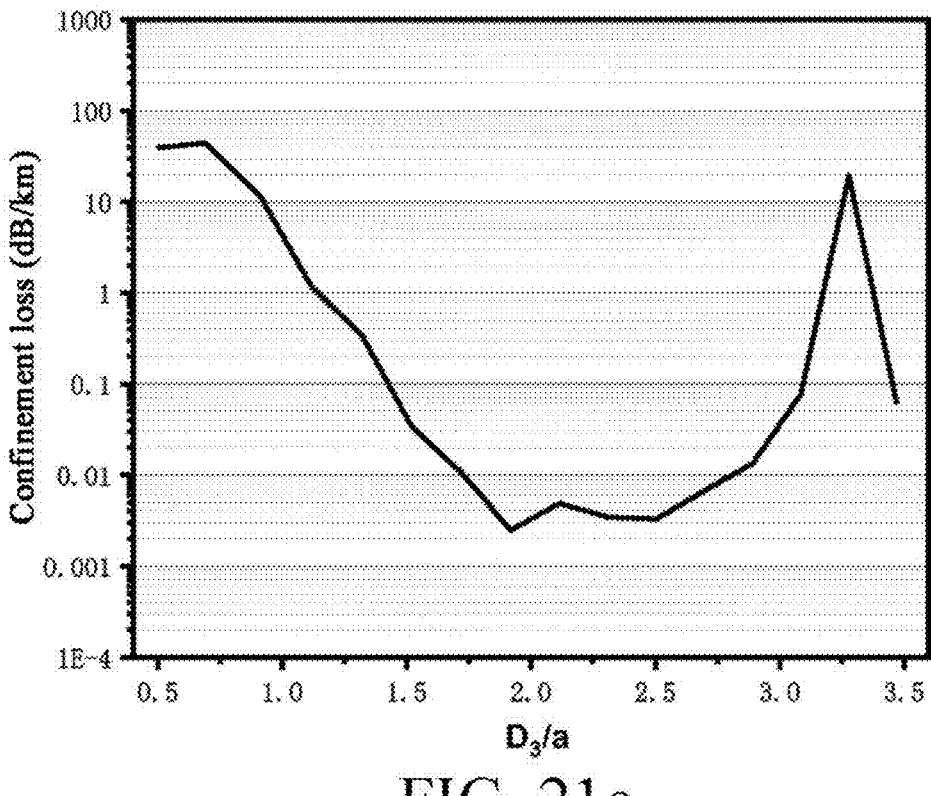
Figure 21D:
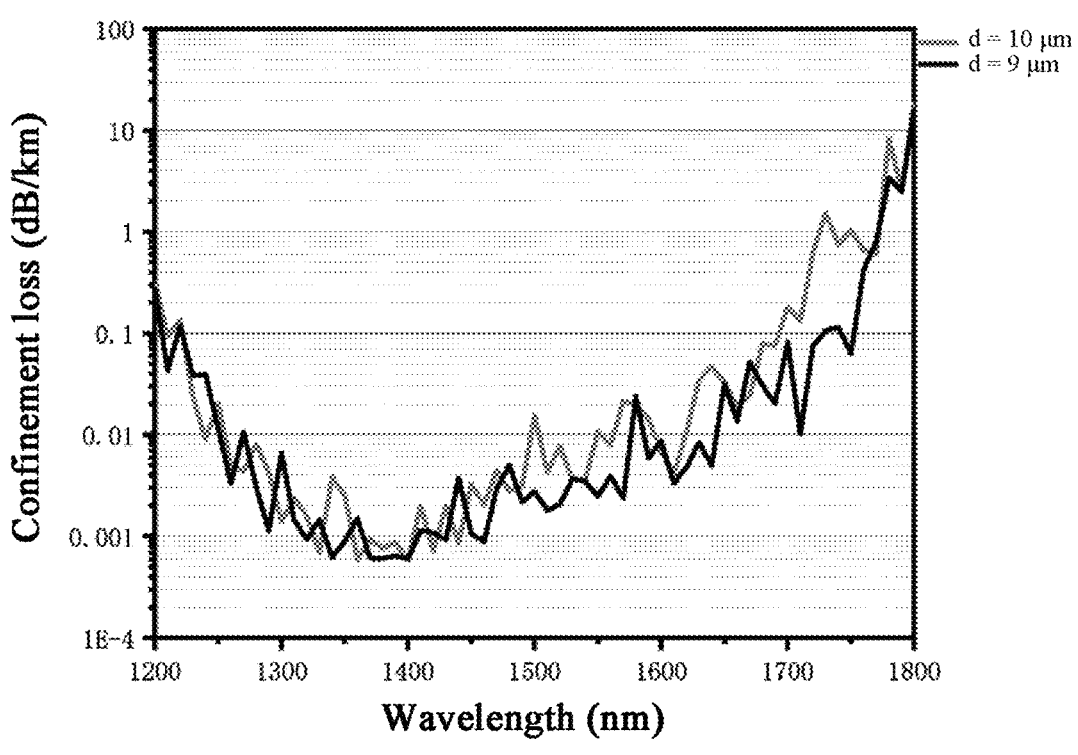

FIG. 21b is a simulation plot of a confinement loss of the anti-resonant hollow-core fiber in FIG. 21a changing with d/a. Simulation results show that when the ratio of the spacing d to a is within a range of 0.15 to 0.87, the confinement loss thereof may be basically restricted within a range below 1 db/km, or even within a range below 0.1 db/km. FIG. 21c is a simulation plot of a confinement loss of the anti-resonant hollow-core fiber in FIG. 21a changing with $D_3$/a. Simulation results show that when the ratio of $D_3$ to a is greater than 1.2 and less than 3.5, the confinement loss may be basically controlled at a low level, or even within a range below 0.1 db/km or 0.01 db/km. In addition, FIG. 21d is a schematic diagram of a confinement loss of the anti-resonant hollow-core fiber in FIG. 21a changing with a wavelength in cases of different spacings d. The spacings d are respectively 10 μm and 9 μm. The simulation in FIG. 21d may show that a slight increase in the spacing d generates no substantial impact on the confinement loss. Particularly, in a case that only three first cladding primary elements are provided in the anti-resonant hollow-core fiber, when the fiber core increases in size, a ratio requirement may be further relaxed, for example, may reach d/a<1, or even d/a<1.3, or even d/a<1.5.

It should be understood that with the presence of the first cladding secondary elements in FIG. 19a to FIG. 21d above, the spacing d between two adjacent first cladding primary elements may be relaxed, thereby increasing the redundancy for the spacing d between two adjacent first cladding primary elements, which lowers a drawing requirement of the anti-resonant hollow-core fiber in the present disclosure.

Figure 2:
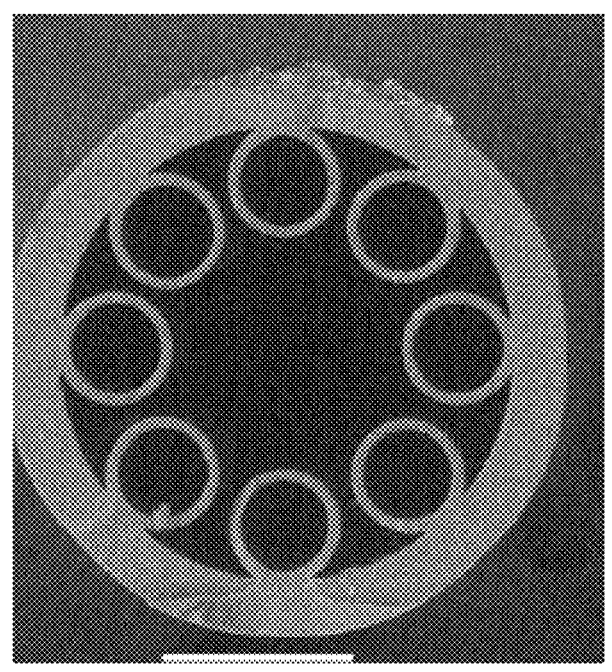
FIG. 2 shows a conventional single-circle non-contact configuration of an anti-resonant hollow-core fiber.
Figure 22A:
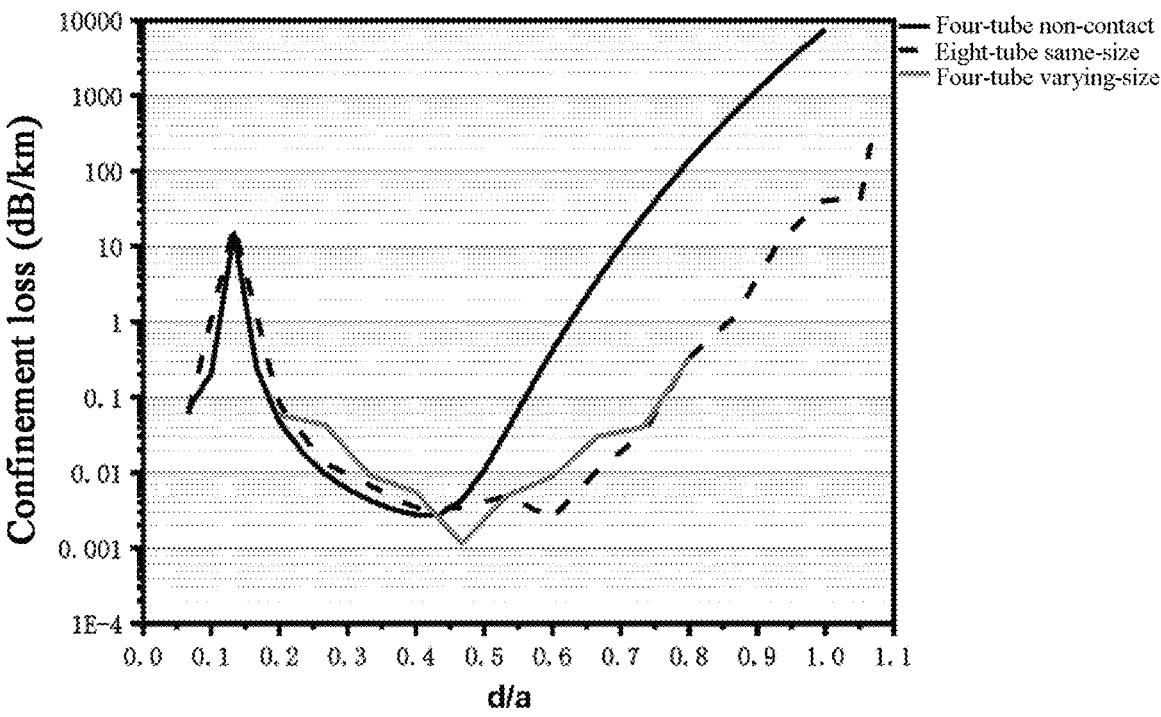
Figure 22B:
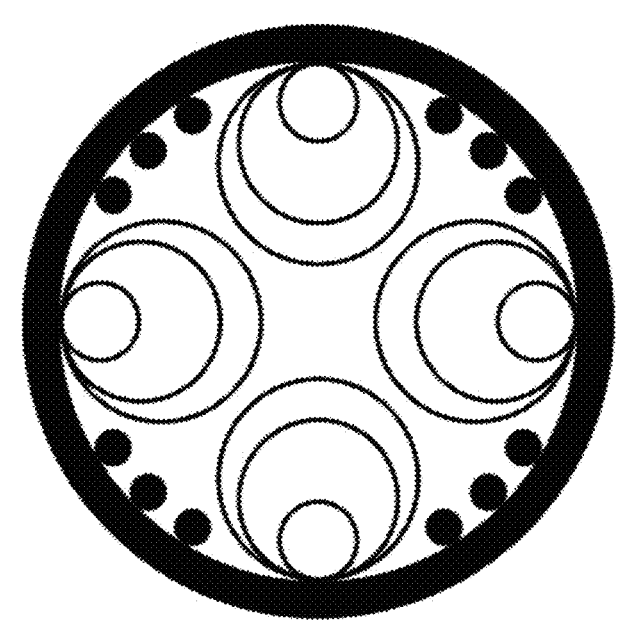
FIG. 22*b* is a schematic structural diagram of a four-tube non-contact structure without the first cladding secondary elements for comparison.
Figure 22C:
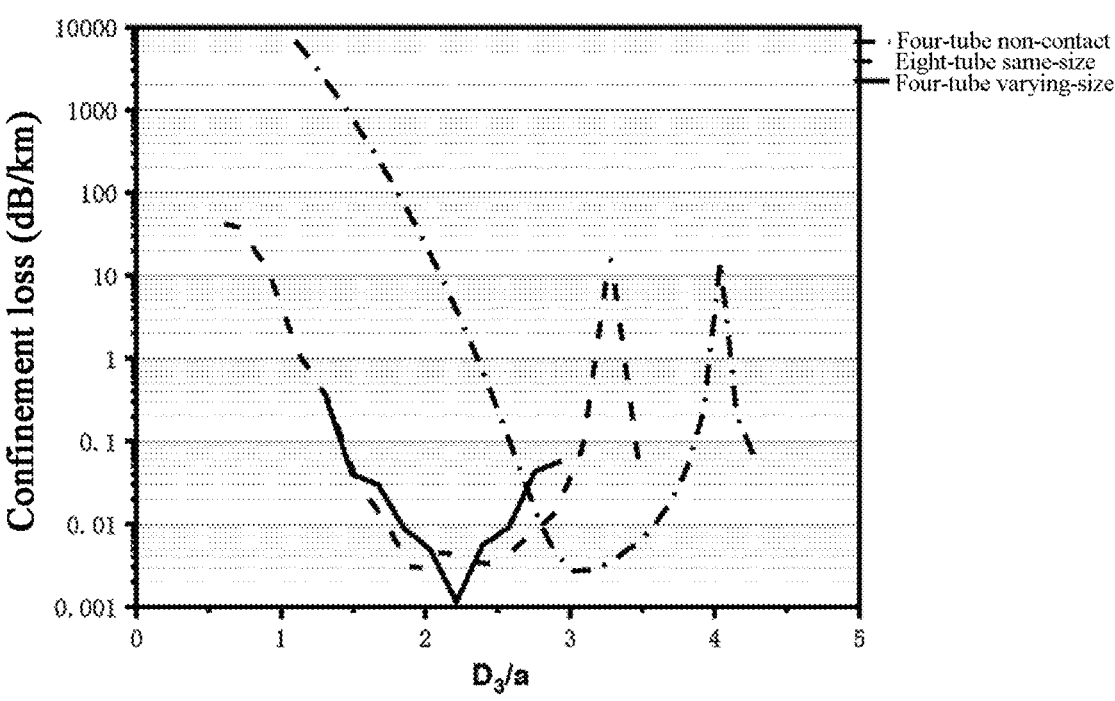

As a comparison, FIG. 22a is a comparison simulation plot of confinement losses of the structure (the first cladding primary elements have a same size that is different from sizes of the first cladding secondary elements) in FIG. 20a of the anti-resonant hollow-core fiber according to the fifth exemplary embodiment of the present disclosure, the structure (the first cladding primary elements and the first cladding secondary elements have the same size) in FIG. 21a, and a four-tube non-contact structure without the first cladding secondary elements in FIG. 22b changing with d/a; FIG. 22c is a comparison simulation plot of confinement losses of the structure (the first cladding primary elements have a same size that is different from sizes of the first cladding secondary elements) in FIG. 20a of the anti-resonant hollow-core fiber according to the fifth exemplary embodiment of the present disclosure, the structure (the first cladding primary elements and the first cladding secondary elements have the same size) in FIG. 21a, and a four-tube non-contact structure without the first cladding secondary elements in FIG. 22b changing with $D_3$/a. It should be noted herein that FIG. 22b is a schematic structural diagram of a four-tube non-contact structure without the first cladding secondary elements for comparison. Similar to the structures in FIG. 20a and FIG. 21a, the structure in FIG. 22b includes four first cladding primary elements. Each first cladding primary element includes a double-layer nested structure. However, the four-tube non-contact structure does not include a first cladding secondary element. In addition, a plurality of solid quartz rods are further provided between adjacent first cladding primary elements. As can be seen from FIG. 22a and FIG. 22c, compared with the confinement loss of the anti-resonant hollow-core fiber with the four-tube non-contact structure in FIG. 22b, the confinement loss of the anti-resonant hollow-core fiber in the fifth exemplary embodiment of the present disclosure may basically be maintained below 1 db/km. As a comparison, the confinement loss of the anti-resonant hollow-core fiber with the non-contact structure in FIG. 2 is greatly increased after d/a is greater than 0.6 or $D_3$/a is less than 2.

Figure 23A:
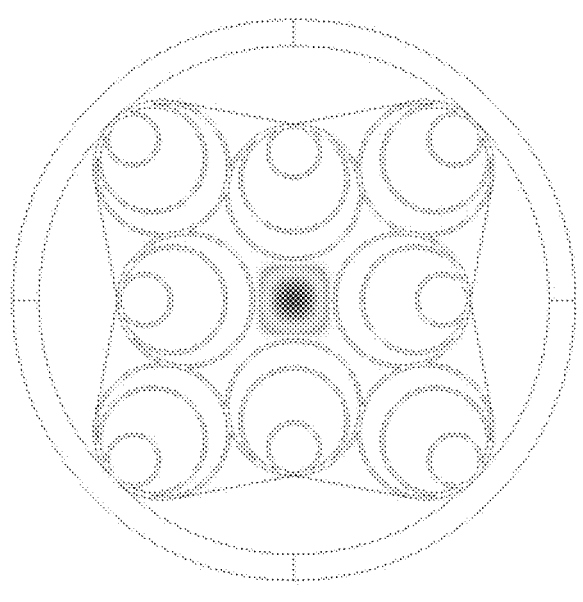
FIG. 23*a* and FIG. 23*b* are respectively schematic structural diagrams of a strong contact and a weak contact being provided between two adjacent first cladding elements.
Figure 23B:
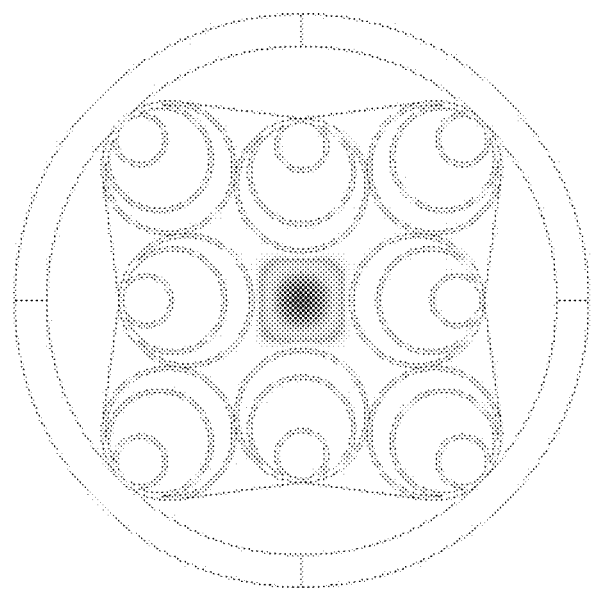

FIG. 23a and FIG. 23b are respectively schematic structural diagrams of a strong contact and a weak contact being provided between two adjacent first cladding elements. The term "weak contact" is defined as that two adjacent first cladding elements are just in contact. The term "strong contact" is discussed relative to "weak contact", and is defined as that a contact area between two adjacent first cladding elements is relatively large.

Figure 23C:
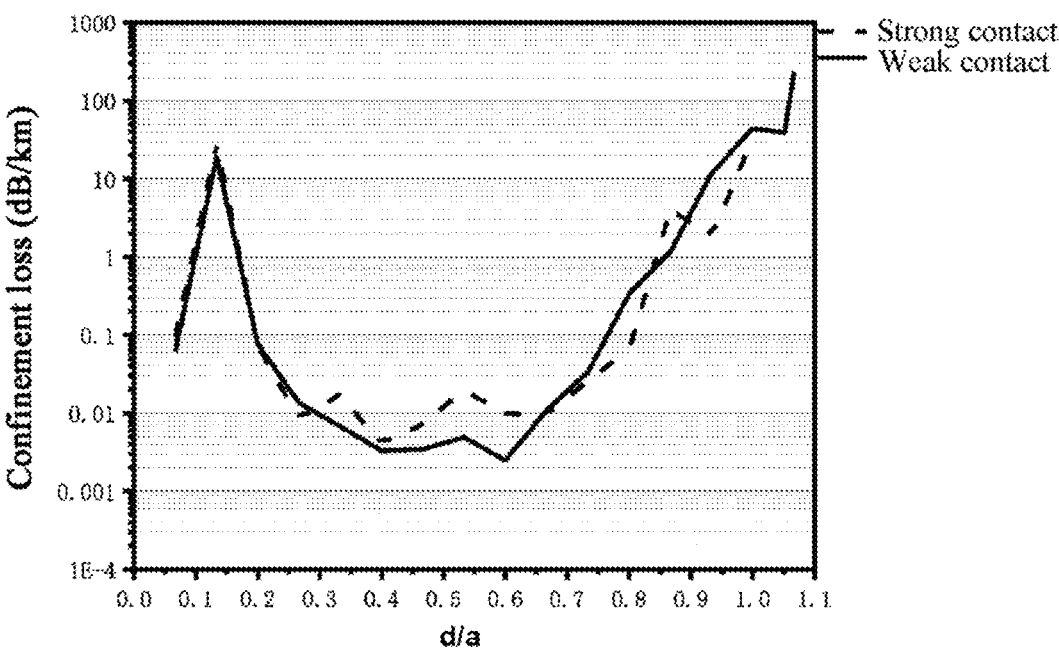
Figure 23D:
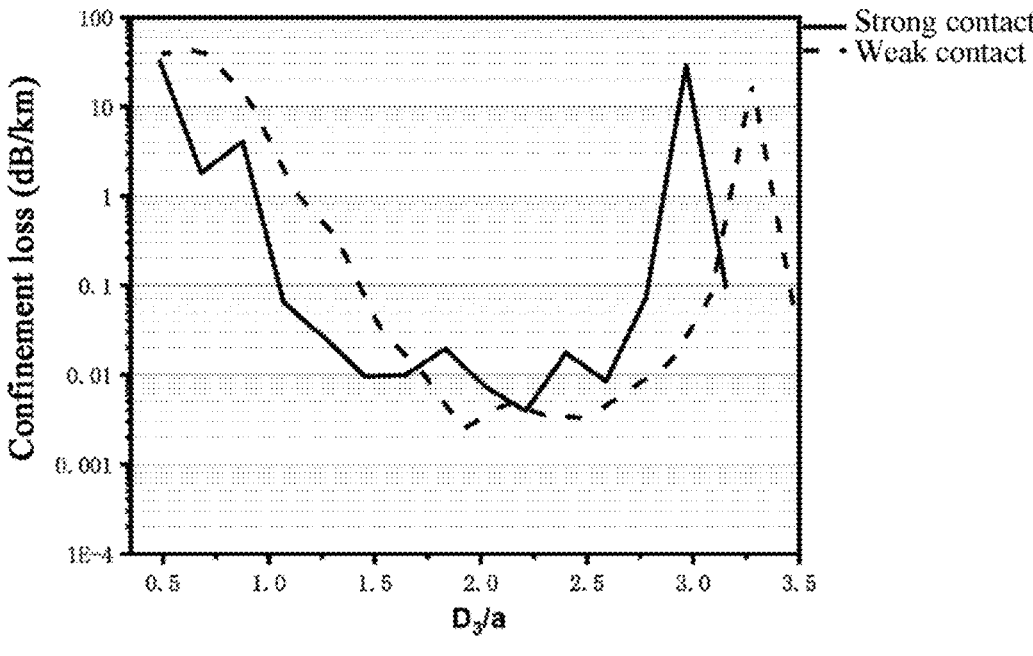

FIG. 23c is a comparison simulation plot of confinement losses of the anti-resonant hollow-core fiber according to the fifth exemplary embodiment of the present disclosure in cases of a strong contact and a weak contact changing with d/a. FIG. 23d is a comparison simulation plot of confinement losses of the anti-resonant hollow-core fiber according to the fifth exemplary embodiment of the present disclosure in cases of a strong contact and a weak contact changing with $D_3$/a. Simulation results in FIG. 23c and FIG. 23d show that the strong contact and the weak contact have no significant impact on the confinement loss of the anti-resonant hollow-core fiber in the present disclosure. This is very favorable to an actual drawing process because a requirement of a drawing process is relaxed.

Figure 23E:
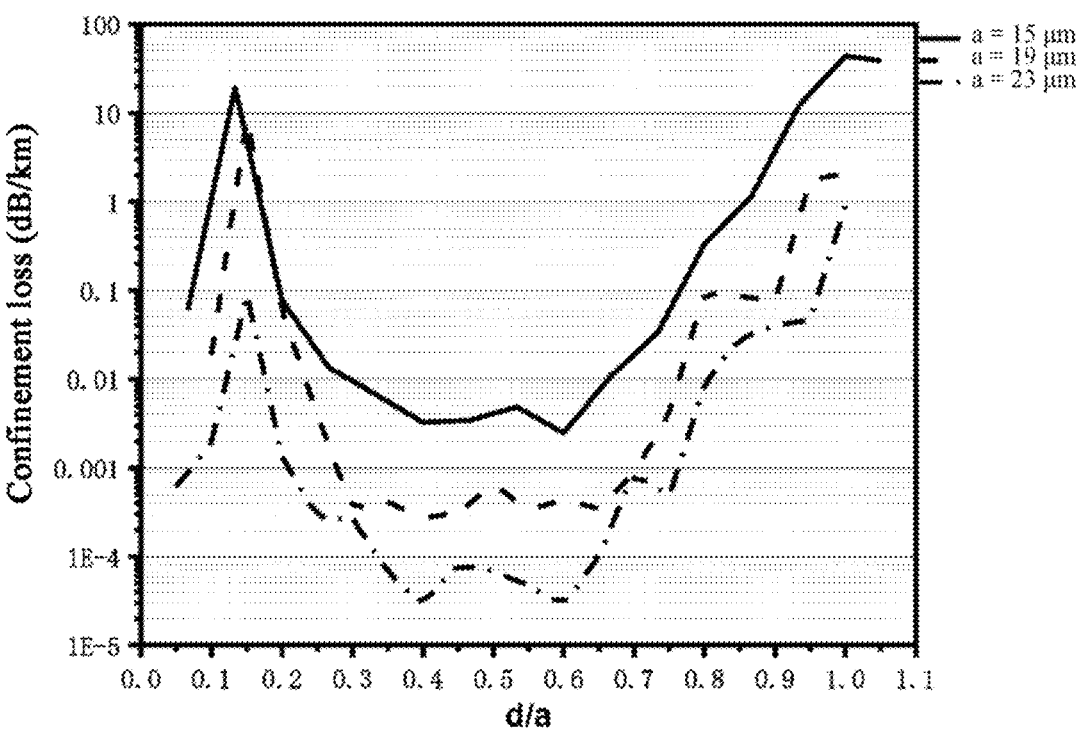
Figure 23F:
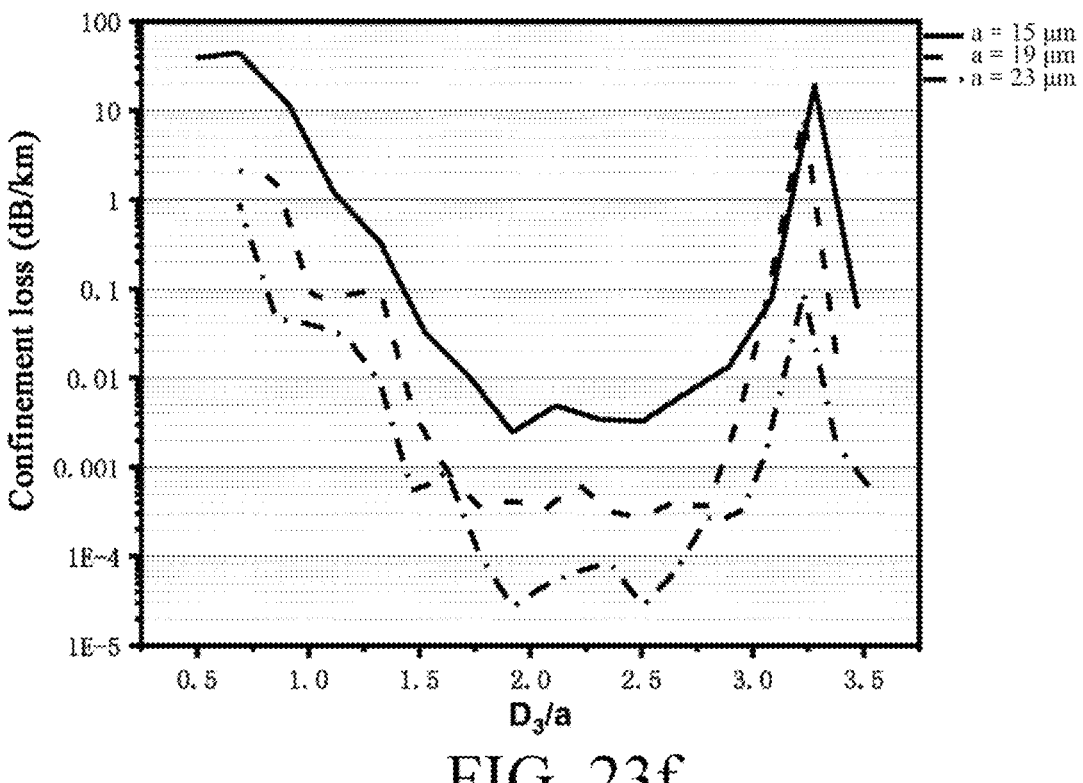

In addition, as research examples of impacts of different core radii on the confinement loss, FIG. 23e is a comparison simulation plot of confinement losses of the anti-resonant hollow-core fiber according to the fifth exemplary embodiment of the present disclosure in different core radii changing with d/a, and FIG. 23f is a comparison simulation plot of confinement losses of the anti-resonant hollow-core fiber according to the fifth exemplary embodiment of the present disclosure in different core radii changing with $D_3$/a. As can be seen from FIG. 23e and FIG. 23f, different core radii (for example, the core radii shown in the figures are respectively 23 μm, 19 μm, and 15 μm) may also generate corresponding impacts on the confinement loss. When the core radius is larger, a corresponding effect in the confinement loss is better. Therefore, in some cases, the confinement loss of the optical fiber can be adjusted by increasing the core radius of the anti-resonant hollow-core fiber in the present disclosure.

OTHER EXEMPLARY EMBODIMENTS

Figure 24A:
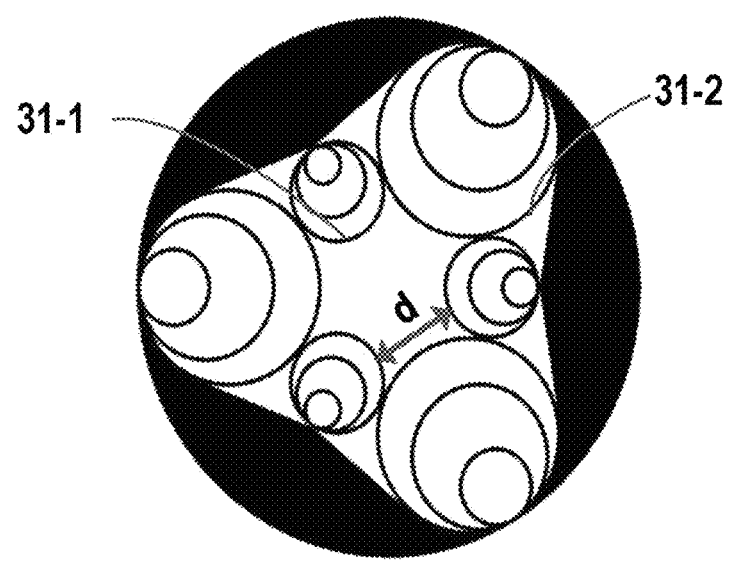
FIG. 24*a* is a schematic structural diagram of a variant embodiment of an anti-resonant hollow-core fiber according to the present disclosure.
Figure 24B:
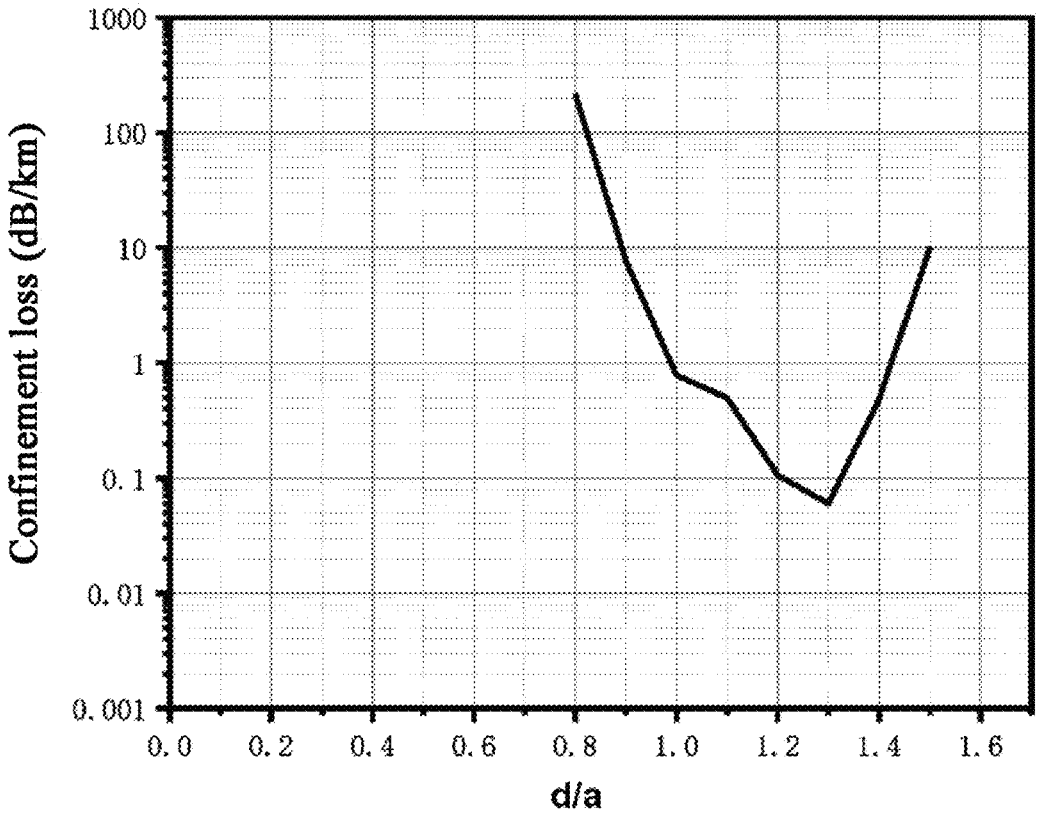
FIG. 24*b* is a simulation plot of a confinement loss changing with d/a in the anti-resonant hollow-core fiber according to FIG. 24*a;*
Figure 24C:
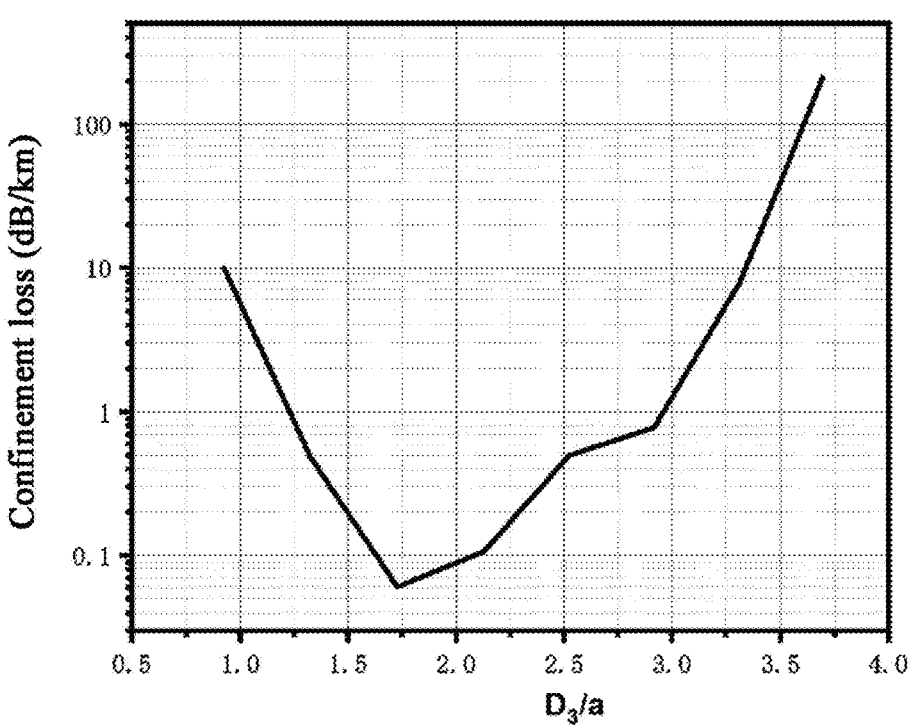
FIG. 24*c* is a simulation plot of a confinement loss changing with $D_3$/a in the anti-resonant hollow-core fiber according to FIG. 24*a;*

FIG. 24a is a schematic structural diagram of a variant embodiment of an anti-resonant hollow-core fiber according to the present disclosure. Cladding elements in the anti-resonant hollow-core fiber includes three first cladding primary elements 31-1 and three first cladding secondary elements 31-2. Sizes of the first cladding primary elements are much smaller than those of the first cladding secondary elements. FIG. 24b is a simulation plot of a confinement loss changing with d/a in the anti-resonant hollow-core fiber according to FIG. 24a. FIG. 24c is a simulation plot of a confinement loss changing with $D_3$/a in the anti-resonant hollow-core fiber according to FIG. 24a. The core radius is selected to be 20 μm. Simulation results show that through the selection of an appropriate structure and appropriate related parameters of the anti-resonant hollow-core fiber, for example, $1<d/a<1.4$, and/or $1.25<D_3/a<3$, the confinement loss may be controlled at an appropriate level, for example, below 1 db/km.

Figure 24D:
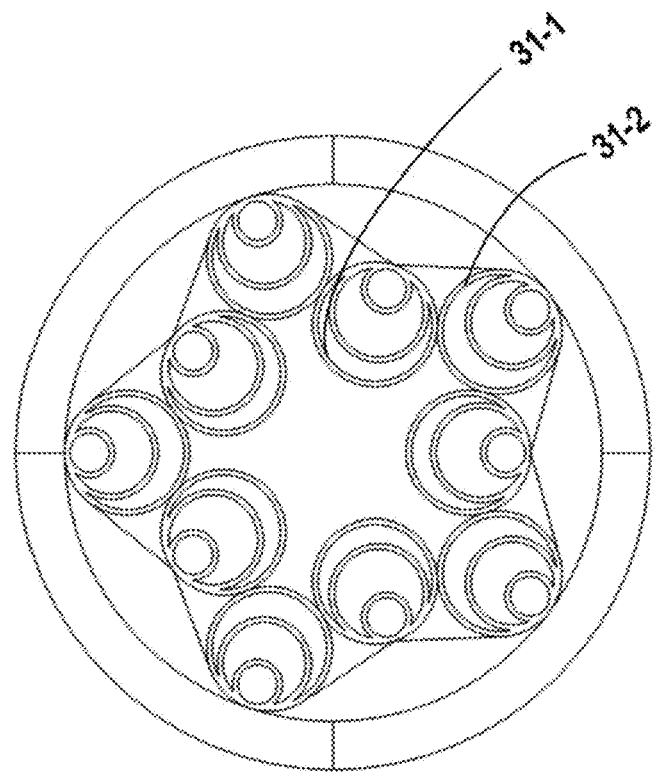
FIG. 24*d* is a schematic structural diagram of another variant embodiment of an anti-resonant hollow-core fiber according to the present disclosure.
Figure 24E:
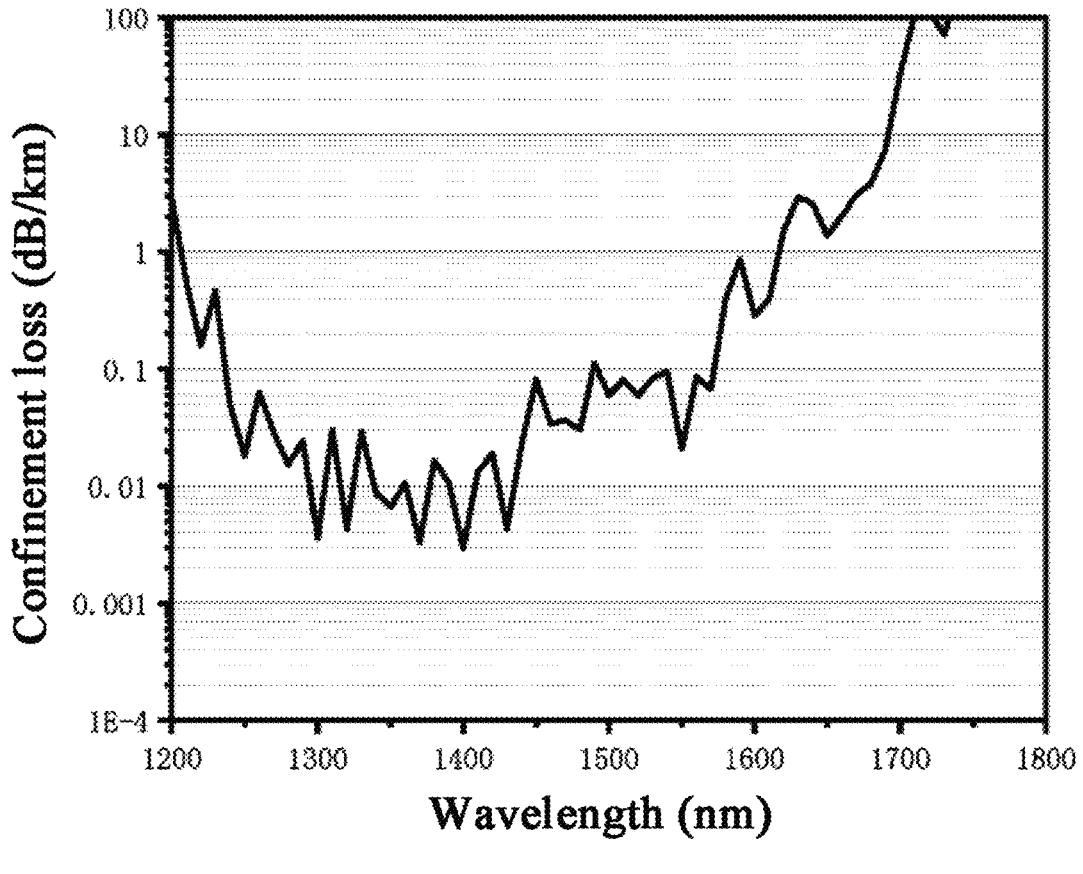
FIG. 24*e* is a simulation plot of a confinement loss of the anti-resonant hollow-core fiber according to FIG. 24*d* changing with a wavelength; (a), (b), and (c) in FIG. 25*a* are respectively schematic structural diagrams of two layers of nested elements being provided in each of first cladding primary elements and first cladding secondary elements of an anti-resonant hollow-core fiber in the present disclosure.

FIG. 24d is a schematic structural diagram of another variant embodiment of an anti-resonant hollow-core fiber according to the present disclosure. Cladding elements in the anti-resonant hollow-core fiber includes five first cladding primary elements 31-1 and five first cladding secondary elements 31-2. The first cladding primary elements and the first cladding secondary elements have a same shape and a same size. FIG. 24e is a simulation plot of a confinement loss of the anti-resonant hollow-core fiber according to FIG. 24d changing with a wavelength. As can be seen from FIG. 24e, within a wave band range of 1250 nm to 1600 nm, the confinement loss may be controlled at a preferred level of 0.1 db/km.

Figure 25A:
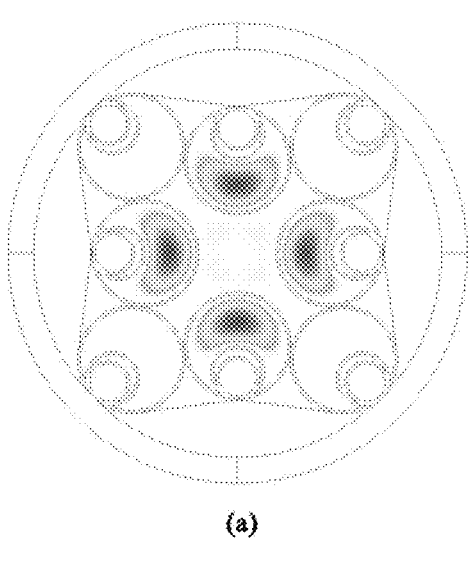
FIG. 25*b* is a simulation comparison plot of confinement losses of a core fundamental mode and a higher-order mode of the anti-resonant hollow-core fiber in FIG. 25*a* changing with a size ratio m of a first primary nested element to the first cladding primary element.
FIG. 25*c* is a simulation plot of a higher-order mode suppression ratio of the anti-resonant hollow-core fiber in FIG. 25*a* changing with a size ratio m of a first primary nested element to the first cladding primary element.
FIG. 25*d* is a simulation comparison plot of effective refractive indexes of a core fundamental mode, a higher-order mode, and an inter-tube cavity region mode of the anti-resonant hollow-core fiber in FIG. 25*a* changing with a size ratio m of a first primary nested element to the first cladding primary element.
Figure 25A:
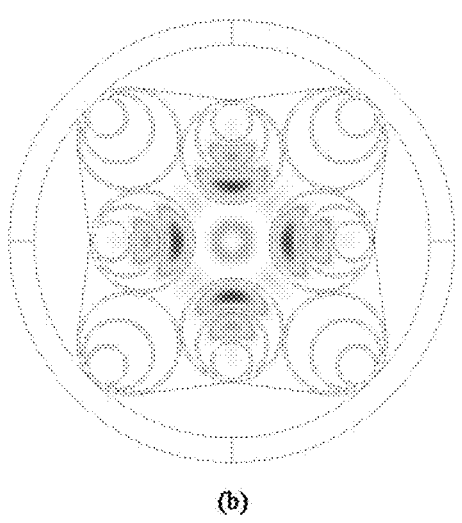
Figure 25A:
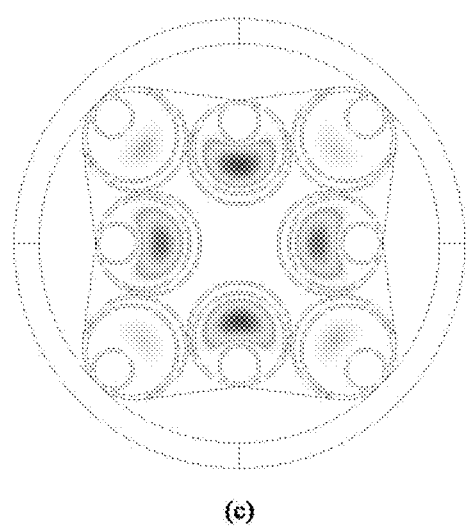

(a), (b), and (c) in FIG. 25a are respectively schematic structural diagrams of two layers of nested elements being provided in each of first cladding primary elements and first cladding secondary elements of an anti-resonant hollow-core fiber in the present disclosure. A size ratio m of the first primary nested element to the first cladding primary element is changed. In (a), m is equal to 0.5, in (b), m is equal to 0.7, and in (c), m is equal to 0.9.

Figure 25B:
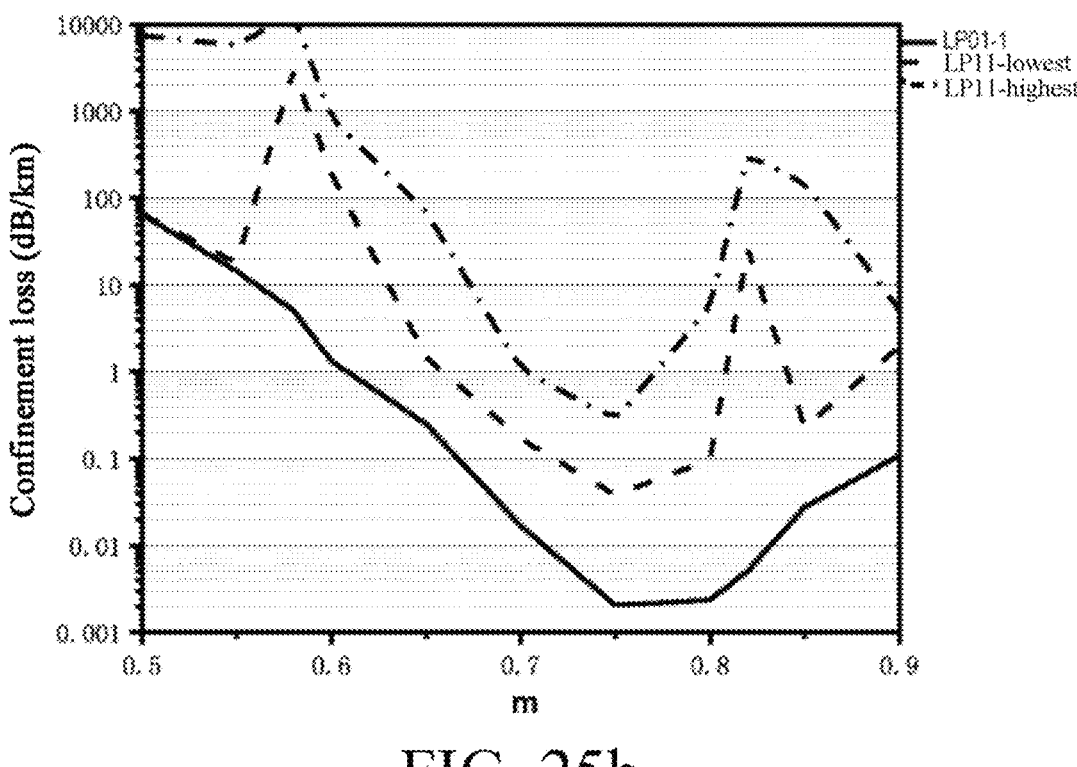
Figure 25C:
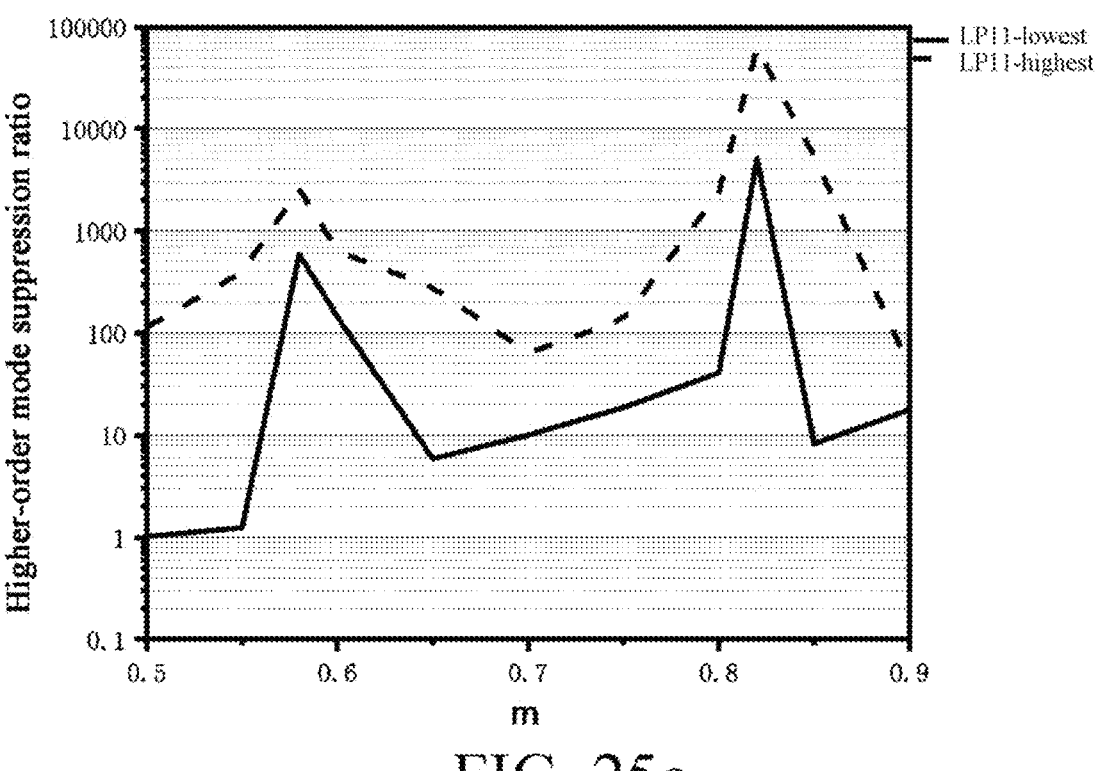
Figure 25D:
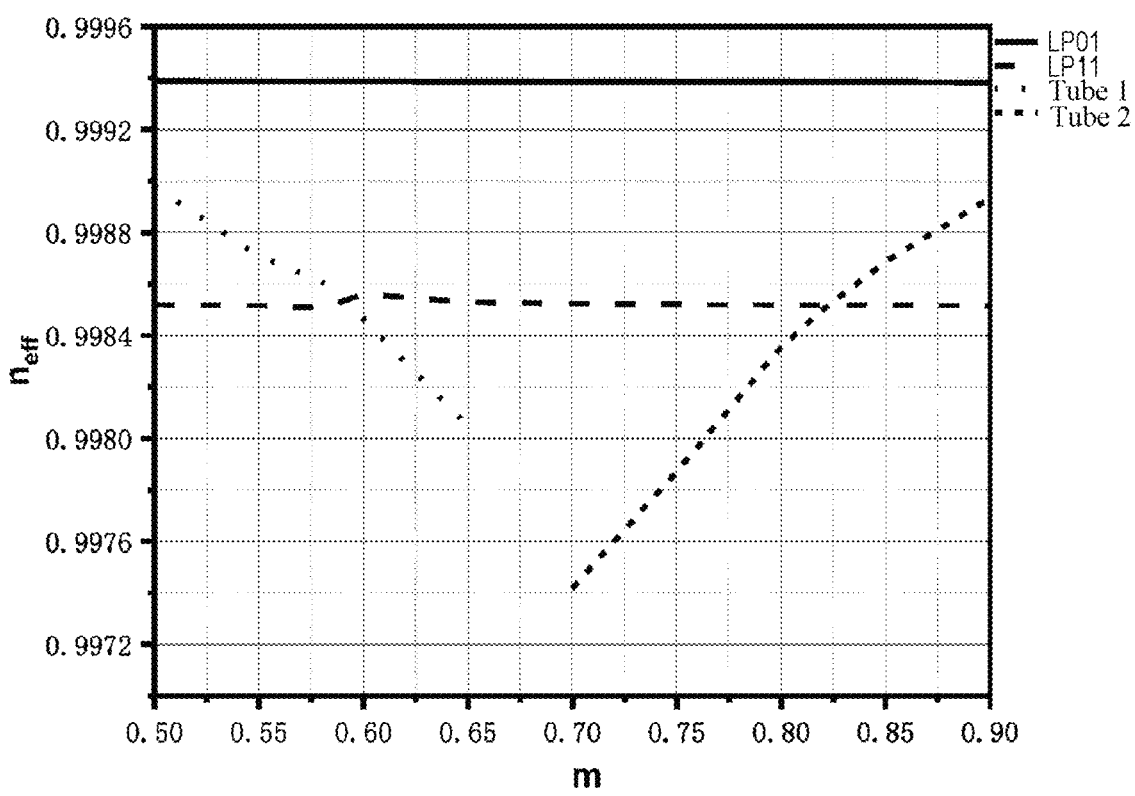

FIG. 25b is a simulation comparison plot of confinement losses of a core fundamental mode and a higher-order mode of the anti-resonant hollow-core fiber in FIG. 25a changing with a size ratio m of a first primary nested element to the first cladding primary element; FIG. 25c is a simulation plot of a higher-order mode suppression ratio of the anti-resonant hollow-core fiber in FIG. 25a changing with a size ratio m of a first primary nested element to the first cladding primary element; FIG. 25d is a simulation comparison plot of effective refractive indexes of a core fundamental mode, a higher-order mode, and an inter-tube cavity region mode of the anti-resonant hollow-core fiber in FIG. 25a changing with a size ratio m of a first primary nested element to the first cladding primary element. As can be seen from FIG. 25b and FIG. 25c, a confinement loss of a higher-order mode and a higher-order mode suppression ratio of the anti-resonant hollow-core fiber in FIG. 25a are adjusted to appropriate ranges by changing the size ratio of the first primary nested element to the first cladding element. As can be seen from FIG. 25d, a change in the size ratio m of the first primary nested element to the first cladding primary element has a large impact on an effective refractive index of a cavity region between nested tubes of the anti-resonant hollow-core fiber, and does not have a large impact on effective refractive indexes of a fundamental mode LP01 and a higher-order mode LP11 of the anti-resonant hollow-core fiber. Particularly, as m changes, for example, when $0.5<m<0.65$, a gradual decrease in an area of a cavity between the first primary nested element and a second primary nested element nested in the first cladding primary element makes an effective refractive index of a fundamental mode at the cavity gradually approach the effective refractive index of the higher-order mode LP11. When m is equal to 0.58 at an intersection, phases of the higher-order mode LP11 and the fundamental mode at the cavity match, and as a result LP11 leaks from the cavity, and the loss increases, making the higher-order mode suppression ratio increase. When $0.7<m<0.9$, an area of a cavity between the second primary nested element and a third primary nested element nested in the first cladding primary element gradually increases, an effective refractive index gradually increases and approaches LP11. When m is equal to 0.82 at an intersection, phases of the higher-order mode LP11 and the fundamental mode at the cavity match, and as a result LP11 leaks from the cavity, and the loss increases, making the higher-order mode suppression ratio increase.

Figure 26A:
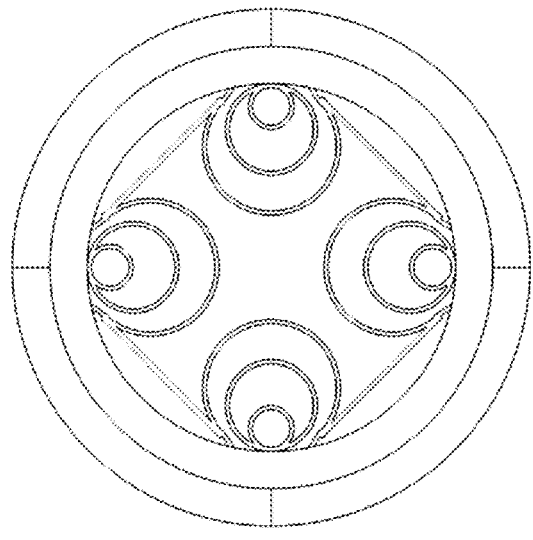
FIG. 26*a*, FIG. 26*b*, and FIG. 26*c* are schematic structural diagrams of some other variant examples of an anti-resonant hollow-core fiber according to the present disclosure.
Figure 26B:
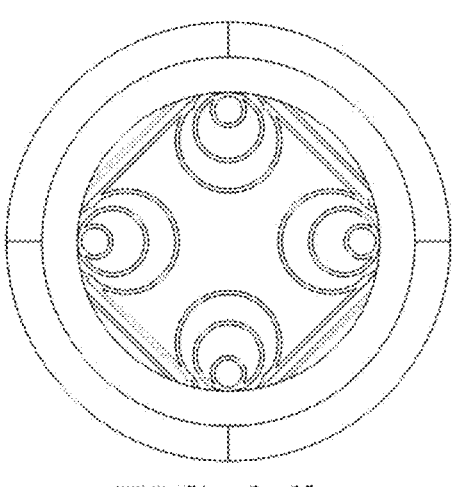
Figure 26C:
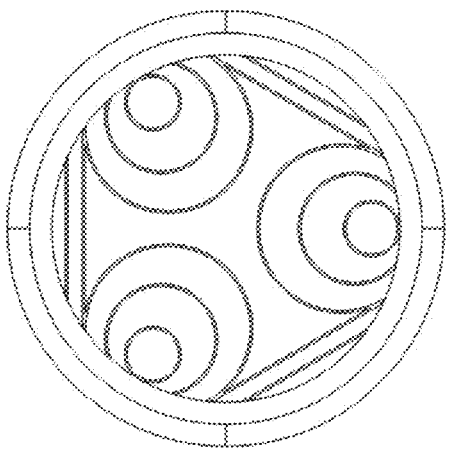
Figure 26D:
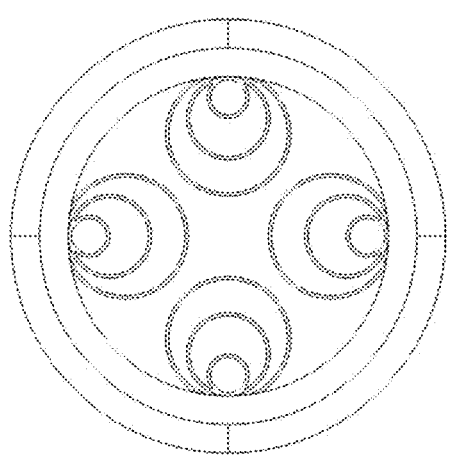
FIG. 26*d* is a schematic structural diagram of an existing anti-resonant hollow-core fiber including four groups of cladding elements formed by circular tube units.

FIG. 26a, FIG. 26b, and FIG. 26c are schematic structural diagrams of some other variant examples of an anti-resonant hollow-core fiber according to the present disclosure. Cladding elements in FIG. 26a include four first cladding primary elements that are basically circular tubes and four first cladding secondary elements that are only formed by one straight wall. A difference between FIG. 26b and FIG. 26a lies in that a nested element used as a straight wall in FIG. 26b is further provided between the first cladding secondary element used as the straight wall and an outer jacket tube. A difference between FIG. 26c and FIG. 26b lies in that cladding elements in FIG. 26c only include three first cladding primary elements that are basically circular tubes. As a comparison, FIG. 26d is a schematic structural diagram of an existing anti-resonant hollow-core fiber including four groups of cladding elements formed by circular tube units.

Figure 26E:
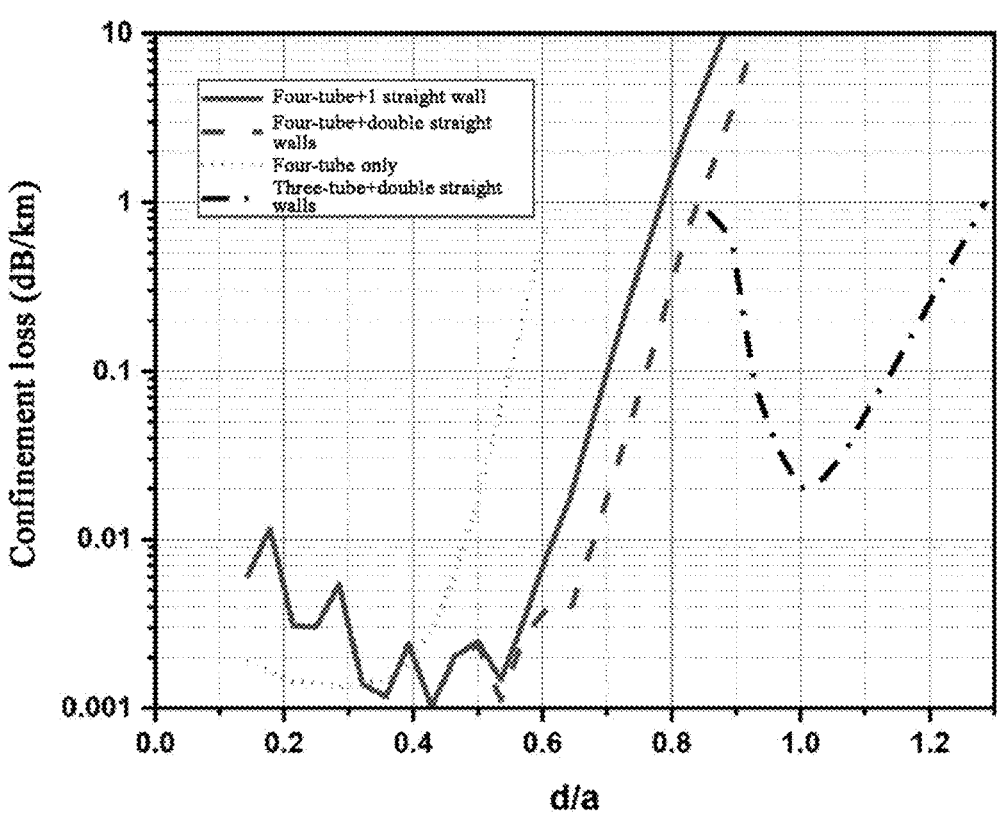
Figure 26F:
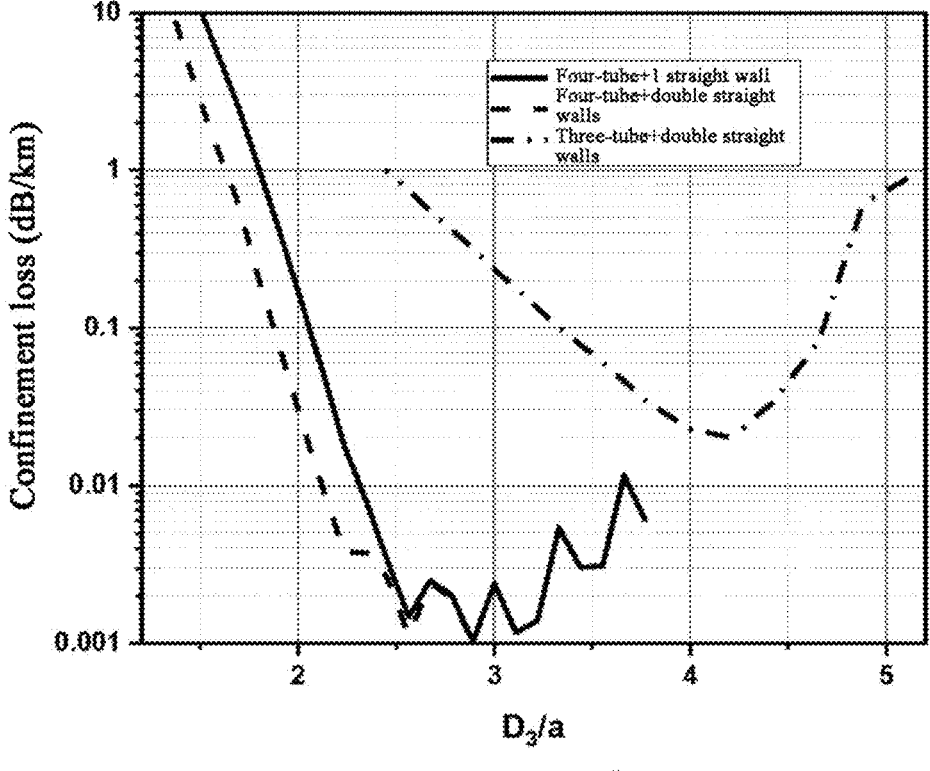
Figure 26G:
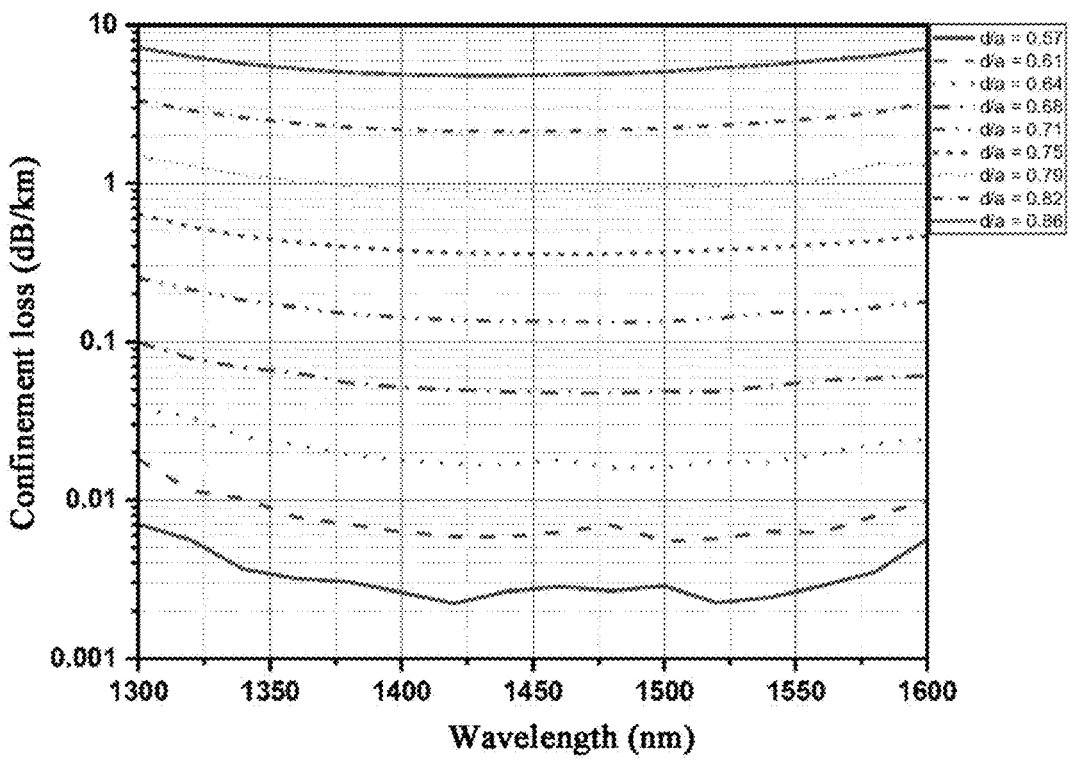
FIG. 26*g* is a simulation plot of confinement losses of the anti-resonant hollow-core fiber according to FIG. 26*a* in different cases of d/a changing with a wavelength.
Figure 26H:
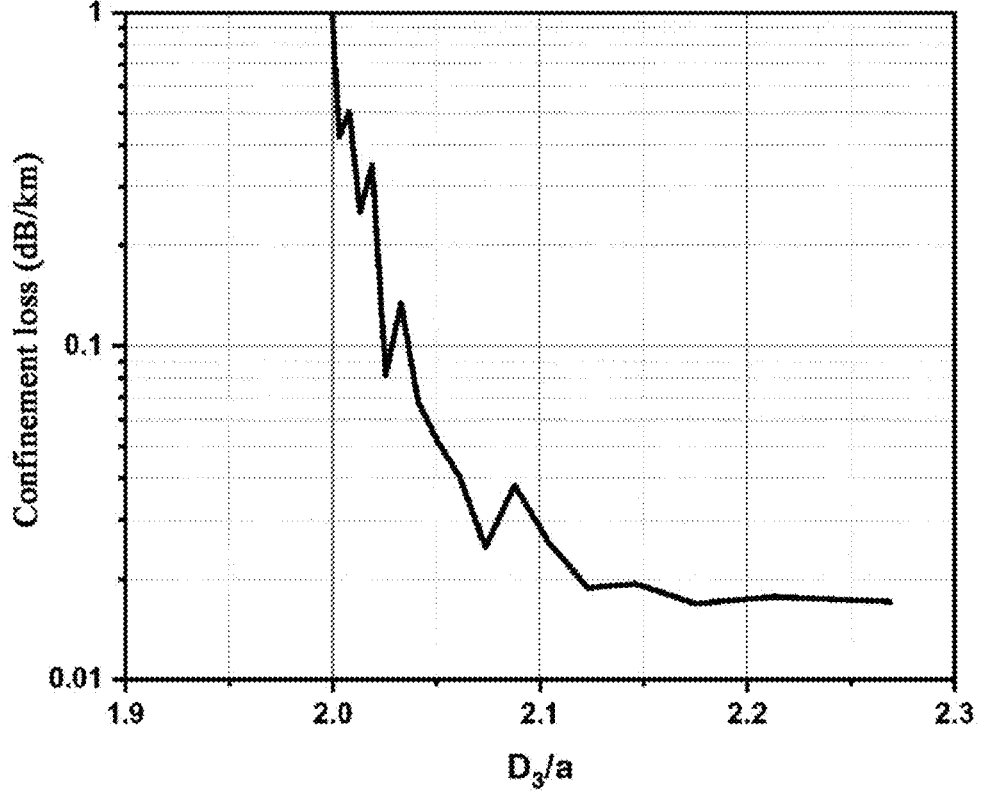
FIG. 26*h* is a simulation plot of confinement losses of the anti-resonant hollow-core fiber according to FIG. 26*a* in different cases of $D_3$/a changing with a wavelength.

FIG. 26e is a comparison simulation plot of confinement losses of the anti-resonant hollow-core fibers according to FIG. 26a to FIG. 26d changing with d/a. FIG. 26f is a comparison simulation plot of confinement losses of the anti-resonant hollow-core fibers according to FIG. 26a to FIG. 26c changing with $D_3/a$. FIG. 26g is a simulation plot of confinement losses of the anti-resonant hollow-core fiber according to FIG. 26a in different cases of d/a changing with a wavelength. FIG. 26h is a simulation plot of confinement losses of the anti-resonant hollow-core fiber according to FIG. 26a in different cases of $D_3/a$ changing with a wavelength. As can be seen from FIG. 26e, although a contact point is provided between adjacent first cladding elements in FIG. 26a to FIG. 26c, through the optimization of the ratio d/a, the confinement loss of the anti-resonant hollow-core fiber may still be restricted within a preferred range, for example, a range below 1 db/km or even 0.1 db/km. As can be seen from FIG. 26g and FIG. 26h, appropriate ratios d/a and $D_3/a$ of the anti-resonant hollow-core fiber in FIG. 26a may be selected to restrict the confinement loss of the anti-resonant hollow-core fiber at a low loss level.

It should be noted herein that the structures of the anti-resonant hollow-core fibers in the present disclosure drawn above are optimal structures. In an actual drawing process, the structures of the anti-resonant hollow-core fibers may deform under the action of a pressure.

Figure 27A:
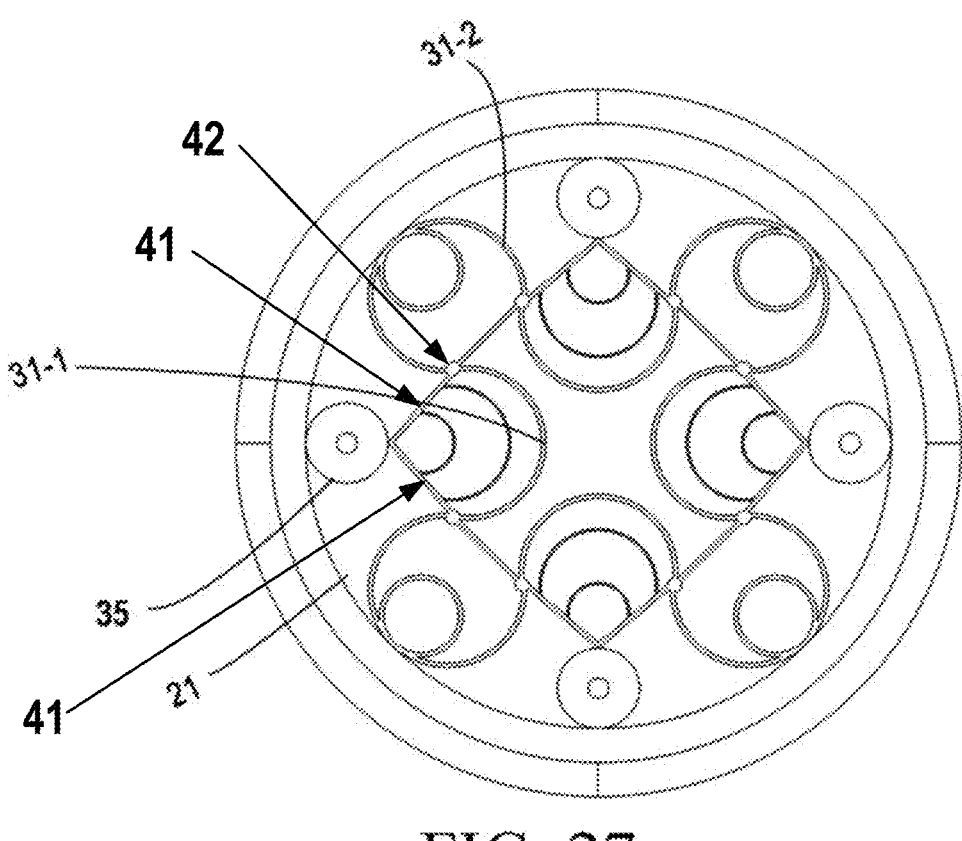
FIG. 27*a* shows a possible variant structure of the structure in FIG. 25*a* in an actual drawing process.

As an example, FIG. 27a shows a possible variant structure of the structure in FIG. 25a in an actual drawing process. First cladding primary elements 31-1 and first cladding secondary elements 31-2 that basically have a full tube shape may be turned into an irregular circular shape. The reason is that tube walls between the contact points between two adjacent first cladding elements 31 are pulled straight during drawing. In addition, because support members 35 (for example, quartz cylinders) may be arranged between the first cladding primary element and the inner surface of the outer jacket tube, so that four support members 35 are respectively tangential to the corresponding first cladding primary element and the inner surface 21 of the outer jacket tube. In this case, tube side walls 41 of the first cladding primary element 31-1 between the contact points 42 and the support members 35 may also be pulled straight during drawing. As shown in FIG. 27a, the first cladding primary element 31-1 has a fan shape with two side walls 41 being substantially straight. In addition, the contact points 42 between two adjacent first cladding elements may also turn thicker due to compression in a drawing process.

Figure 27B:
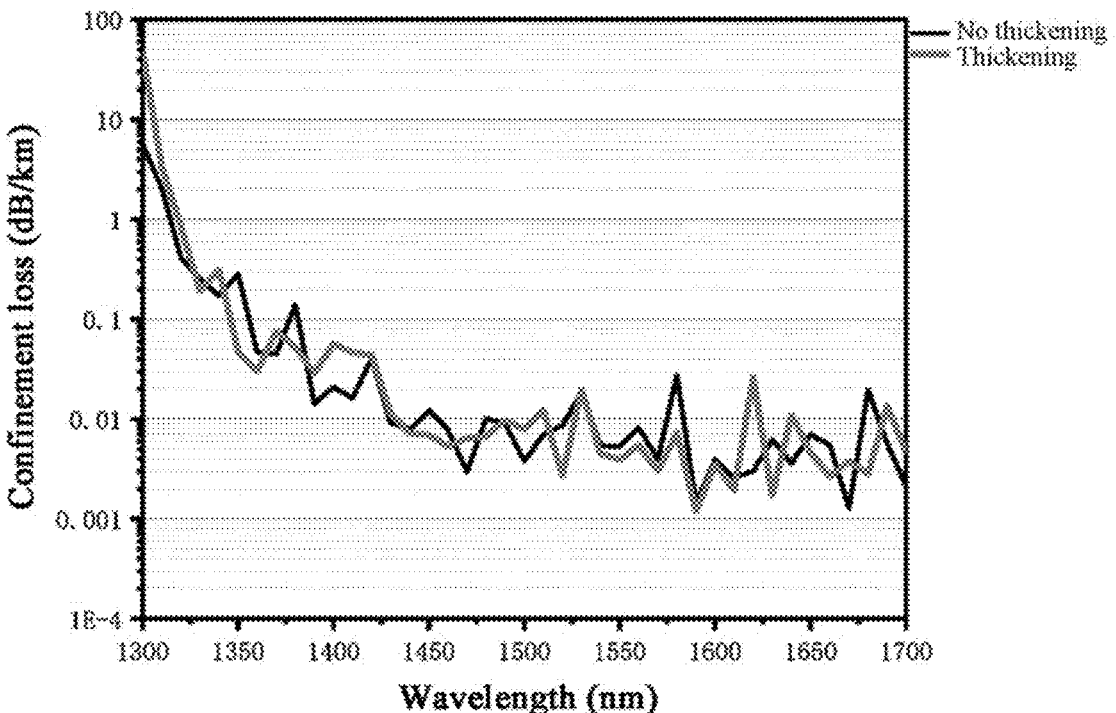
FIG. 27*b* is a simulation plot of an impact of the foregoing contact points turning thicker on a confinement loss in a case of the anti-resonant hollow-core fiber in FIG. 27*a;*

FIG. 27*b* is a simulation plot of an impact of the foregoing contact points turning thicker on a confinement loss in a case of the anti-resonant hollow-core fiber in FIG. 27*a*. Simulation results show that the foregoing contact points turning thicker have no substantial impact on the confinement loss.

Figure 27C:
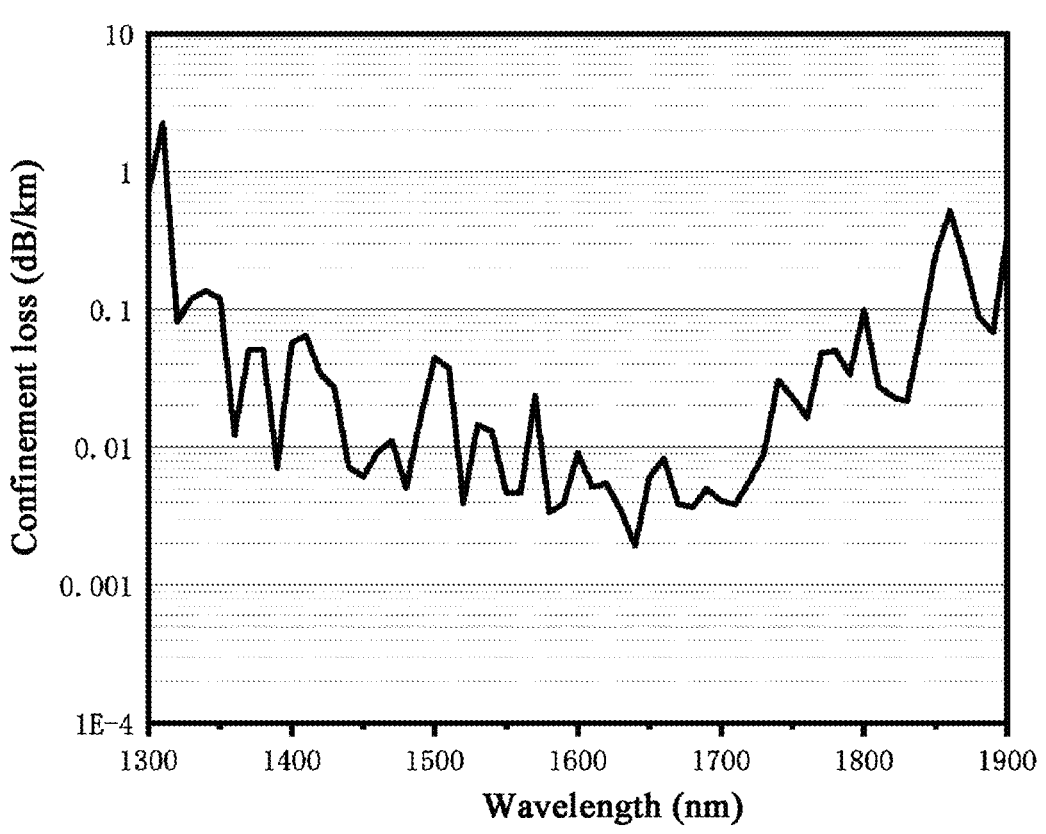
FIG. 27*c* is a simulation plot of a confinement loss changing with a wavelength by changing a thickness (for example, a thickness size of a first primary nested element relative to a first cladding primary element) of a part of a tube wall in a case of the anti-resonant hollow-core fiber in FIG. 27*a;*

In the drawing process, the local thickness of the tube wall may also undergo some changes. FIG. 27*c* is a simulation plot of a confinement loss changing with a wavelength by changing a thickness (for example, a thickness size of a first primary nested element relative to a first cladding primary element) of a part of a tube wall in a case of the anti-resonant hollow-core fiber in FIG. 27*a*. Plot: The actual structure is changed with respect to the optimal structure, but can still manifest a good effect on a fundamental mode loss.

Figure 27D:
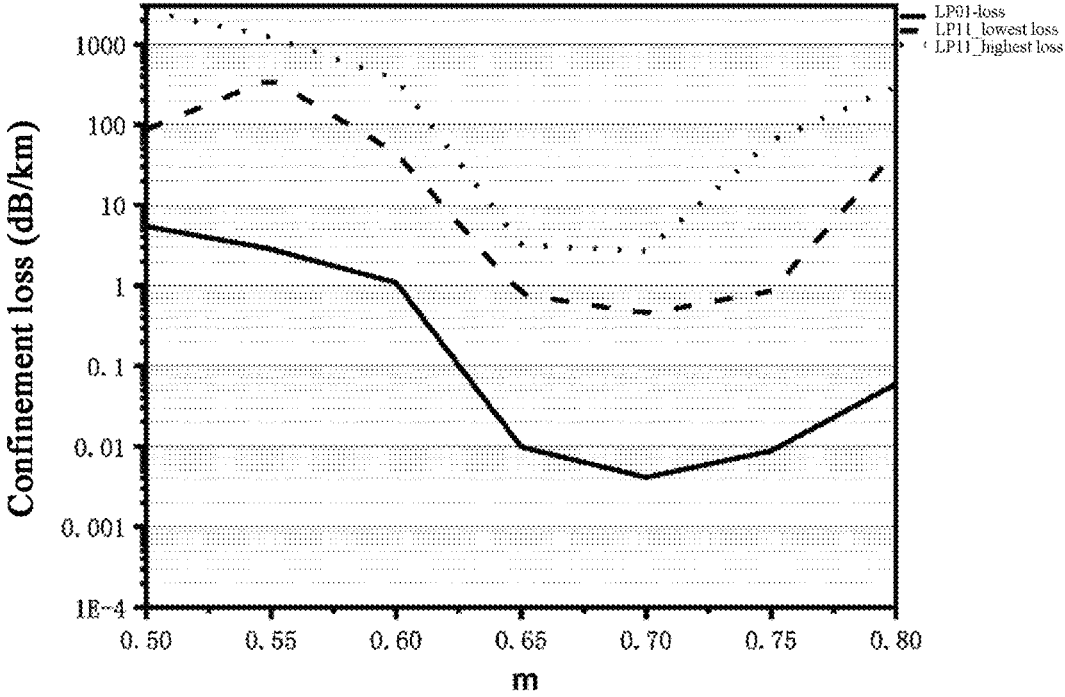
FIG. 27*d* is a simulation plot of an impact of changing a size ratio m of a first primary nested element to a first cladding primary element on confinement losses of a core fundamental mode and a higher-order mode in a case of the anti-resonant hollow-core fiber in FIG. 27*a;*
Figure 27E:
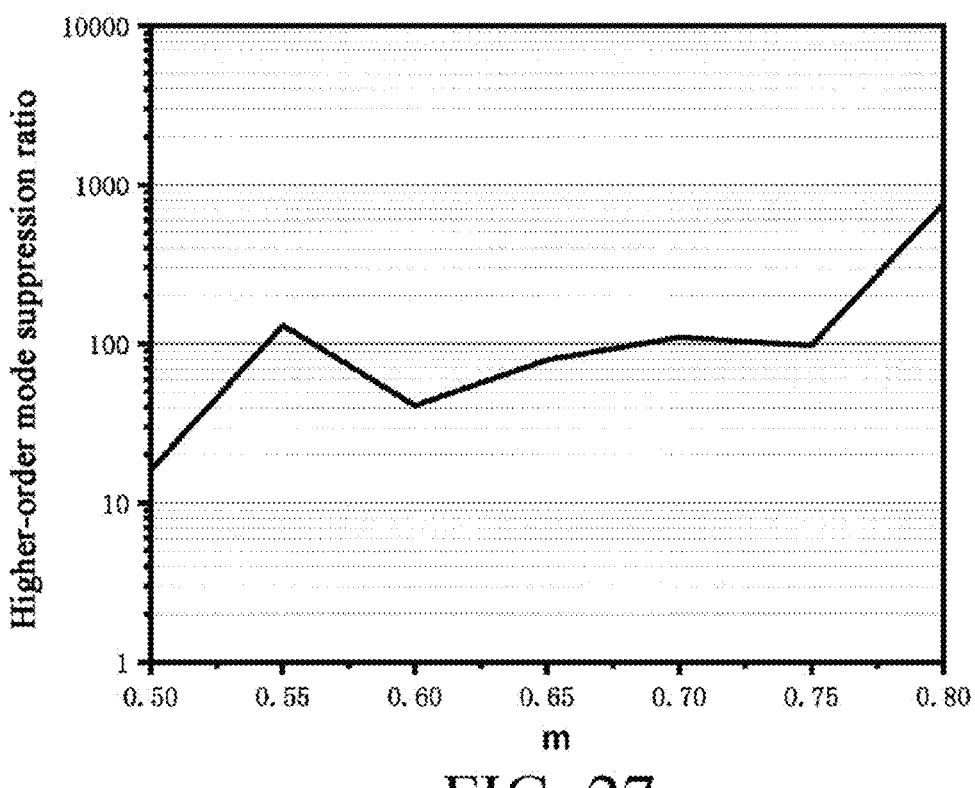
FIG. 27*e* is a simulation plot of a higher-order mode suppression ratio in a case of the anti-resonant hollow-core fiber in FIG. 27*a* changing with a size ratio m of a first primary nested element to a first cladding primary element.
Figure 27F:
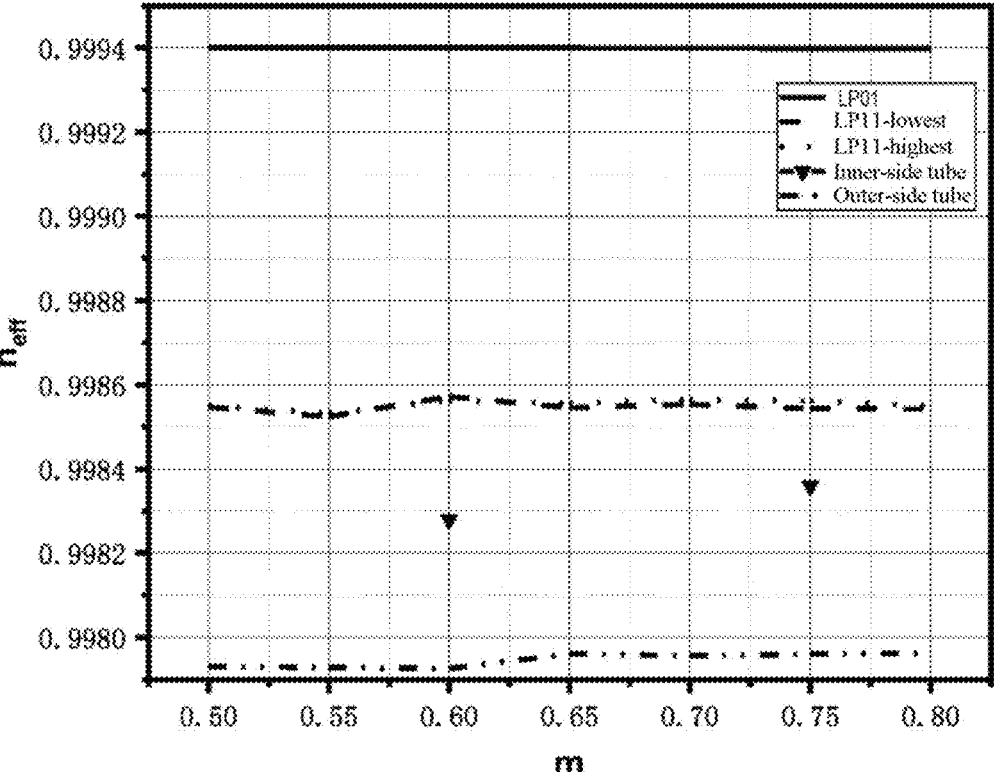

FIG. 27*d* is a simulation plot of an impact of changing a size ratio m of a first primary nested element to a first cladding primary element on a core fundamental mode and a higher-order mode in a case of the anti-resonant hollow-core fiber in FIG. 27*a*. FIG. 27*e* is a simulation plot of a higher-order mode suppression ratio in a case of the anti-resonant hollow-core fiber in FIG. 27*a* changing with a size ratio m of a first primary nested element to a first cladding primary element. As can be seen from FIG. 27*d*, a change in the ratio m has a large impact on the fundamental mode loss. When $0.65 < m < 0.75$, the loss is less than or equal to 0.01 dB/km. However, in some embodiments, it may be impossible to adequately filter out the higher-order mode by only changing the value of m above. For example, when $0.65 < m < 0.75$, the higher-order mode suppression ratio is less than or equal to 100, i.e., the effect of filtering out the higher-order mode is not good. FIG. 27*f* is a simulation plot of an impact of changing a size ratio m of a first primary nested element to a first cladding primary element on effective refractive indexes of a core fundamental mode, a higher-order mode, and an inter-tube cavity region mode in a case of the anti-resonant hollow-core fiber in FIG. 27*a*. In addition, as seen from the simulation plot of the effective refractive index in FIG. 27*f*, the effective refractive index of the cavity in the first cladding primary element is also far away from the effective refractive index of the core higher-order mode.

Figure 28A:
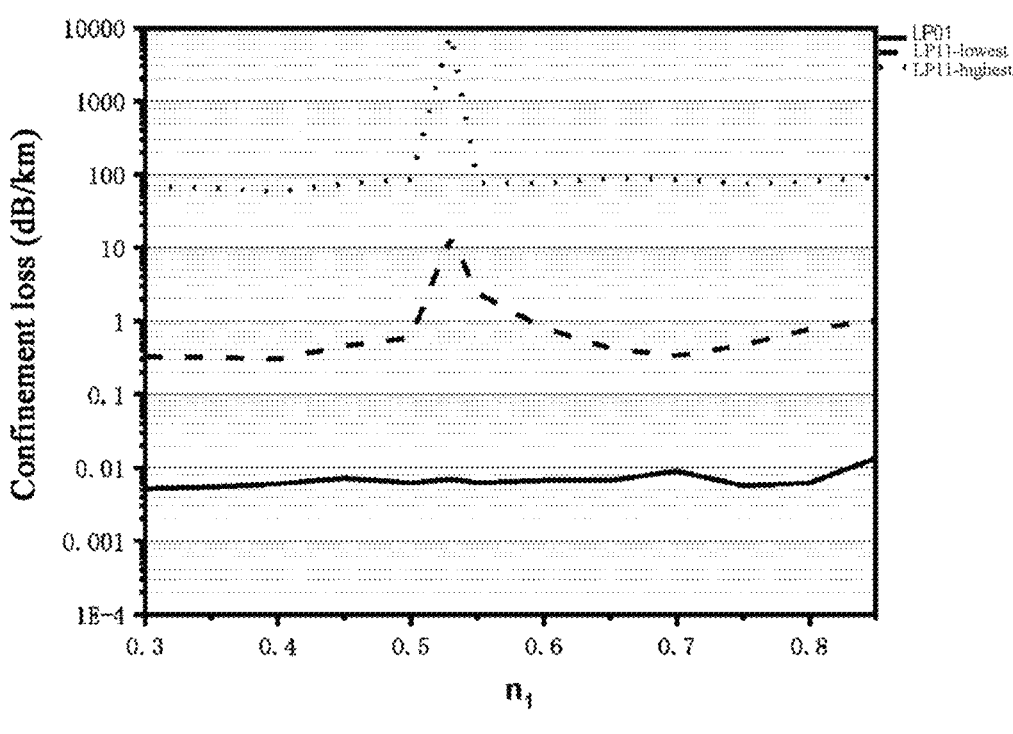
Figure 28B:
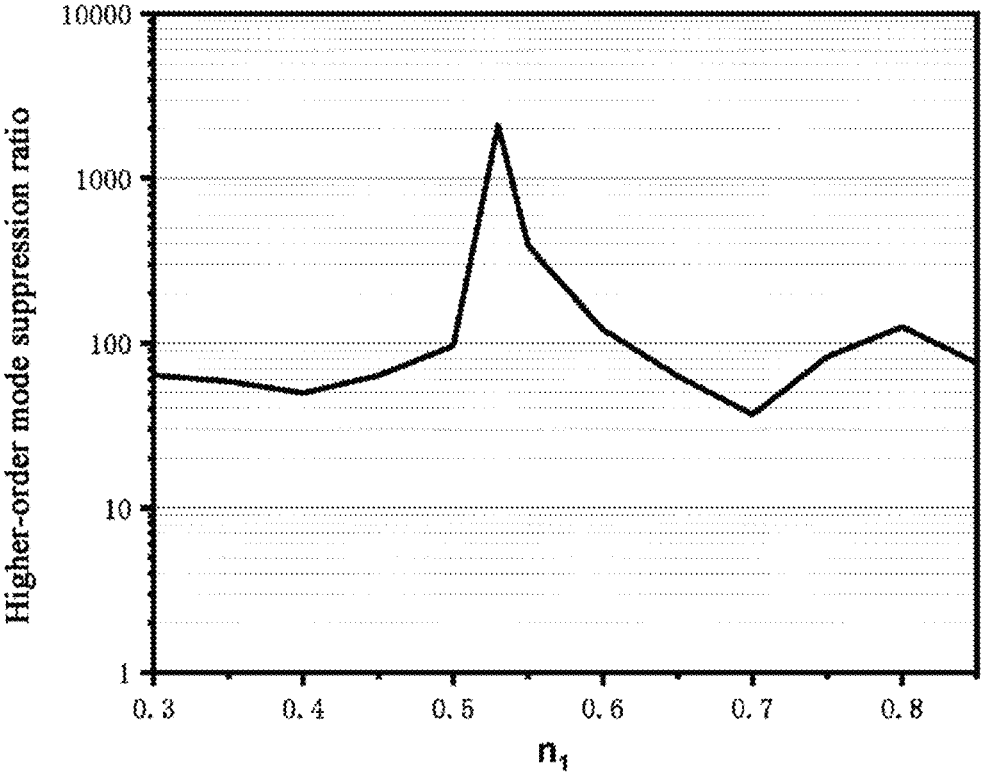
FIG. 28b is a simulation plot of a higher-order mode suppression ratio in a case of the anti-resonant hollow-core fiber in FIG. 27a changing with a size ratio $n_1$ of a first secondary nested element to a first cladding secondary element.
Figure 28C:
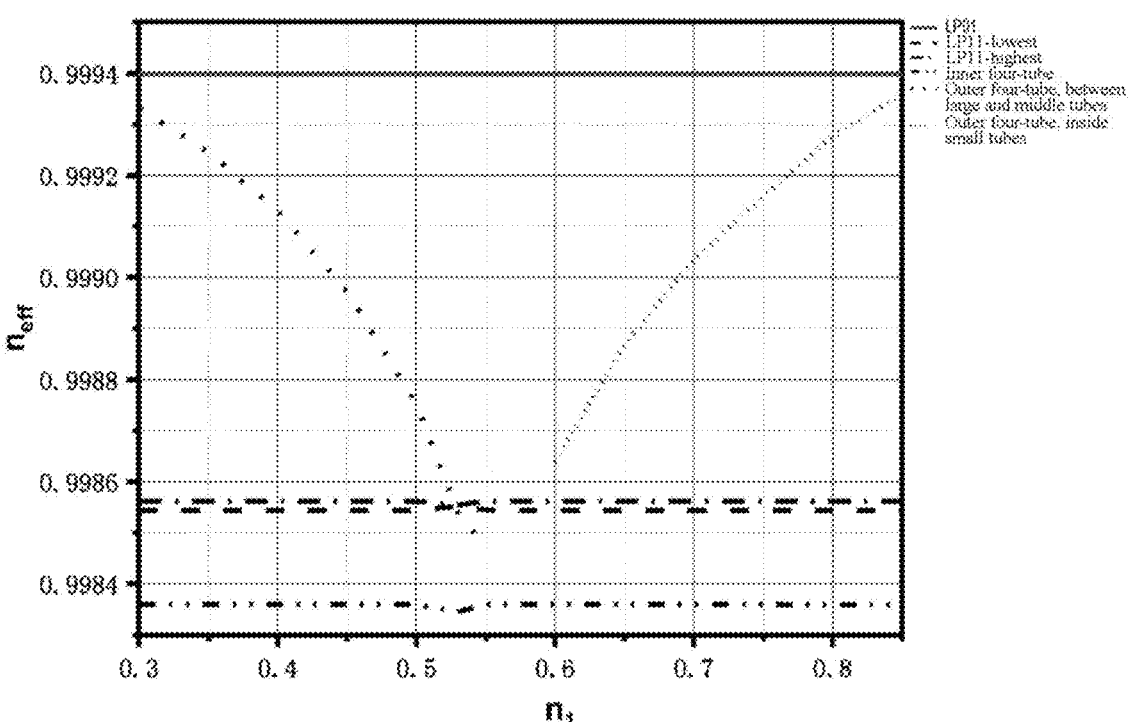

In some embodiments, the foregoing higher-order mode suppression ratio may be suppressed by adjusting the size of the first secondary nested element with respect to the first cladding secondary element. FIG. 28*a* is a simulation plot of an impact of changing a size ratio $n_1$ of a first secondary nested element to a first cladding secondary element on confinement losses of a core fundamental mode and a higher-order mode in a case of the anti-resonant hollow-core fiber in FIG. 27*a*. FIG. 28*b* is a simulation plot of a higher-order mode suppression ratio in a case of the anti-resonant hollow-core fiber in FIG. 27*a* changing with a size ratio $n_1$ of a first secondary nested element to a first cladding secondary element;

FIG. 28*c* is a simulation plot of an impact of changing a size ratio $n_1$ of a first secondary nested element to a first cladding secondary element on effective refractive indexes of a core fundamental mode, a higher-order mode, and an inter-tube cavity region mode in a case of the anti-resonant hollow-core fiber in FIG. 27*a*.

As can be seen from FIG. 28*a* and FIG. 28*b*, a change in the size ratio $n_1$ of the first secondary nested element to the first cladding secondary element has a small impact on the fundamental mode loss. For example, the fundamental mode loss may be less than 0.01 db/km. However, the core higher-order mode can effectively match the effective refractive index of the cavity in the first cladding secondary element by changing the ratio, so that a loss of the higher-order mode is changed, thereby implementing a high higher-order mode suppression ratio. For example, FIG. 28*b* shows that when n is equal to 0.53, the higher-order mode suppression ratio may reach 2093. In addition, as seen from the simulation plot of the effective refractive index in FIG. 28*c*, the effective refractive index of the cavity between the first cladding secondary element and the first secondary nested element is close to the effective refractive index of the core higher-order mode. For example, $\Delta n_{eff}$ is approximately equal to 0.00001.

Therefore, the core higher-order mode can be suppressed through the alternate arrangement of the plurality of first cladding primary elements and the plurality of first cladding secondary elements, especially the nested arrangement of the first cladding secondary elements.

The embodiments of the anti-resonant hollow-core fiber in the present disclosure have been described above. It should be understood that because adjacent first cladding elements in the anti-resonant hollow-core fiber in the present disclosure are in contact with each other, compared with an existing non-contact structure, a drawing requirement is lowered. In addition, through the optimization of the specific structural parameters (especially the ratios $D_1/D_2$, d/a, and/or $D_3/a$) and/or the specific layout of the anti-resonant hollow-core fiber in the present disclosure, it can be ensured that the confinement loss of the anti-resonant hollow-core fiber is maintained at a satisfying level.

Typically, all wall thicknesses t of the first cladding elements in the present disclosure may satisfy an anti-resonant condition:

$$\frac{\lambda_m \cdot (2m-1)}{4\sqrt{n^2-1}} < t < \frac{\lambda_m \cdot m}{2\sqrt{n^2-1}}, \, m = 1, 2, 3, \ldots ,$$

where $\lambda_m$ is a resonance wavelength, m is an order of an anti-resonant layer, and n is a refractive index of a material of a component forming the first cladding elements.

Figure 29A:
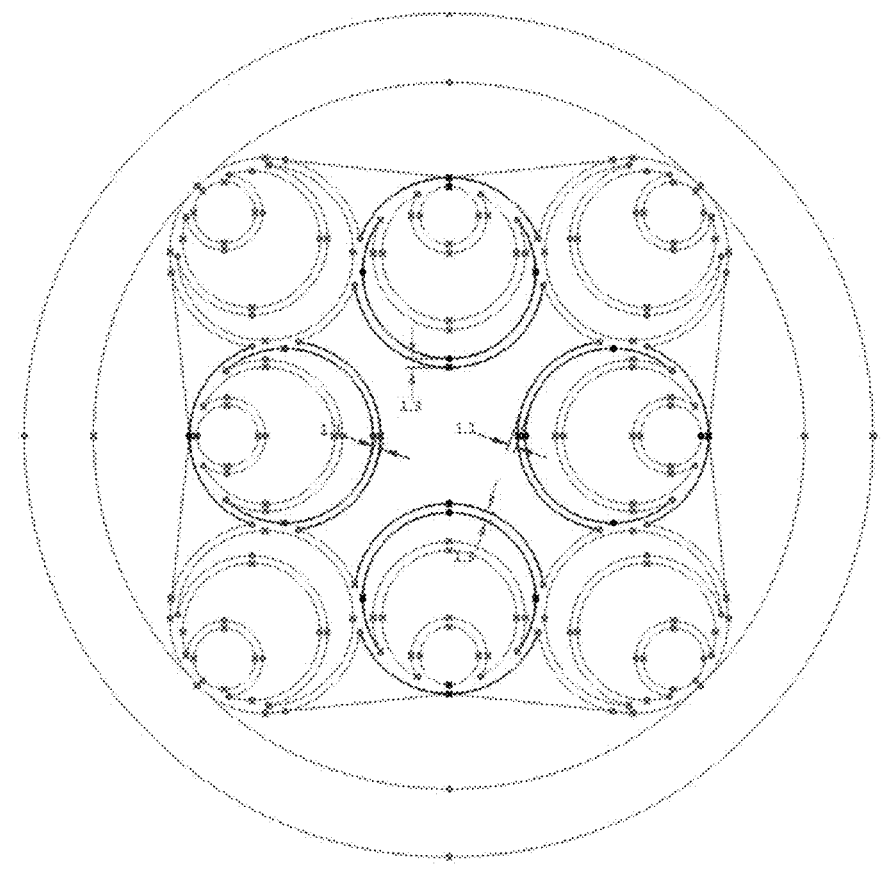
FIG. 29a is a schematic structural diagram of first cladding primary elements of an anti-resonant hollow-core fiber in the present disclosure having different thicknesses in orthogonal directions.
Figure 29B:
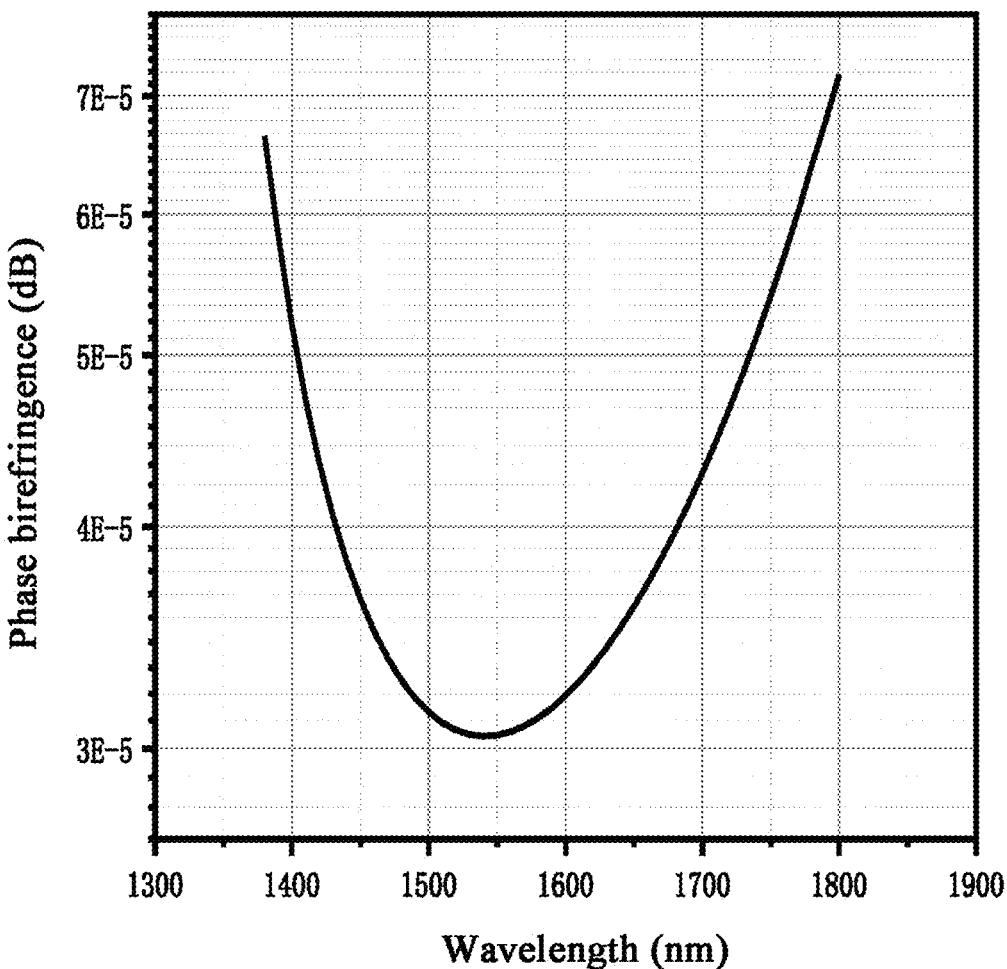
FIG. 29b is a simulation schematic diagram of a phase birefringence of the structure in FIG. 29a changing with a wavelength.

Particularly, in some embodiments, all wall thicknesses of the first cladding elements may be basically the same. In some other embodiments, the first cladding elements may include different first cladding elements (or first cladding primary elements) in orthogonal directions, and wall thicknesses of these different first cladding elements (or first cladding primary elements) in the orthogonal directions are different. As an example, FIG. 29*a* is a schematic structural diagram of first cladding primary elements of an anti-resonant hollow-core fiber in the present disclosure having different thicknesses in orthogonal directions. For example, as shown in FIG. 29*a*, the first cladding primary element has a thickness of 1.3 μm in a first direction, and only has a thickness of 1.1 μm in a second direction orthogonal to the first direction. In a case that the wall thicknesses in the orthogonal directions are inconsistent, the anti-resonant hollow-core fiber may provide mode fields in the orthogonal directions in the fiber core with different effective refractive indexes, to generate birefringence, thereby achieving the technical effect of polarization maintenance. FIG. 29*b* is a simulation schematic diagram of a phase birefringence of the structure in FIG. 29*a* changing with a wavelength.

In some other embodiments, a ratio of the radius of the maximum virtual inscribed circle of a fiber core to a wavelength of light guided by the hollow-core fiber ranges from 3 to 40, or from 4.5 to 20.

In addition, the anti-resonant hollow-core fiber in the present disclosure can support effective single-mode or multi-mode transmission, and a loss ratio of a lowest-loss higher-order mode in a fiber core to a fundamental mode in the fiber core may be at least one order of magnitude, at least two orders of magnitude, or at least three orders of magnitude.

In addition, it should further be understood that the features in the foregoing embodiments may be combined with each other without contradiction, and the descriptions of the foregoing embodiments may be applicable to other embodiments.

Although the present invention has been illustrated and described in detail in the accompanying drawings and the foregoing descriptions, such illustrations and descriptions should be considered illustrative or exemplary rather than limiting. The present invention is not limited to the disclosed embodiments. Other variations of the disclosed embodiments can be understood and practiced by those skilled in the art in practicing the invention for which protection is sought by examining the accompanying drawings, the disclosure, and the appended claims.

In the claims, the word "including" does not exclude other components, and the indefinite article "a" or "one" does not exclude "a plurality". A single component or other parts may fulfill the functions of a plurality of items set forth in the claims. The mere fact that certain features are documented only in mutually exclusive embodiments or dependent claims does not mean that combinations of these features cannot be advantageously used. Without departing from the spirit and scope of the present application, the scope of protection of the present application covers any possible combination of the various features documented in the various embodiments or dependent claims.

Furthermore, any reference marks in the claims should not be construed as limiting the scope of the present invention.

What is claimed is:

1. An anti-resonant hollow-core fiber, comprising:
an outer jacket tube, provided with an;
support members, disposed in the outer jacket tube and in contact with the inner surface; and
cladding elements, disposed in the outer jacket tube, and comprising a plurality of first cladding elements, wherein:
the plurality of first cladding elements define a central air region of the anti-resonant hollow-core fiber,
any two adjacent first cladding elements in the plurality of first cladding elements are in contact with each other,
the plurality of first cladding elements comprise first cladding primary elements and first cladding secondary elements, the first cladding primary elements and the first cladding secondary elements are disposed alternatively to each other, at least some first cladding primary elements in the first cladding primary elements are arranged to be in contact with a maximum virtual inscribed circle in the central air region, and none of the first cladding secondary elements is in contact with the maximum virtual inscribed circle,
each of the first cladding primary elements is in contact with a corresponding support member that is in contact with the inner surface, and the support member is located between the corresponding first cladding primary element and the inner surface of the outer jacket tube, a ratio of a spacing between any two adjacent first cladding primary elements and a radius of the maximum virtual inscribed circle is larger than 0.1 and is smaller than 1.5,
the first cladding primary elements comprise at least one first primary nested element, and
a shape of each of the first cladding secondary elements and shapes of the first cladding primary elements are different, each of the first cladding primary elements has a fan shape with two side walls being substantially straight, each of the first cladding secondary elements is in contact with two adjacent first cladding primary elements of the first cladding primary elements, each of the first cladding primary elements is in contact with two adjacent first cladding secondary elements of the first cladding secondary elements, and contact points between the first cladding primary elements and the first cladding secondary elements are thicker than side walls of the first cladding primary elements.

2. The anti-resonant hollow-core fiber according to claim 1, wherein:
a second ratio of a distance and the radius of the maximum virtual inscribed circle is larger than 0.6, wherein the distance is from the closest contact point between a first cladding primary elements and a first cladding secondary elements to the maximum virtual inscribed circle.

3. The anti-resonant hollow-core fiber according to claim 1, wherein:
the first primary nested element is a closed full tube, and
the first primary nested element is completely nested or partially nested in the first cladding primary element.

4. The anti-resonant hollow-core fiber according to claim 3, wherein:
a second primary nested element is further disposed in each first primary nested element, and
the second primary nested element is completely or partially nested in the first primary nested element.

5. The anti-resonant hollow-core fiber according to claim 4, wherein a third primary nested element is further disposed in each second primary nested element.

6. The anti-resonant hollow-core fiber according to claim 1, wherein:
the first primary nested element is completely nested or partially nested in the first cladding primary element.

7. The anti-resonant hollow-core fiber according to claim 6, wherein:
a second primary nested element is further disposed in each first primary nested element, and
the second primary nested element is completely or partially nested in the first primary nested element.

8. The anti-resonant hollow-core fiber according to claim 7, wherein a third primary nested element is further disposed in each second primary nested element.

9. The anti-resonant hollow-core fiber according to claim 1, wherein:
a quantity of the first cladding primary elements and a quantity of the first cladding secondary elements are the same, and are 2, 3, 4, 5, or 6.

10. The anti-resonant hollow-core fiber according to claim 1, wherein:
the ratio is larger than 0.15 and smaller than 1, or
the ratio is larger than 0.2 and smaller than 0.9.

11. The anti-resonant hollow-core fiber according to claim 1, wherein:

a second ratio of a distance and the radius of the maximum virtual inscribed circle is larger than 0.8 or 1, wherein the distance is from the closest contact point between a first cladding primary elements and a first cladding secondary elements to the maximum virtual inscribed circle.

12. The anti-resonant hollow-core fiber according to claim 1, wherein:

a size of each of the first cladding secondary elements and sizes of the first cladding primary elements are same or substantially same.

13. The anti-resonant hollow-core fiber according to claim 1, wherein:

a size of each of the first cladding secondary elements is larger than sizes of the first cladding primary elements.

14. The anti-resonant hollow-core fiber according to claim 1, wherein:

a size of each of the first cladding secondary elements is smaller than sizes of the first cladding primary elements.

15. The anti-resonant hollow-core fiber according to claim 1, wherein a second primary nested element is further disposed in each first primary nested element, and the second primary nested element is completely or partially nested in the first primary nested element.

16. The anti-resonant hollow-core fiber according to claim 15, wherein a third primary nested element is further disposed in each second primary nested element.

17. The anti-resonant hollow-core fiber according to claim 1, wherein each first cladding secondary element further comprises a first secondary nested element, wherein the first secondary nested element is completely or partially nested in the first cladding secondary element.

* * * * *